US007016536B1

(12) United States Patent
Ling et al.

(10) Patent No.: US 7,016,536 B1
(45) Date of Patent: Mar. 21, 2006

(54) METHOD AND APPARATUS FOR AUTOMATIC CLEANING AND ENHANCING OF SCANNED DOCUMENTS

(75) Inventors: Marvin T. Ling, Scottsdale, AZ (US); Alan J. Filipski, Tempe, AZ (US); Philip B. Foster, Tempe, AZ (US); Michael E. Higgins, Phoenix, AZ (US)

(73) Assignee: GTX Corporation, Phoenix, AZ (US)

( * ) Notice: Subject to any disclaimer, the term of this patent is extended or adjusted under 35 U.S.C. 154(b) by 297 days.

(21) Appl. No.: 09/717,607

(22) Filed: Nov. 21, 2000

Related U.S. Application Data

(60) Provisional application No. 60/167,330, filed on Nov. 24, 1999, provisional application No. 60/177,820, filed on Jan. 25, 2000.

(51) Int. Cl.
G06K 9/36 (2006.01)
(52) U.S. Cl. ............... 382/190; 382/289; 382/290
(58) Field of Classification Search ........ 382/190–194, 382/181–184, 232, 243, 254, 289–290
See application file for complete search history.

(56) References Cited

U.S. PATENT DOCUMENTS

| | | | |
|---|---|---|---|
| 4,817,187 A | 3/1989 | Lien | 382/56 |
| 4,821,336 A | 4/1989 | Roye | 382/56 |
| 5,559,902 A * | 9/1996 | Bose et al. | 382/263 |
| 5,647,027 A * | 7/1997 | Burges et al. | 382/275 |
| 5,664,027 A | 9/1997 | Ittner | 382/170 |
| 5,854,853 A | 12/1998 | Wang | 382/176 |
| 5,912,992 A * | 6/1999 | Sawada et al. | 382/274 |
| 5,978,513 A * | 11/1999 | Murayama | 382/242 |
| 5,987,230 A * | 11/1999 | Shimizu | 358/1.16 |

OTHER PUBLICATIONS

"The Quadtree and Related Hierarchical Data Structures" by Hanan Samet, Computing Surveys, vol. 16, No. 2, Jun. 1984, pp. 187-211.
"Fundamentals of Artificial Neural Networks", "Perceptron", and "Backpropagation", by Philip D. Wasserman, Neutral Computing, Theory and Practice, Van Nostrand Reinhold 1989, pp. 11-53.
"Artificial Neural Systems—Foundations, Paradigms, Applications, and Implementations" by Patrick K. Simpson, Pergamon Press, 1990, pp. 112-119.

* cited by examiner

*Primary Examiner*—Thomas D. Lee
*Assistant Examiner*—Stephen Brinich
(74) *Attorney, Agent, or Firm*—Cahill, von Hellens & Glazer P.L.C.

(57) ABSTRACT

A method and apparatus are provided for removing noise from a first digital representation of data images and noise images of a document, including digitally scanning the document so as to produce the first digital representation of all the images of the document, including the data images and the noise images. After de-skewing the image representation, objects are built from a reduced-resolution representation of the scanned representation. Objects identified as picture objects are included in a mask which is logically ANDed with the de-skewed representation of the scanned document. All objects are added to an object list and initially marked as noise. Objects identified as text objects or geometric objects are marked as data objects. Objects identified as picture objects are included in a mask which is logically ANDed with the de-skewed representation to eliminate all other objects. Objects marked as data objects are added to that representation to provide the de-skewed, de-speckled representation of the scanned document.

20 Claims, 46 Drawing Sheets

TOP LEVEL FLOW

CLASSIFY DOCUMENT

CREATE REDUCED-RESOLUTION MIP LEVEL IMAGES

DESKEW DOCUMENT

FIND SKEW ANGLE (TEXT)

FIND SKEW ANGLE (GEOMETRIC)

IDENTIFY DATA

IDENTIFY PICTURE REGIONS

IDENTIFY TEXT OBJECTS AND MARK AS DATA

FIND CHARACTER SIZES

FORM ROWS OF TEXT

FORM PARAGRAPHS

ADJUST ROWS

FORM COLUMNS OF TEXT

ELIMINATE SPURIOUS COLUMNS

POSTPROCESS COLUMNS

FIND AND MARK EXTRA-COLUMNAR TEXT OBJECTS AS DATA

INVOKE NEURAL NET

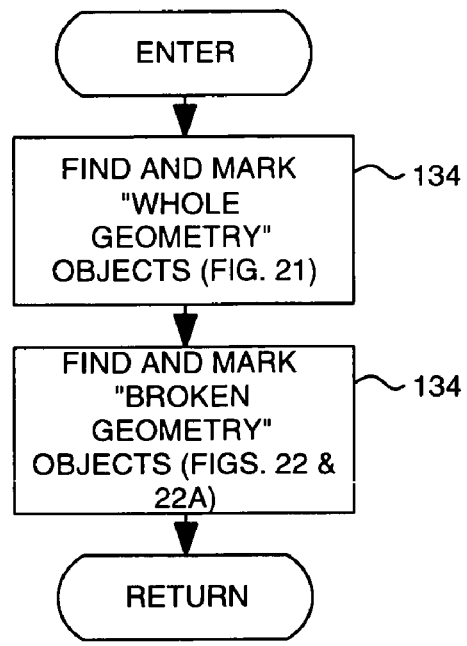
IDENTIFY GEOMETRIC OBJECTS AND MARK AS DATA

FIND WHOLE GEOMETRY

FIND AND MARK BROKEN GEOMETRY OBJECTS

MARK OBJECTS FORMING DASHED & DOTTED LINES

Fig. 24A

169 → すぎていないか」
「今以上のより深い思いを伝える文書を創造し、
伝達することはできないか」
……誰しもが感じ疑問です。
その答えを、ゼロックスグループは用意いたしました。あえて「文書」とはいわず、「ドキュメント」と呼びます。皆さまに提供できるサービスへの自信と決意を込めて、定冠詞 The をつけた「The Document」です。
1通の伝言メモから分厚いマニュアルまで、すべての「ドキュメント」をよりすばらしいものにするお手伝いを、ゼロックスはできると確信しています。

2 望ましい「ドキュメント」とは

ドキュメントは、伝えたい思いを正確にスピーディに相手に伝えることを目的としています。そのためには、
★必要な要素をもれなく手早く盛り込むことができること、
★目的の相手に望むときに正しく伝わること、
★そして、必要な人が必要なときにファイルから取り出したり検索できること、

MIP LEVEL 2

Fig. 24C

DESKEWED

DESPECKLE ROWS; ALSO DESKEW

Fig. 24E

DESPECKLED; ALSO DESKEWED

169 すぎていないか」 178

「今以上のより深い思いを伝える文書を創造し、
伝達することはできないか」
……誰しもが感じ疑問です。
　その答えを、ゼロックスグループは用意いたし
ました。あえて「文書」とはいわず、「ドキュメ
ント」と呼びます。皆さまに提供できるサービス
への自信と決意を込めて、定冠詞 The をつけた
「The Document」です。　178
　1通の伝言メモから分厚いマニュアルまで、す
べての「ドキュメント」をよりすばらしいものに
するお手伝いを、ゼロックスはできると確信して
います。

2 望ましい「ドキュメント」とは

ドキュメントは、伝えたい思いを正確にスピーデ
ィに相手に伝えることを目的としています。その
ためには、
　★必要な要素をもれなく手早く盛り込むことが
できること、
　★目的の相手に望むときに正しく伝わること、
　★そして、必要な人が必要なときにファイルか

存」も「検索」
なくなった""と
""担当がいない
などなど、オフ
錯しているので
オフィス内の
えるシステムや
ト本来の目的を
よう。

3　ゼロック

1938 年、チ
って発明された
は、「XEROX」？

●チェス

Fig. 25C er, as shown in Figure
his mode to organize
g sheet for plotting by
fferent views of your
'arious magnifications.
—called floating view-
imply holes cut in the
through to the model.
Space enabled, you
nal capabilities, such
ning, layer manipulat-
ype scaling. In the
environment, title
nd notes, detail tags,
) on can be added at a
is ratio allows you to
le title block for the
u are using without
e it to fit the desired
hen plotting a Paper
g, you will always plot taken from a base plan. The
base plan can be displayed
at ¼-inch or ⅛-inch scale
with details at a larger scale.
The layer visibility can be con-
trolled in each viewport. If a
change is made to the base plan,
it will automatically appear in
the enlarged detail, as shown in
Figure 2.

- Details can be combined on one
plotted sheet. Using Paper
Space and xrefs allows you to
put together a stair detail or an
enlarged toilet plan sheet by
external referencing of the first,
second and third floors of a
building, isolating the areas to
be detailed from each floor in a
viewport window and adding
notes and dimensions, as shown
in Figure 3.

- Paper Space can display plans
that require quadrant displays
too big for the paper size. The style
base
scale
Othe
niqu
later Sebu
Pape
Whe
xref:
shee
Spac
then
becc
lem
prop
plan
shot
refe
Mod
1:1
in n
don
atts

**aper Space works much like a piece of
floating viewports are like holes cut in the
to through to the model.**

:e of paper, as shown in Figure
ou use this mode to organize
r drawing sheet for plotting by
inging different views of your
)del" at various magnifications.
se views—called floating view-
s—are simply holes cut in the
er to see through to the model.
h Paper Space enabled, you
e additional capabilities, such
lmensioning, layer manipulat-
and linetype scaling. In the
er Space environment, title
ks, text and notes, detail tags,
rts and so on can be added at a
scale. This ratio allows you to
a full-scale title block for the
:r size you are using without
ng to size it to fit the desired
scale. When plotting a Paper
:e drawing, you will always plot taken from a base plan. The
base plan can be displayed
at ¼-inch or ⅛-inch scale
with details at a larger scale.
The layer visibility can be con-
trolled in each viewport. If a
change is made to the base plan,
it will automatically appear in
the enlarged detail, as shown in
Figure 2.

Details can be combined on one
plotted sheet. Using Paper
Space and xrefs allows you to
put together a stair detail or an
enlarged toilet plan sheet by
external referencing of the first,
second and third floors of a
building, isolating the areas to
be detailed from each floor in a
viewport window and adding
notes and dimensions, as shown
in Figure 3.

Paper Space can display plans
that require quadrant displays
too big for the paper size. The

FIND AND MARK GUTTER OBJECTS

BREAK COMPLEX OBJECTS INTO SIMPLER SHAPES

SAMPLE HORIZONTAL STRIPS FROM EACH OBJECT

CALCULATE MINDOTMASS

METHOD AND APPARATUS FOR AUTOMATIC CLEANING AND ENHANCING OF SCANNED DOCUMENTS

CROSS REFERENCE TO RELATED APPLICATION

This application claims the benefit of prior filed co-pending U.S. Provisional Application Ser. No. 60/167,330 filed Nov. 24, 1999, entitled "METHOD AND APPARATUS FOR AUTOMATIC CLEANING AND ENHANCING OF SCANNED DOCUMENTS" by Marvin T. Ling, Alan J. Filipski and Philip B. Foster.

This application also claims the benefit of prior filed co-pending U.S. Provisional Application Ser. No. 60/177,820 filed Jan. 25, 2000, entitled "METHOD AND APPARATUS FOR AUTOMATIC CLEANING AND ENHANCING OF SCANNED DOCUMENTS" by Marvin T. Ling, Alan J. Filipski and Philip B. Foster.

REFERENCE TO MICROFICHE APPENDIX

A microfiche appendix, Appendix 1, containing a total of 1 sheet and 58 frames of microfiche for implementation of one of the described embodiments is included in this application.

BACKGROUND OF THE INVENTION

The invention relates to systems and methods for removing extraneous image material of a document being digitally scanned to provide an enhanced copy including all of the desired data and image information of the originally scanned document but omitting as much extraneous image material as possible without affecting the desired data and image information.

Documents frequently are scanned from a paper copy, or a "copy-of-a-copy", or the like into a digital representation by means of a digital scanner. The digital representation thus created usually is initially in the form of a sequence of pages, each represented as a sequence of pixels or "run-lengths". The digital representation produced by scanning of the document often contains undesirable image elements referred to as "noise" in addition to the "essential data" or "desired data" making up the essential meaning of the images of the document. Furthermore, the essential data may be geometrically distorted from its ideal form in either a linear or non-linear manner. The amount and type of noise and/or distortion depends upon both the particular digital scanning process used and the quality of the scanned document. It is important to remove as much noise and distortion from the scanned representation as possible, both to improve the esthetic appearance of "enhanced" or "cleaned" copies of the document reconstructed from the digital representation, and to make text and other images in the "reconstructed" document more legible. This is especially important if the scanned document is to be processed by optical character recognition (OCR) software. Furthermore, for some kinds of encoding, such as run-length encoding, a digital representation including noise requires more storage space in which to store the digital representation. Also, more time is required for digital processing of image data including noise.

The removal of noise and correction of distortion is referred to herein as "enhancement" or "clean-up". Usually, clean-up of digitally scanned images from a document requires substantial human intervention. For example, a human operator may be required to delineate regions on the document in which speckles are to be removed and/or to specify a maximum speckle size for removal in each region. The operator also may be required to specify the orientation of the document so that it can be rotated to correct for a small amount of skewing introduced during the scanning process. Such manual interventions are time-consuming, and need to repeated for each document or page to be "cleaned up.

Thus, there is an unmet need for an automatic system and technique for fast, inexpensive "clean-up" of noise and distortion in images digitally scanned from an original document or the like which ensures that no desired or essential image data will be lost.

SUMMARY OF THE INVENTION

Accordingly, it is an object of the invention to provide a system and method which automatically, rapidly, and economically removes noise or extraneous image information from image information obtained by digital scanning of a document or the like.

It is another object of the invention to provide a system and technique for automatic removal of extraneous or noise image material from a digital representation of an image obtained by scanning an original document, to thereby produce a cleaned-up copy with no removal of essential image information.

It is another object of the invention to avoid inadvertent removal of data from a digital image representation of a document on the basis of size of images of a document.

It is another object of the invention to provide "clean-up" of extraneous images from a digital representation of document images without merely specifying a maximum speckle size threshold.

It is another object of the invention to provide efficient clean-up of a digital representation of a document without loss of essential image data for a digital copier or digital image processing system without adding appreciable hardware costs.

It is another object of the invention to provide an automatic document clean-up technique for a digital copier or digital image processing system which requires no operator interaction.

It is another object of the invention to provide clean-up of noise which has been introduced into a digital image data by applying a bi-tonal thresholding process to digital image data representative of a gray-scale document.

It is another object of the invention to provide an image clean-up technique that is based upon the nature of the essential image information contained in the image data rather than on the characteristics that constitute noise.

It is another object of the invention to reduce the amount of memory storage required for storing and/or processing a copy of a document having noise images therein.

It is another object of the invention to increase the speed of transmission of digital information representing a document, an original scanned copy of which includes noise images.

It is another object of the invention to provide a digital image enhancement system and method that improves the accuracy and/or efficiency of performing optical character recognition of images of a document.

Briefly described, and in accordance with one embodiment thereof, the invention provides a method and system for removing noise from a digital representation of data images and noise images of a document, including digitally scanning the document to produce the digital representation of the data images and the noise images, performing an object grabbing operation on the digital representation to obtain a list of all objects of the document, all objects in the list being initially indicated as noise objects, producing a reduced-resolution representation of the digital representation and performing another object grabbing operation on the reduced resolution representation, identifying objects that represent essential information of the document and marking them as data objects, and reconstructing a digital representation of a reduced noise version of the document consisting of all of the marked data objects.

In another embodiment the invention provides a method for removing noise from a digital representation of essential images and noise images of a document, including digitally scanning the document to produce the digital representation of the essential images and the noise images, performing an object grabbing operation on the digital representation to identify adjoining pixels which form objects, operating a processor so as to identify a data area portion of the digital representation that includes the objects which constitute the essential images, operating the processor to perform a logical ANDing operation between the data area portion and the digital representation to provide a digital representation of the essential images without the noise images, and operating the processor to eliminate the noise images located outside of the data areas from the digital representation to provide another digital representation of data images including noise images located within the data areas.

In a preferred embodiment the invention provides a method and system for producing a cleaned-up digital image of a document including essential data images and undesired noise images, including digitally scanning the document to produce a first digital representation of the data images and the noise images, performing a first object grabbing operation on the first digital representation to identify all object images thereof, determining a skew angle of a straight line having a predetermined relationship to some objects representative of the essential data images and de-skewing the document by rotating the first digital representation by an amount equal to the magnitude of the skew angle, creating an object list of all object images of the de-skewed first digital representation, identifying a portion of the de-skewed first digital representation corresponding to a picture region of the document, producing a reduced-resolution representation of the de-skewed first digital representation and performing a second object grabbing operation on the reduced-resolution representation, identifying objects of the reduced-resolution representation representing essential data images of the document and marking the identified objects as data objects, and constructing the cleaned-up digital image of the document by performing a logical ANDing operation between the picture region and the de-skewed first digital representation to eliminate all objects outside of the picture region, and combining the objects in the picture region and the marked data objects to provide the cleaned-up digital image.

The straight line can have the predetermined relationship to a plurality of text objects in a row of text objects, or to a plurality of geometric objects identified by vectorizing objects larger than a predetermined size, wherein near-horizontal lines and near-vertical lines of the vectorized objects are identified, and a value of the skew angle is selected which minimizes the mean-square deviation of the near-horizontal and near-vertical lines from orthogonality.

The row of text objects can be "built" by successively adding any closest nearby text object to either end of a row initially including a first text object. The picture region can be identified by performing a third object-grabbing operation at a predetermined level of reduced resolution of the de-skewed first digital representation, and converting any large, dense objects obtained by the third object-grabbing operation into a picture region and including the picture region in the empty mask file. The identifying of objects of the reduced-resolution representation of essential data images can include obtaining the reduced-resolution image of the de-skewed first digital representation at a level of reduced resolution suitable for identifying text objects, and performing a fourth object-grabbing operation on that reduced-resolution image, forming a row of text including text objects near to each other and having heights within a predetermined range, and marking all unmarked object images of the list within the row as data objects, including identifying the object images of the list which are geometric objects and marking them as data objects. The identifying of geometric objects can include identifying whole geometric objects by getting a next object image having a size greater than a predetermined text size, and, if the next object image has a low density below a predetermined value, performing a neural network operation to determine if the next object image is a whole geometry object, and, if the neural network operation determines that the next object image is a whole geometry object, marking the next object image as a data object. However, if the next object image has both a high density greater than a predetermined value and an aspect ratio greater than a predetermined aspect ratio, a neural network operation is performed to determine if the next object image is a whole geometry object, and if it is, marking the next object as a data object. The identifying of geometric objects can include identifying broken geometry objects by performing a quad tree operation on all object images not previously identified as either text objects or geometric objects to identify a non-marked object, and repeatedly identifying any nearby non-marked objects of similar shape, to attempt to extend a pattern of similar non-marked objects in opposite directions from the non-marked object, and marking all objects included in the pattern as data objects.

In one embodiment the invention provides a method and apparatus for removing noise from a first digital representation of data images and noise images of a document, including digitally scanning the document so as to produce the first digital representation of all the images of the document, including the data images and the noise images, identifying a portion of the first digital representation that corresponds to data areas of the document which in combination contain all of the data images, logically ANDing the portion with the first digital representation to in effect mask a second digital representation of the data areas from a third digital representation of the noise images located outside of the data areas, and eliminating the third digital representation of the noise images located outside of the data areas from the first digital representation to provide a fourth digital representation of data images and noise images located within the data areas.

BRIEF DESCRIPTION OF THE DRAWINGS

FIG. 20 is a flow chart of a routine called by the program of FIG. 9 to identify geometric objects and mark them as data.

FIGS. 24A–E and 25A–E constitute diagrams of portions of images representing scanned digital images of two scanned documents, respectively, and superimposed data regions determined in accordance with the present invention, to aid in the description of the various flow charts.

DETAILED DESCRIPTION OF THE PREFERRED EMBODIMENTS

Figure 1:
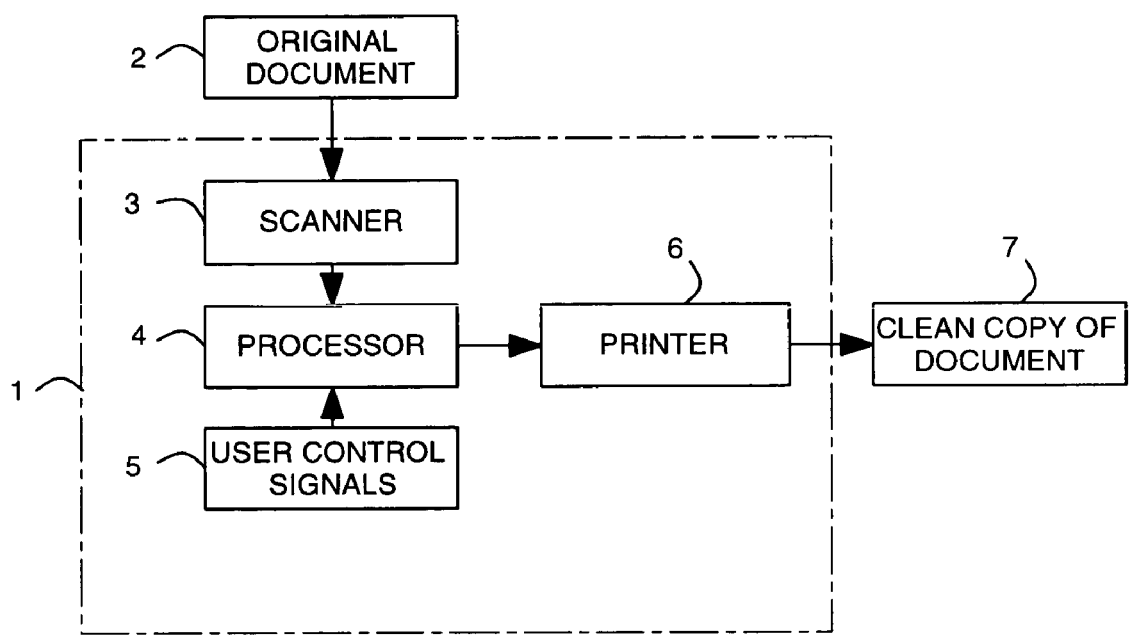
FIG. 1 is a simplified block diagram of one embodiment of a digital copier according to the present invention.

Referring to FIG. 1, a digital copier 1 includes a digital scanner 3 which scans an original document 2. The digital scanning process produces "true" image data which is fed into a processor 4. The true image data includes both "desired" or "essential" image information and extraneous "noise" image information. Processor 4 is coupled to a printer 6 which prints a copy of the document. Processor 4 stores and executes conventional image processing software that is well known in the art, to thereby produce an accurate digital representation of every image on the scanned document.

In accordance with the present invention, processor 4 also processes the image data to reduce the amount of noise and skew present in the digital representation of the scanned document to provide a "clean" digital representation of the desired essential image to printer 6, or to any other suitable utilization device (such as a modem, a "fax adapter" of the type that automatically cleans up transmitted fax images before they are processed by a receiving fax machine, a display screen, a data storage system, or a digital bus system coupled to a processor or the like).

The document clean-up process performed by processor 4 includes recognizing the essential or desired data elements of the image scanned from the document. One embodiment of the clean-up process includes partitioning the digital representation of the document into "data regions" (also called "data areas") and "non-data regions". The "data regions" correspond to the areas on the document containing text or geometric representations that must be preserved and to the corresponding portion of the digital representations of the document. The "non-data" regions contain only noise which should be eliminated from the digital representation of the image of the scanned document before it is reproduced, for example by a printer. Processor 4 applies different "clean-up" methods to the data regions and non-data regions.

A presently preferred embodiment includes providing an object list of all objects on the document and marked as data objects which are outside of picture regions, identifying text objects and geometric objects and marking them as data objects, and then reconstructing a digital representation of the document from the objects of the object list marked as data and from the objects in the picture regions, if any are present.

As subsequently explained in more detail, a feature of the proposed system and method is that they are primarily based on the detection and recognition of essential data objects on the scanned document, rather than on detection of noise features thereon. The process thus involves recognizing meaningful features in the scanned image data and deleting everything else from the digital representation of the scanned image. That is, when all meaningful data objects and features have been detected and marked as data objects, the scanned document can be reconstructed therefrom, and the remaining objects constitute noise, and are omitted from the reconstructed digital representation of the scanned image.

The following description refers to FIGS. 2–23A and FIGS. 27–30 to explain the invention. FIGS. 24A–E, FIGS. 25A–E, and FIGS. 26A–B are examples of how several different kinds of documents are "cleaned up" by the program of FIGS. 2–30.

Figure 2:
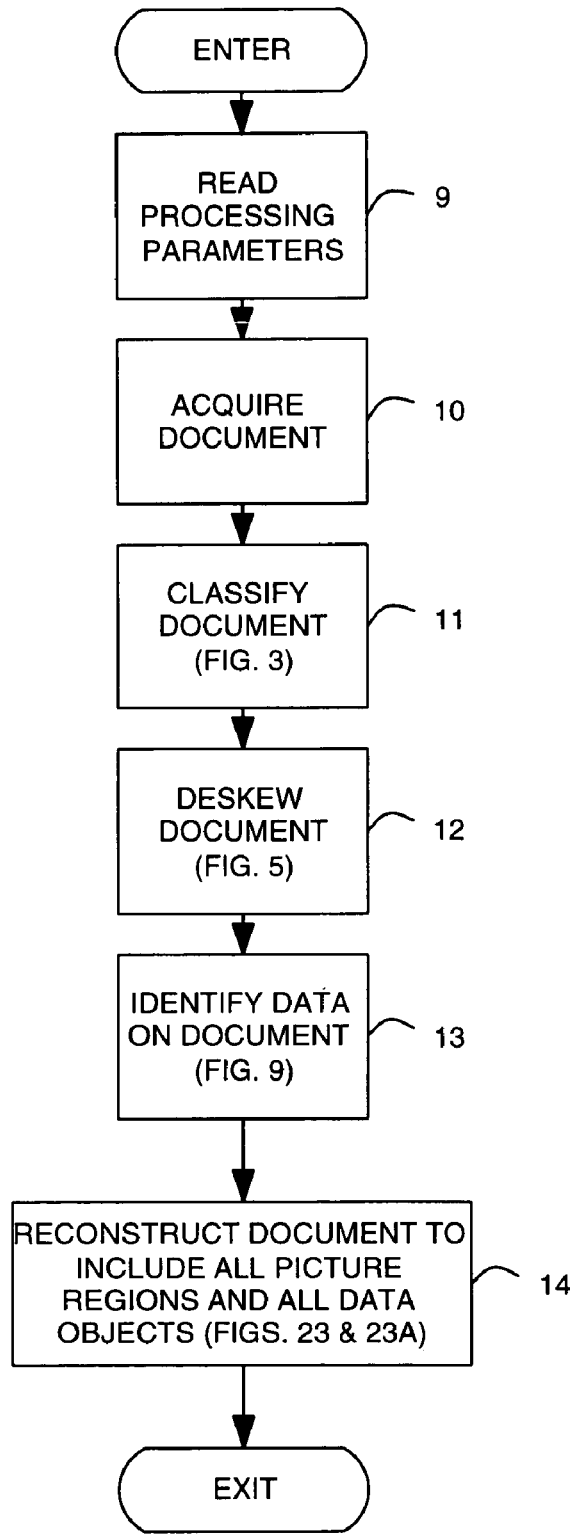
FIG. 2 is a top level flow chart of a program executed by the processor shown in FIG. 1 to "clean-up" the digital representation of an image obtained by scanning a document.

Referring to FIG. 2, a simplified flow chart of the image clean up algorithm of the present invention indicates, in block 9, operating the system 1 of FIG. 1 to perform a conventional initialization of the system, for example by reading any stored processing parameters not encoded into the system (e.g., tolerances between characters, row heights, row spacings, etc.). Then a conventional digital scanning of a document is performed to "acquire" the document, as indicated in block 10. According to standard practice, this produces a file of serial runlength data including "slices" that each include the length and ending pixel number of each of a successive string of connected dark pixels.

Figure 3:
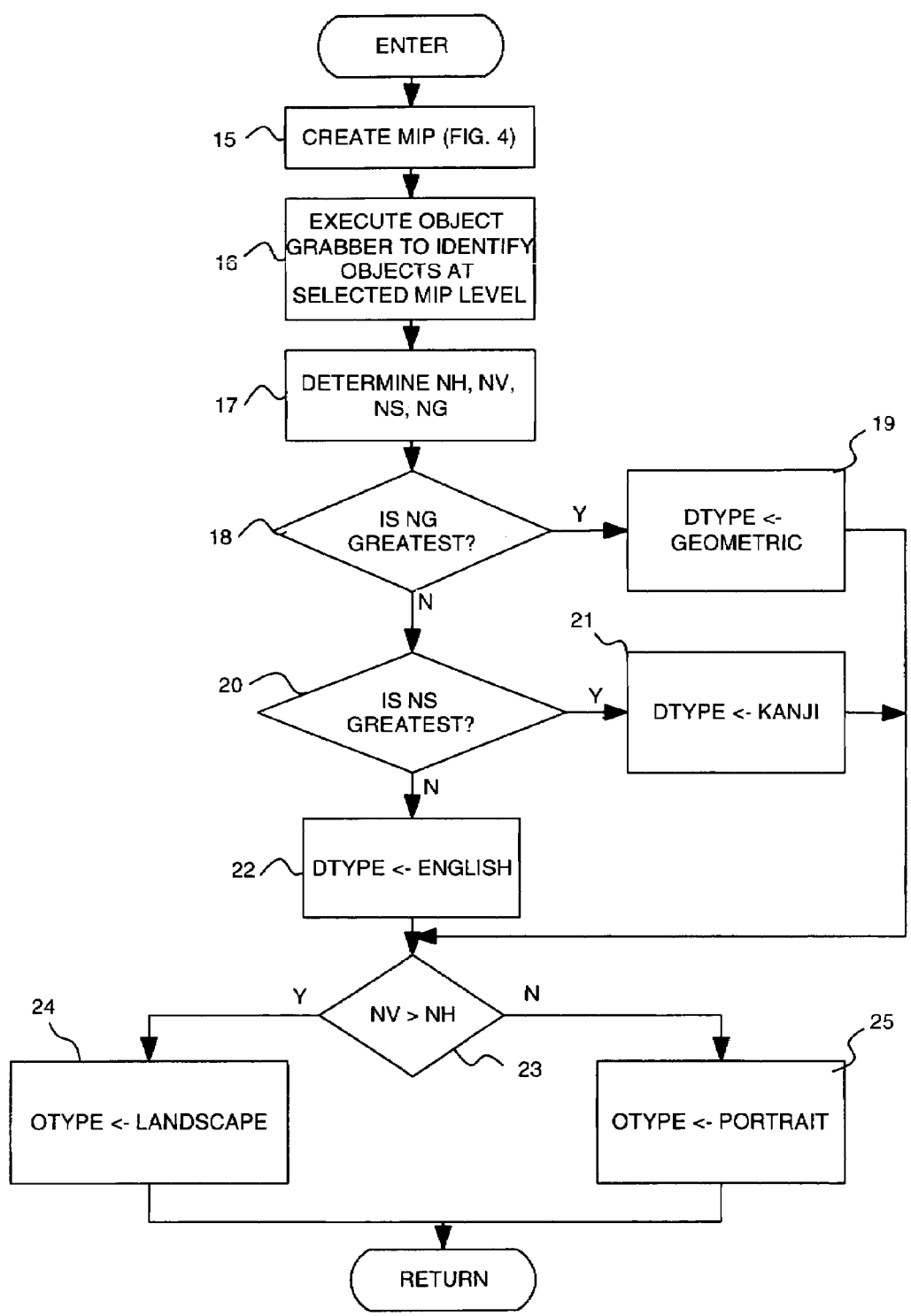
FIG. 3 is a flow chart of a "classify document" routine called by the program of FIG. 2.

In the preferred embodiment of the invention, the program then classifies the document on the basis of the characters and shapes on the document, as indicated in block 11. (For some kinds of documents the classifying operation may be omitted. Also, the classifying operation of block 11 can be performed after, rather than before, the de-skewing operation of block 12. It should be understood that the classifying and de-skewing operations can be independent of each other.) Details of the classifying subroutine are shown in FIG. 3, subsequently described. Note that the classifying of block 11 is performed after the runlength data has been operated on by an "object grabber" program described in detail in commonly assigned U.S. Pat. No. 4,821,336 by Roye, issued Apr. 11, 1989, incorporated herein by reference, and used commercially in a number of the assignee's products.

Next, the clean-up program of FIG. 2 executes a de-skew subroutine, as indicated in block 12. The de-skew procedure is subsequently described in detail with reference to FIG. 5. Then the program goes to block 13 and identifies areas of the document containing image data which must not be lost during the clean-up process. The data identifying subroutine of block 13 is subsequently described in detail with reference to FIG. 9. Finally, the clean-up program of FIG. 2 enters block 14 and, for picture objects if there are any, deletes scanned image information not located within previously identified picture regions, and/or reconstructs a low noise digital representation of the document from objects of the object list (outside of any picture regions) which have been identified as data objects, according to the subsequently described subroutine of FIG. 23.

Briefly, the subroutine of block 11 "classifies" the document according to the aspect ratios of the characters therein. If the heights of most of the words or characters are substantially greater than their widths, the document is classified as "landscape". If the widths of most of the words or characters are substantially greater than their heights, the document is classified as "portrait". If the heights and widths of objects are similar, they can be classified as Kanji characters. A "Kanji" character refers to any writing system with square, multi-part characters, whereas "English" characters refer to Roman-type alphabet characters.

In order to classify characters (or perform other object-based operations subsequently described herein), a plurality of "MIP" images ("multum in parvo images") of the reduced resolution of original scanned image are created. An MIP image of a n by n image at a specific "level" of reduction k is a derived image of size $n/(2^k)$ by $n/(2^k)$ obtained by subdividing the image into disjoint $2^k$ by $2^k$ "tiles", with each tile in the original image corresponding to one pixel in the derived image. Each pixel in the derived image is set to a value of "1" if and only if any pixel in the corresponding tile of the original image is set to "1". Otherwise, pixels in the derived image are set to a "0". The digital image of the originally scanned document is the "level 0" image. The reduced-resolution image obtained by the above subdividing and pixel-setting process is the "level 1" image. The "level 2" reduced-resolution image is obtained by repeating the subdividing and pixel-setting process on the level 1 image. Higher level reduced-resolution images are obtained similarly. The "level" of reduction in resolution achieved by the above MIP process is selected appropriately to convert English characters or words or Kanji characters into connected objects using the above mentioned "object grabber" technique. The MIP level that is most suitable may vary with the type and resolution of the original image, and may be automatically determined by performing the MIP operation of resolution reduction one level a time, stopping when there is a sudden decline in the number of connected objects in the reduced resolution image.

Figure 4:
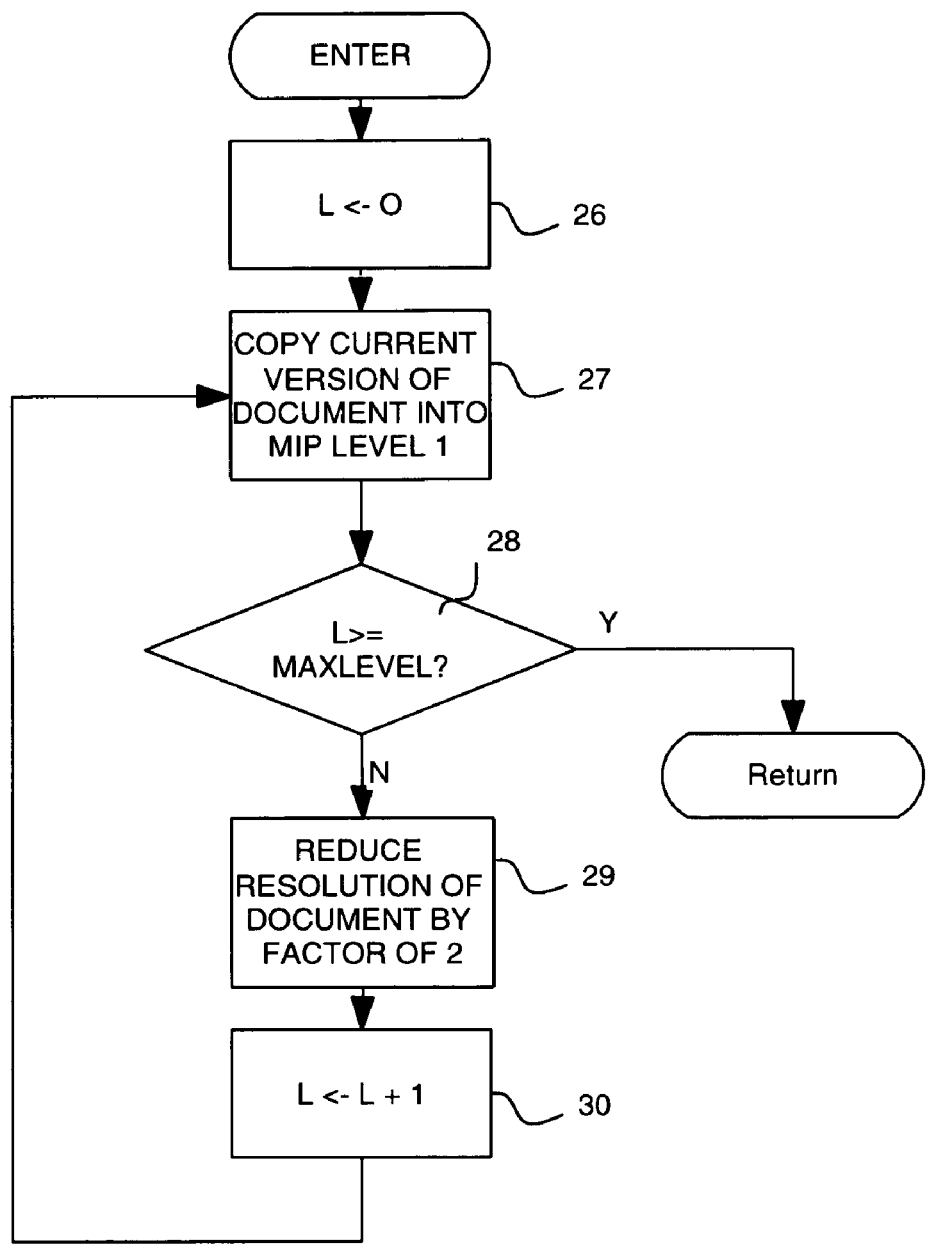
FIG. 4 is a flow chart of a routine called by the program of FIG. 3 to create reduced-resolution MIP level images.

The "classify document" subroutine of block 11 in FIG. 2 is shown in detail in the subroutine of FIG. 3, in which the subroutine enters block 15 and calls the subroutine of FIG. 4 to create an MIP map image, which includes a multi-level representation of the scanned document. MIP map levels 0, 2, and 3 are the ones that so far have been found most useful in identifying objects. The subroutine of FIG. 4 constitutes a loop in which, for each pass through the loop, the resolution of the next MIP level map is reduced by a factor of 2. This is accomplished by converting each four pixels of a particular MIP level map to one pixel of the next higher MIP level map, that one pixel being set to a "1" if any of the four original pixels is a "1", but otherwise the one pixel is set to a "0".

Referring to FIG. 4, the "create MIP image" subroutine enters block 26 and sets a level variable L to 0, and then goes to block 27 and copies the current version of the document image as scanned into a file called "MIP level L". The program then goes to decision block 28 and determines if the MIP level variable L is greater than or equal to the maximum MIP level to be used. If that determination is affirmative, the program returns to block 16 of FIG. 3. If the determination is negative, the program goes to block 29 and reduces the resolution of the document image of MIP level L=0 by a factor of 2, by setting each pixel of the level L=0 image to a "1" if and only if any pixel of the corresponding two-by-two tile in the image prior to the reduction is a "0". The program then enters block 30 and increments L by 1, and copies the reduced resolution document into an MIP L+1 file or data structure, and repeats the foregoing loop until L exceeds the maximum MIP level needed, which typically would be L=3.

The program then goes to block 16 of FIG. 3 and executes a program described in above mentioned commonly assigned U.S. Pat. No. 4,821,336 by Roye, referred to herein as an "object grabber", to process all of the runlength data in the MIP level created according to block 15 which constitutes connected runlengths. The MIP level 2 image may be the one most effective for this purpose.

The object grabber program obtains serial runlength data from the various MIP images obtained by scanning the images including "slices" that each include the length and an ending pixel number of the successive string of connected dark pixels (i.e, those having a "1" value). The runlength data is operated upon, line-by-line, by a decision tree classifier that creates a software "object" including a first linked list of a number of further linked lists each of which contains all of the slices of the simple shape of the image. The slices of the object are entered into a "frame" in the same order in which they are scanned and are "filtered" to delete insignificant horizontal and vertical gaps between slices. The slopes of edges of the shapes are tested for linearity to determine which shapes can be representative trapezoids that can be represented by four corner points and which must be represented as irregular blobs containing all of their slices. The resulting greatly compacted frame data representing the object is fit into a decision tree classifier that recognizes and assigns identifiers to divergences, convergences, and open ends of the object and creates a new linked list of linked lists representing the object in the form of blob records, trapezoid records, divergence records, and convergence records which then can be conveniently used in subsequent vectorization operations without the need to scan and recognize data representing the object.

In block 16 of FIG. 3 the program also identifies the various "grabbed" objects as "horizontal", "vertical", "square", or "geometric" and determines the numbers nh, nv, ns, and ng of each.

Still referring to FIG. 3, the "classify document" program then goes to block 17 and determines the number nh of horizontal objects, the number nv of vertical objects, the number ns of square objects, and the number ng of geometric objects. (The "identify objects" process of block 16 results in the height, width, and density of each object being known.) In block 17, objects whose width is greater than their height are referred to as horizontal, those whose height is greater than their width are referred to as vertical.

In accordance with a preferred embodiment, objects are identified as "picture regions", "text objects", or "geometric objects". Geometric objects are treated differently than picture regions in the sense that some geometric objects, such as a horizontal line or a vertical line, have an extreme aspect ratio and high density, and other geometric objects such as a diagonal line or polyline have a non-extreme aspect ratio and low density. Ordinarily a picture object or picture region will not have an extreme aspect ratio. For example, the bounding rectangle of a vertical line or a horizontal line will contain all "1" pixels, i.e., will have a high density. In accordance with the presently preferred embodiment of the invention, once an object is identified as a picture object, no further processing is performed on any portions thereof, whereas for a geometric object, such as a circle, triangle, or the like, there may be small noise objects therein which may be removable by further post-processing.

The program then goes to decision block 18 of FIG. 3 and determines if ng is the largest number, and if so, goes to block 19 and sets a variable dType to indicate that most of the objects are geometric. Otherwise, the program goes to decision block 20 and determines if ns is the largest number, and if that is the case, the program goes to block 21 and sets a variable dType to indicate that most of the characters are Kanji characters. Otherwise, the program goes to block 22 and sets a variable dType to indicate that most of the characters are English characters.

It is expected that as the invention is further developed, it will be advantageous to further evaluate both geometric objects and text objects in parallel before determining whether to classify the document as mainly text objects or mainly geometric objects.

In any case, the program goes to decision block 23 and determines if nv is greater than nh, that is, if the number of vertical objects exceeds the number of horizontal objects. If this determination is affirmative, the program goes to block 24 and sets a variable oType to indicate that the document is a "landscape" document. If the determination of decision block 23 is negative, the program goes to block 25 and sets the variable oType to indicate that the document is a "portrait" document. In any case, the program then returns to block 12 of FIG. 2.

Figure 5:
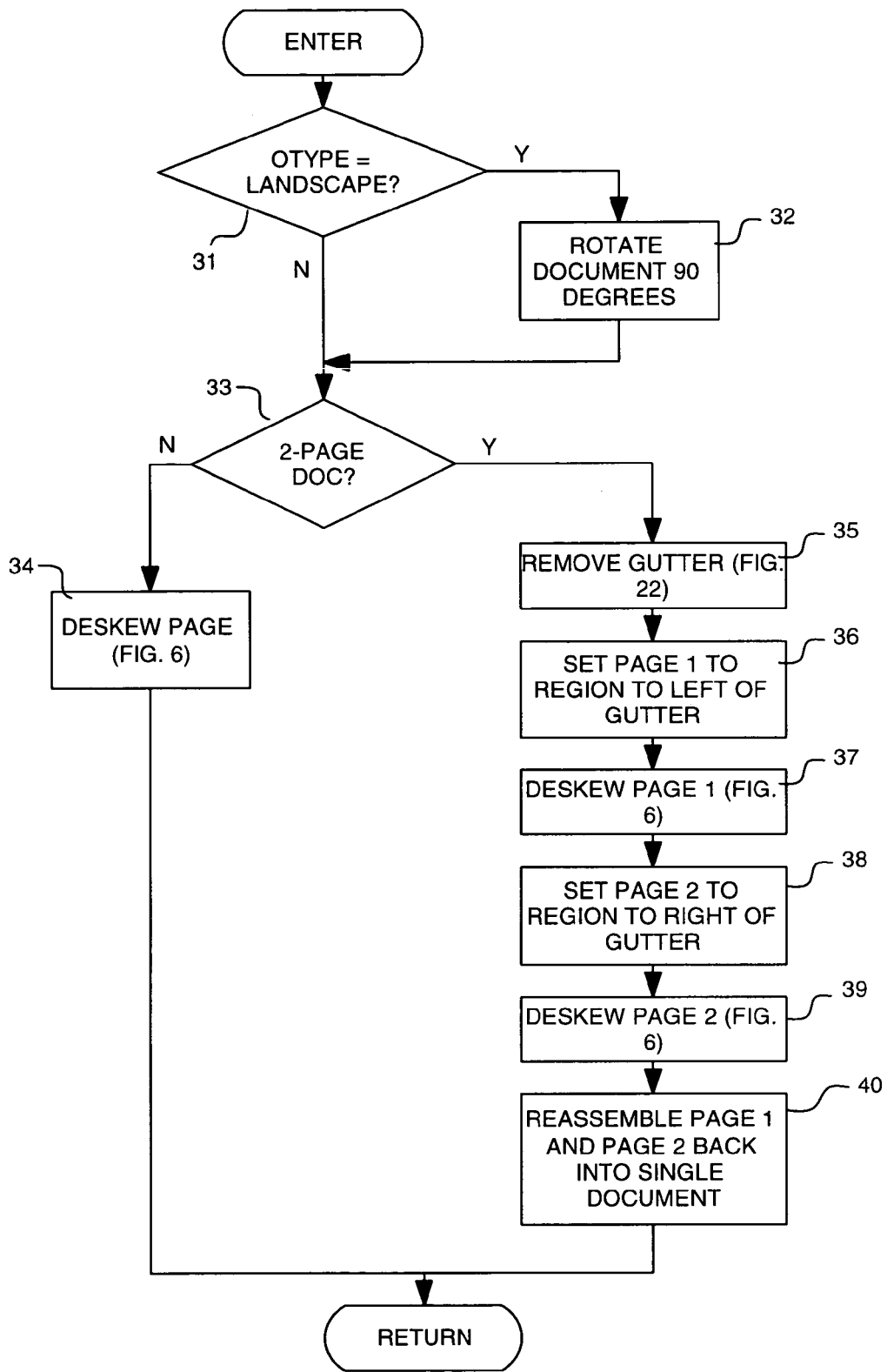
FIG. 5 is a flow chart of a "de-skew document" routine called by the program of FIG. 2.

In block 12 the clean-up program executes a de-skew subroutine, shown in detail in FIG. 5. Referring to FIG. 5, the de-skew subroutine enters decision block 31 and determines if the variable oType is set to indicate a "landscape" type of document. If this determination is affirmative, the program goes to block 32 and rotates all of the image data by 90 degrees. In any case, the program then goes to decision block 33 and determines if the document is a two page document. If this determination is negative, the algorithm goes to block 34 and de-skews the present page.

Figure 6:
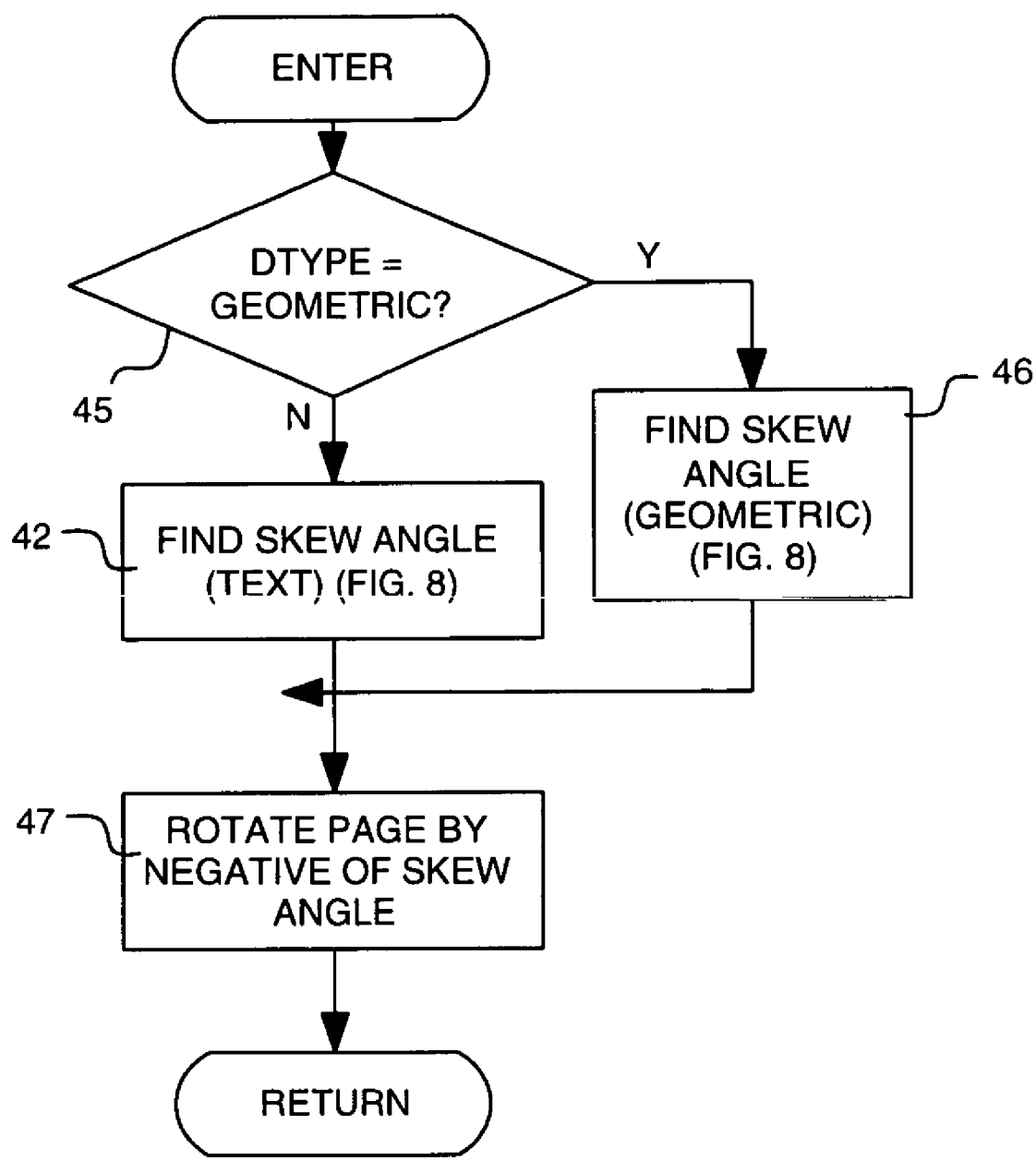
FIG. 6 is a flow chart of a "de-skew page" routine called by the program of FIG. 5.

In order to de-skew the present page of the document in block 34, the program of FIG. 5 calls the de-skew subroutine of FIG. 6, enters decision block 45 thereof, and determines if dType is set to indicate the object is classified as "geometric". If this determination is affirmative, the program executes the skew angle subroutine of FIG. 8 to determine the appropriate skew angle and then enters block 47 and rotates the image data of the current page by the negative of the skew angle, and then returns to block 34 of FIG. 5, or returns to any of the other blocks 37 or 39 of FIG. 5 which called up the subroutine of FIG. 6.

Figure 7:
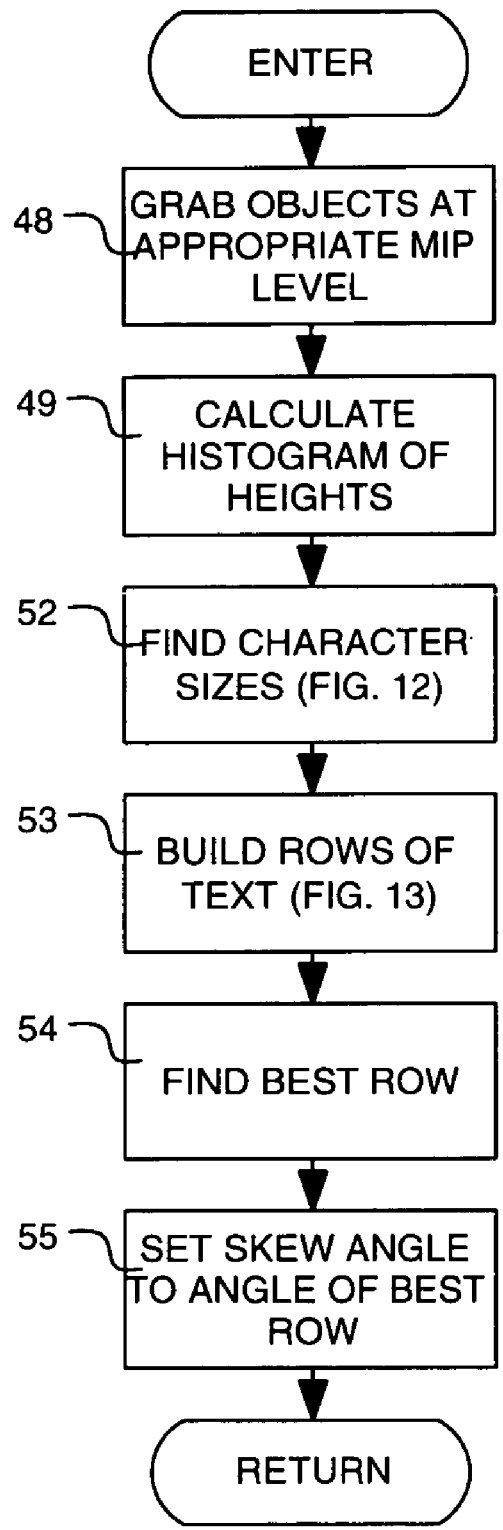
FIG. 7 is a flow chart of a routine called by the program of FIG. 6 to find the skew angle of text document.

If dType is not set to "geometric", the subroutine of FIG. 6 goes to block 42 and calls the skew angle subroutine of FIG. 7, and then goes to block 47 and rotates the page by the negative of the skew angle and then returns to the calling block of the "de-skew document" subroutine of FIG. 5.

The skew angle subroutine of FIG. 7 determines the skew angle for a document classified as text. The subroutine of FIG. 7 first enters block 48 and executes the above mentioned object grabber program to build objects at the appropriate MIP level, which may be MIP level 2. In order to "build" rows which include text as subsequently described with reference to block 53 of FIG. 5 and also with reference to FIG. 13, it often is advantageous to use English text objects grabbed from MIP level 0 by the object grabber program and to use Kanji text objects grabbed from MIP level 2 by the object grabber program. As also explained subsequently, after the rows are built from objects grabbed from a higher MIP level image, when objects are marked as data objects it is the object images which were grabbed from the original MIP level 0 de-skewed digital representation of the scanned document and are within the built rows that actually are marked as data objects. The skew angle subroutine of FIG. 7 then goes to block 49 and computes a histogram of the heights of all objects found by the object grabber program executed in block 48. The skew angle subroutine of FIG. 7 then goes to block 52 and calls the subroutine of FIG. 12 to determine the character sizes. The subroutine then goes to block 53 calls the subroutine of FIG. 13 to build rows of text.

"Building" rows of text can be described as generating horizontal, increasingly elongated imaginary rectangles around individual rows as they are built, by adding characters that are sufficiently close to the previous character added to the row and extending such imaginary rectangles just enough to enclose the characters as they are added. The skew angle subroutine of FIG. 7 then goes to block 54 and finds the "best" row, which is the row that is both sufficiently long (according to a preset criteria) and has the least intra-row variation. Block 54 involves finding the best row by finding the one with the most characters that line up with a particular line. That is, they are centered about a line which is the "best" line, i.e., the longest straight line which is centered with respect to the largest characters of the correct type. In the case of a tie, the longest line wins. The skew angle subroutine of FIG. 7 then goes to block 55 and calculates the skew angle for the present text page, and then returns to block 42 of FIG. 6 and goes from there to block 47 and eliminates the skew from the current image of the document by rotating the image by the negative of the skew angle. (It should be appreciated that the determining of the appropriate MIP level representation of the document for a particular purpose is a function of the number of dots per inch (DPI) produced by the digital scanner used.)

Figure 8:
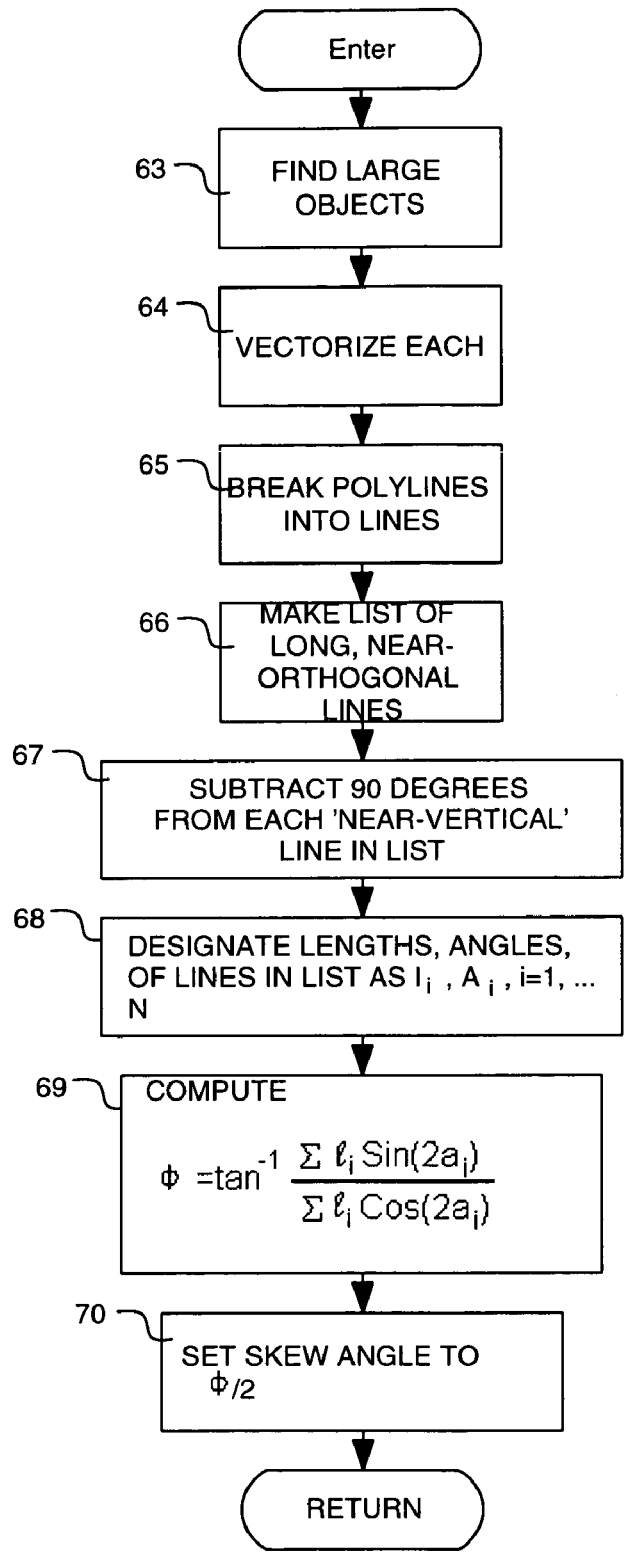
FIG. 8 is a flow chart of a routine called by the program of FIG. 6 to find the skew angle of a geometric document.

The skew angle subroutine of FIG. 8 referred to in block 46 of FIG. 6 determines the skew angle for a document classified as "geometric". First, the subroutine of FIG. 8 enters block 63 and builds "large" objects (in the sense of having large widths or large heights), using the above described object grabber program. The subroutine of FIG. 8 then goes to block 64 and vectorizes each large object, executing the assignee's commercially available vectorization program which is described in detail in commonly assigned U.S. Pat. No. 4,817,187 (Lien, issued Mar. 28, 1989), incorporated herein by reference. The subroutine of FIG. 8 then goes to block 65 and breaks polylines into lines according to the technique described in above mentioned U.S. Pat. No. 4,817,187. The subroutine of FIG. 8 then goes to block 66 and constructs a list of long, near-orthogonal lines. The subroutine then goes to block 67 and subtracts 90 degrees from the angle of each "near-vertical" line in the list constructed in block 66. The subroutine then goes to block 68 and designates lengths and angles of lines in the list of block 66 as $1_i$, $a_i$, where I=1, 2, . . . n. The subroutine then goes to block 69 and computes the skew angle according to the formula $$\phi = \tan^{-1} \frac{\sum 1_i \sin(2a_i)}{\sum 1_i \cos(2a_i)}.$$

The expression for $\phi$ selects a value of $\phi$ which minimizes the mean-squared deviation of all of the nearly vertical and nearly horizontal lines from being perfectly vertical and perfectly horizontal, respectively.

The subroutine of FIG. 8 then goes to block 70 and sets the skew angle to $\phi/2$, and then returns to block 47 of FIG. 6, rotates the image of the scanned page of the negative of $\phi$ to eliminate the skew, and returns to the calling point (block 34, 37, or 39) of the de-skew document routine of FIG. 5.

It is expected that has the invention is further developed, it will be advantageous to evaluate the accuracy of both skew angles based on geometric objects and skewed angles based on text objects "in parallel" before determining which skew angle to actually use in de-skewing the document. The cumulative "mass" of all text objects and the cumulative mass of all geometric objects would be important considerations in determining which of the number of skew angles would be most accurate for de-skewing the document.

Referring to FIG. 5, if the determination of decision block 33 is that the document is a two page document, the program goes to block 35 and removes the image of the "gutter". The gutter is an image such as the one designated by reference numeral 157 in subsequently described FIG. 25A, which appears between two pages of a book when they are placed on the glass platen of a digital copier. The program of FIG. 5 then goes to block 36 and sets the first page of the two-page document to correspond to a region to the left of the removed gutter image 157 (FIG. 25A), and then goes to block 37 and calls up the above described de-skew subroutine of FIG. 6 and de-skews the first page. The program of FIG. 5 then goes to block 38 and sets the second page of the two page document to correspond to the page to the right of gutter image 157, goes to block 39 and calls up the de-skew subroutine of FIG. 6, and de-skews the second page. The program of FIG. 5 then goes to block 40 and reassembles the de-skewed images of the first and second pages into a single image which does not include gutter 157. The program of FIG. 5 then returns to block 13 of FIG. 2.

In block 13 of FIG. 2 the program identifies the data which must not be lost during any of the "clean-up" processing of the document image. More specifically, the program identifies the "data areas" which contain all of the data which must not be lost. To this end, in block 13 the program of FIG. 2 calls the subroutine of FIG. 9.

Figure 9:
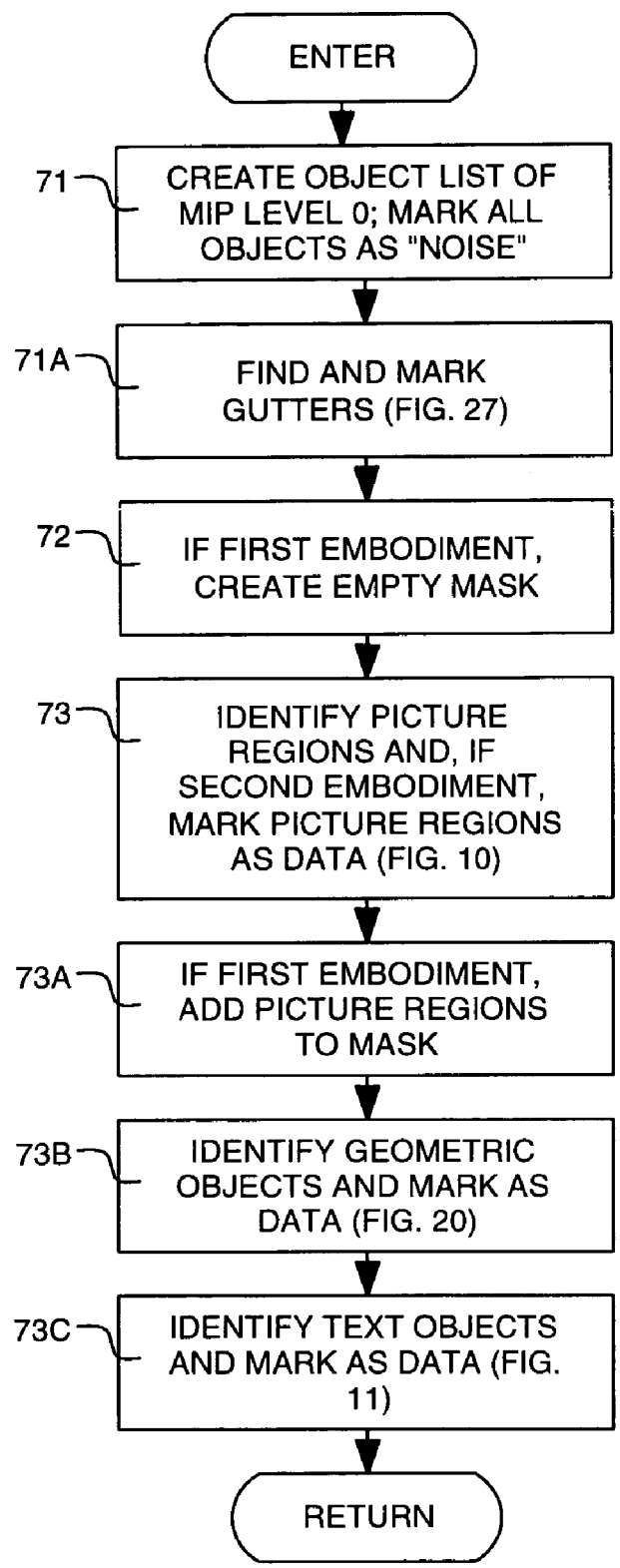
FIG. 9 is a flow chart of an "identify data" called by the program of FIG. 2.

Referring to FIG. 9, the program goes to block 71 and creates an object list of all of the MIP level 0 objects, and then initially sets or "marks" each object as "noise". The program then goes to block 71A, where it finds and marks "gutters" by executing the subroutine in FIG. 27. In a "first embodiment of the invention", the program goes to block 72 and creates an "empty" mask, which consists of polygonal areas that contain "picture objects", also referred to as "picture regions", that must be preserved on the document. In a "second embodiment" of the invention, the program goes directly from block 71 to block 73 and identifies picture regions and also marks them as data. In the first embodiment, the program identifies picture regions in block 73, but does not mark them as data. In block 73, the program identifies the "picture regions" as described in subsequently described in FIG. 10. For either the first embodiment or the second embodiment, the program of FIG. 9 calls the subroutine of FIG. 10 from block 73.

Figure 10:
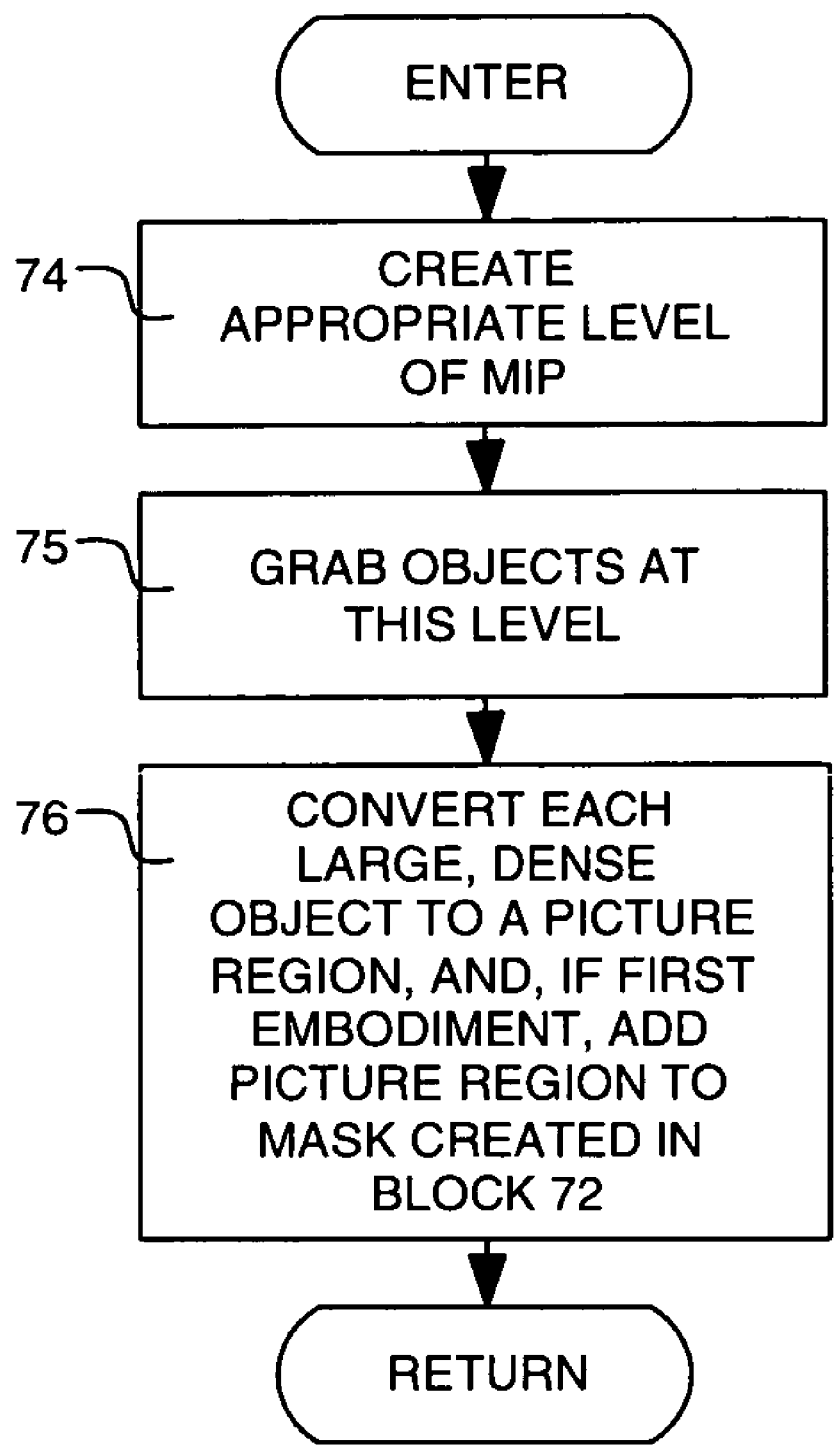
FIG. 10 is a flow chart of than "identify picture region's" called by the program of FIG. 9.

Referring to FIG. 10, the program goes to block 74 and creates an appropriate MIP level, which can be MIP level 2 in the presently preferred embodiment. (The "appropriate" MIP level can be either fixed or dynamic.) This causes half-tone "pictures" to become large, dense objects. The subroutine of FIG. 10 then goes to block 75 and executes the above described object grabber program to grab objects of the digital image at the MIP level established in block 74 in which the half-tone "pictures" have become the large, dense objects at the appropriate MIP level. (It should be appreciated that during the identifying process the appropriate MIP level may be fixed or variable.) All of the data to be preserved falls into one of the three type of regions, picture regions, text regions, or geometry regions. The subroutine of FIG. 10 then goes to block 76 and converts each large, dense object to a picture region. In the first embodiment referred to, the program then adds that region to the mask created in block 72 of FIG. 9, and then returns to block 73 of FIG. 9. In the second embodiment referred to, the program does not add the large, dense objects converted to a picture region in block 76 to the mask created in block 72 of FIG. 9. In either case, the program of FIG. 10 returns to block 73 of FIG. 9.

Referring again to FIG. 9, in the first embodiment referred to, the program goes from block 73 to block 73A and adds the picture regions identified according to block 73 to the mask created according to block 72. However, in the second embodiment referred to, the program goes directly from block 73 to block 73B.

The program of FIG. 9 then goes to block 73B to identify geometric objects and Mark them as data. To accomplish this, the program calls the routine of FIG. 20, subsequently described, and after executing it, returns to block 73B of FIG. 9.

The program of FIG. 9 then goes from block 73B to block 73C to identify text objects and mark them as data. To accomplish this, the program of FIG. 9 identifies text objects or regions by calling the subroutine of FIG. 11.

Figure 11:
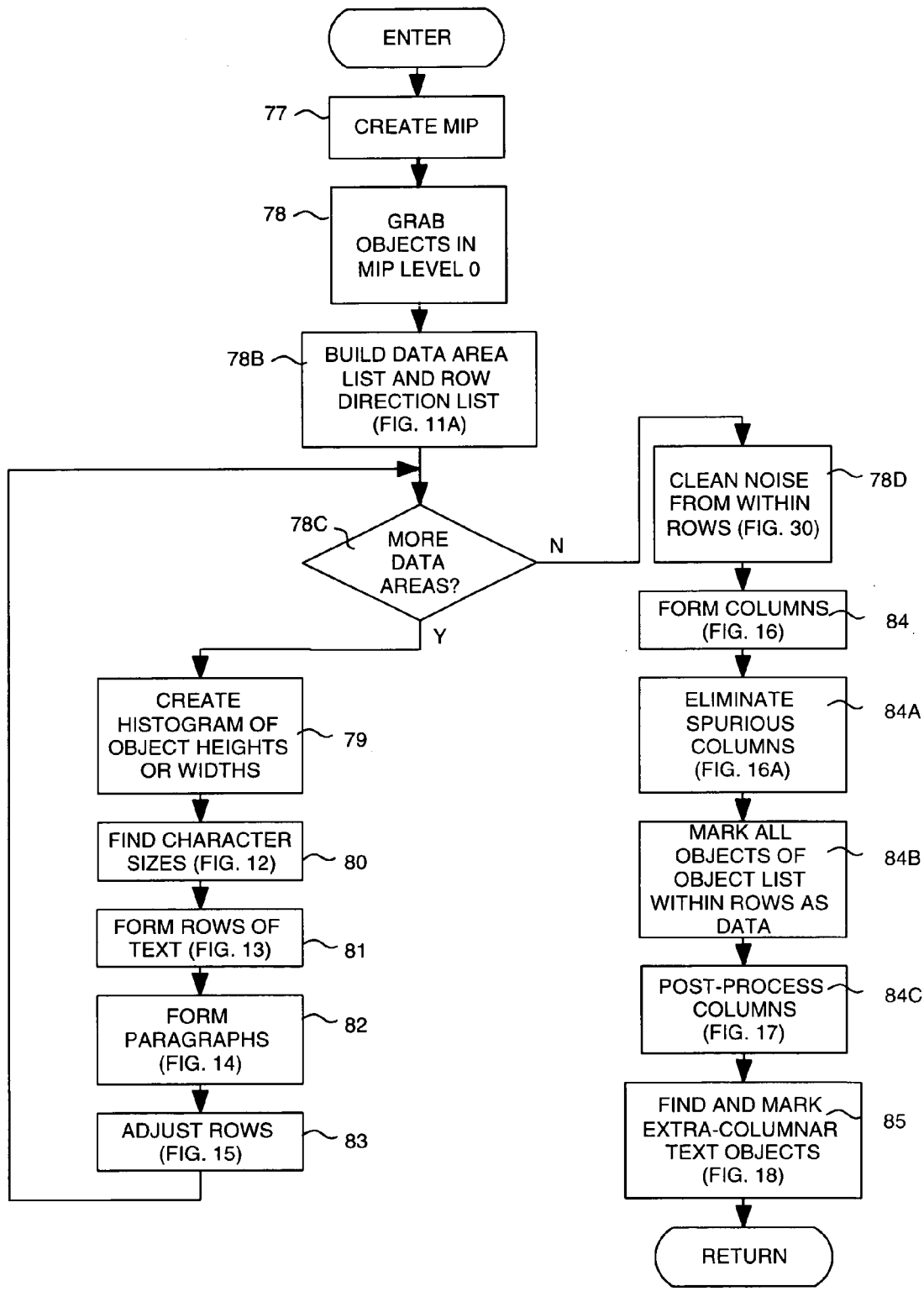
FIG. 11 is a flow chart of a routine called by the program of FIG. 9 to identify text objects and mark them as data.

Referring to FIG. 11, the subroutine goes to block 77 and creates a new appropriate MIP level image of the document, if it has not already been created, appropriate to identifying text regions. The subroutine of FIG. 11 then goes to block 78 and executes the object grabber program to "grab" or build text objects in the MIP image at the MIP level established in block 77. The program then goes to block 78A and executes a program to mark dotted and dashed lines, by calling either the program of FIG. 22 or FIG. 22A. (The programs of FIG. 22 and FIG. 22A are alternative programs which can be utilized to accomplish the purpose of block 78B.)

Figure 22:
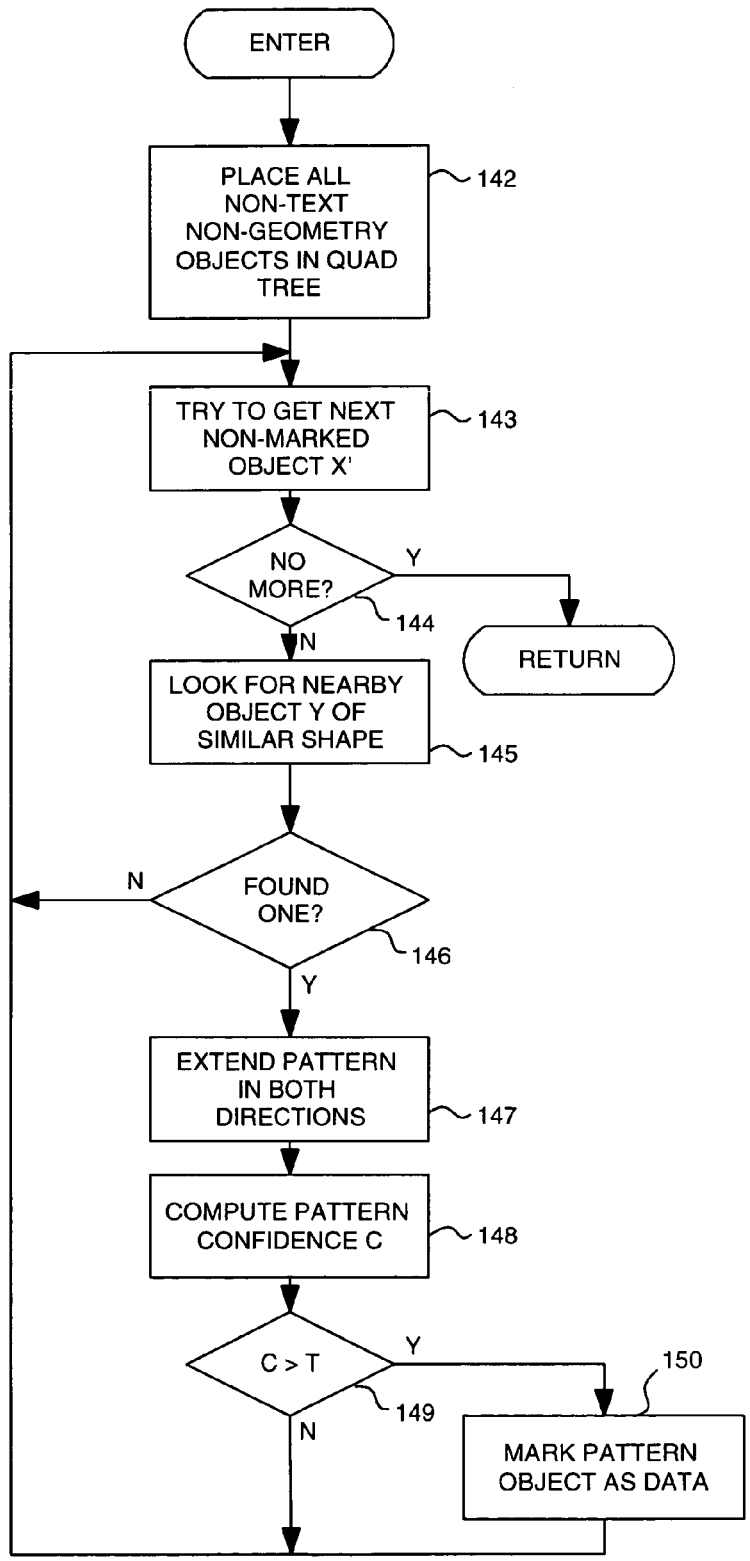
FIG. 22 is a flow chart of a routine called by the program of FIG. 11 to find and mark broken geometry objects.
Figure 22A:
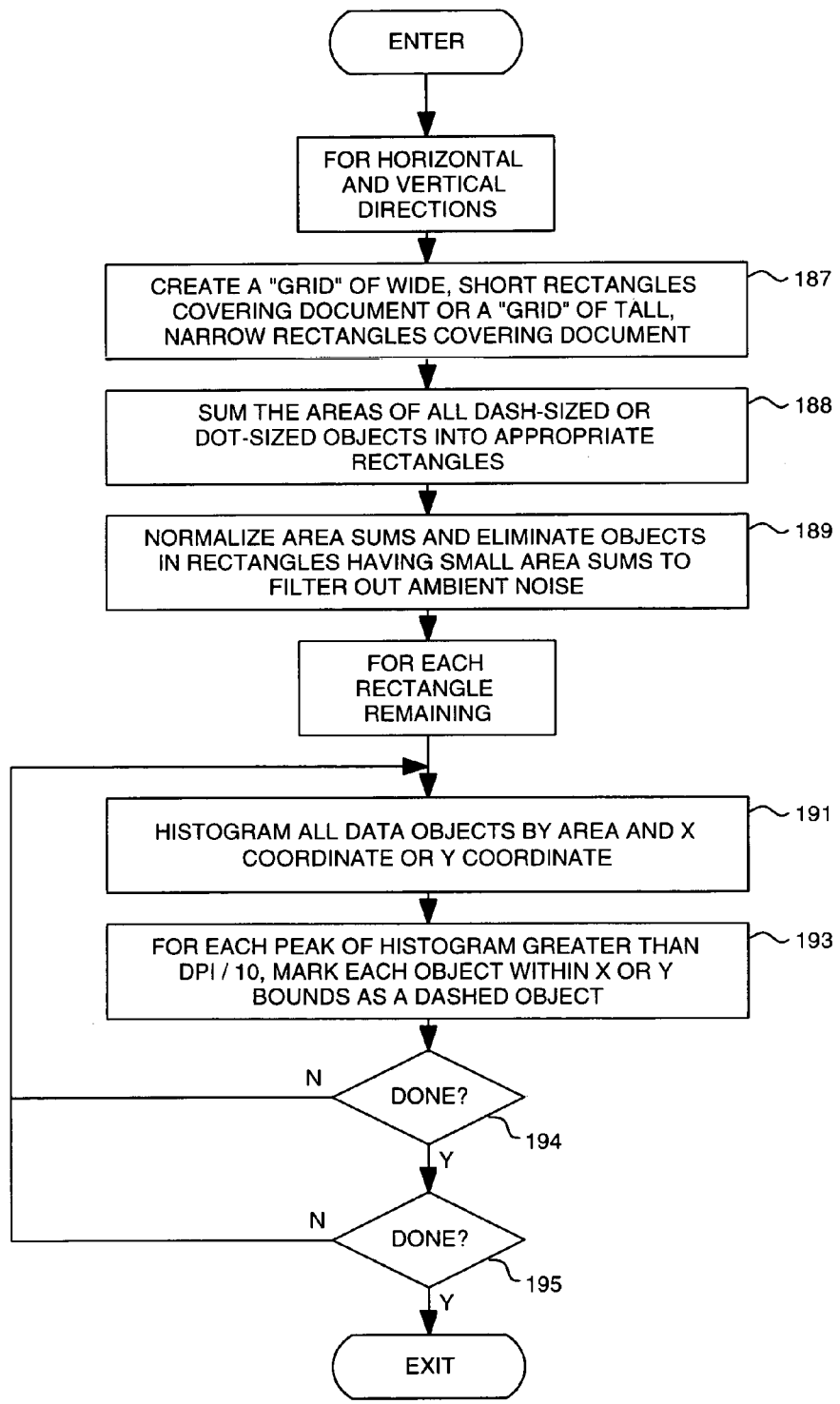
FIG. 22A is a flow chart of a routine called by the program of FIG. 20 to mark objects forming dashed and dotted lines.

Referring next to FIG. 22, the subroutine goes to block 142 and places all non-text, non-geometry objects in a "quad tree", which is a conventional software structure that allows a fast spatial search. A conventional quad tree structure provides a technique for initially placing all objects of interest to be retrieved in the quad tree structure, and then executing an efficient mechanism for entering a query as to whether there are any objects in a particular region and obtaining a fast answer without having to search through a large number of the objects. The purpose of the subroutine of FIG. 22 is to find objects which are components of a broken or dashed line. This means that the objects are small, very similar, and spaced by a certain amount from other like objects, and we don't want things that have already been identified as text. Conventional quad tree algorithms are described in "The Quadtree and Related Hierarchical Data Structures", by H. Samet, Computing Surveys (16), No. 2, June, 1984, pp. 187–260. A suitable conventional quad tree program also is available in several of the assignee's commercially available software products, including the GTX "RASTERCAD" raster-to-vector conversion series of products.

The subroutine of FIG. 22 then goes to block 143 and attempts to obtain any next non-marked object X'. The subroutine of FIG. 22 then goes to decision block 144, and determines if there are no more non-marked objects X'. If there are more, the subroutine of FIG. 22 goes to block 145 and executes the quad tree algorithm to look for any nearby object Y of similar shape to object X' and goes to decision block 146. If none is found, the subroutine of FIG. 22 returns to block 143 and repeats its process, but if a similar-shaped nearby object Y is found, then the subroutine of FIG. 22 goes to block 147 and extends the pattern of growth of the object resulting from adding nearby similar objects in both directions, so as to look for dashed lines, circles, etc.

The subroutine of FIG. 22 then goes to block 148 and computes a pattern confidence level C based on the linearity, similarity of shape, and uniformity of spacing of the non-marked objects X' constituting the pattern. The subroutine of FIG. 22 then goes to decision block 149 and determines if the confidence level C is greater than a preset threshold T. If this is the case, the program goes to block 150 and the pattern of region established in block 147 is marked as data, and in any case the subroutine of FIG. 22 returns to block 143 and repeats its process.

When decision block 144 of FIG. 22 eventually determines that there are no more non-marked objects X', the subroutine of FIG. 22 returns to block 135 of FIG. 20. Note that the above described "Identify Geometric Regions" subroutine referred to in block 73 of FIG. 9 can be applied to objects which constitute ordinary handwriting, although well defined hand printed characters could be identified by the "Identify Text Regions" subroutine referred to in block 72 of FIG. 9.

If block 78A does not call the program of FIG. 22, it instead calls the program of FIG. 22A.

Referring to FIG. 22A, the program creates a sequence or "grid" of adjacent "horizontal windows" over the document, and also creates a sequence or grid of adjacent "vertical windows" over the document. For the horizontal windows or the vertical windows, whichever is presently being processed, the program goes to block 187 and creates a "grid" of either wide, short rectangles or tall, narrow rectangles covering the document.

The program of FIG. 22A uses the rectangles as a tool to isolate data regions from ambient noise regions. Next, the program goes to block 188 and sums up the masses, i.e., areas, of all dash-sized or dot-sized objects within the various wide, short rectangles or tall, narrow rectangles. The purpose of that is to provide a way of separating small-area noise objects from much larger dot-sized objects or much larger dash-sized objects. To this end, the program then goes to block 189 and normalizes the sum of all of the objects in each rectangle in order to find those rectangles which appear to contain data in the form of dot-sized objects or dash-sized objects. The program accomplishes this by eliminating from further processing each rectangle in which the sum of all objects in that rectangle is less than a certain value.

Next, for each rectangle for which the sum of all of the objects contained therein substantially exceeds the ambient noise level, the program of FIG. 22A goes to block 191 and computes a histogram representing all data objects. For each data object, the histogram includes the area (mass) of data object and its associated x coordinator y coordinate, depending on whether a short, wide rectangle grid or a tall, narrow rectangle grid is being processed. Then the program goes to block 192 and determines each peak value in the histograms for which the area (mass) exceeds the DPI (dots per inch) of the object divided by 10. For each such peak, the program marks the corresponding object within the bounds of the histogrammed data as a "dash".

Next, the program of FIG. 22A goes to decision block 194 and determines if all of the histogrammed data comparisons have been completed, and if this has not been accomplished, returns to the entry point of block 191. Otherwise, the program goes to decision block 195 and determines if all horizontal rectangle and all vertical rectangles have been processed. If all horizontal and vertical rectangles have been processed, the program returns to the calling routine, namely block 78A of FIG. 11.

Referring next to FIG. 11, the program then goes to block 78B and builds a "data area list", and also builds a "row direction list". The idea is to identify areas "containing a text paragraph", and to identify the direction of text rows within the text paragraph. The program accomplishes this by calling the routine of FIG. 11A.

Figure 11A:
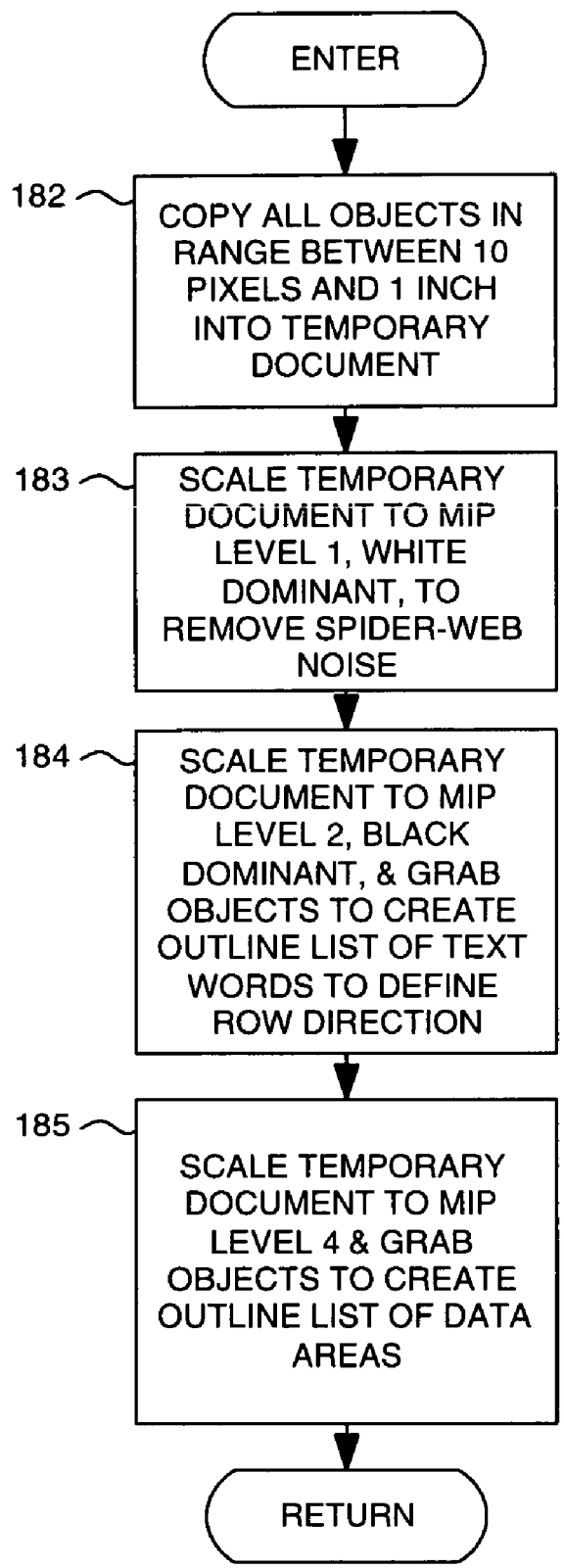
FIG. 11A is a flow chart of a routine called by the program of FIG. 11 to build a data area list and a row direction list.

Referring to FIG. 11A, the program goes to block 182 and "copies" all objects having a height or width in the range between 10 pixels one inch into a "temporary document". The program then "scales" the temporary document to MIP level 1, with "white dominant", to remove spider-Web noise. (The term "white dominant" means that if any pixel of a 4-pixel "tile" is a "0", then the entire tile is represented by a "0".) Next, the program goes to block 184 and scales the temporary document to MIP level 2, with "black dominant", and grabs objects to create an outline list of text words to define the row direction. (The term "black dominant" means that if any pixel of a 4-pixel tile is a "1", then the entire tile is represented by a "1".) Next the program goes to block 185 and scales the temporary document to MIP level 4, and executes the object grabber program to grab objects so as to create an outline list of data areas. The program then returns to block 78B of FIG. 11.

The program then goes to decision block 78C of FIG. 11 and determines if there are any more unprocessed data areas, and if there are, the program goes to block 79. However, if there are no more unprocessed data areas, the program goes to block 78D and calls the routine subsequently described for FIG. 30 to clean noise from within the rows. The program then goes to block 84.

In block 79, the subroutine of FIG. 11 creates a histogram of heights or widths of the objects built in block 78. The subroutine of FIG. 11 then goes to block 80 and determines the character sizes by executing the subroutine of FIG. 12.

Figure 12:
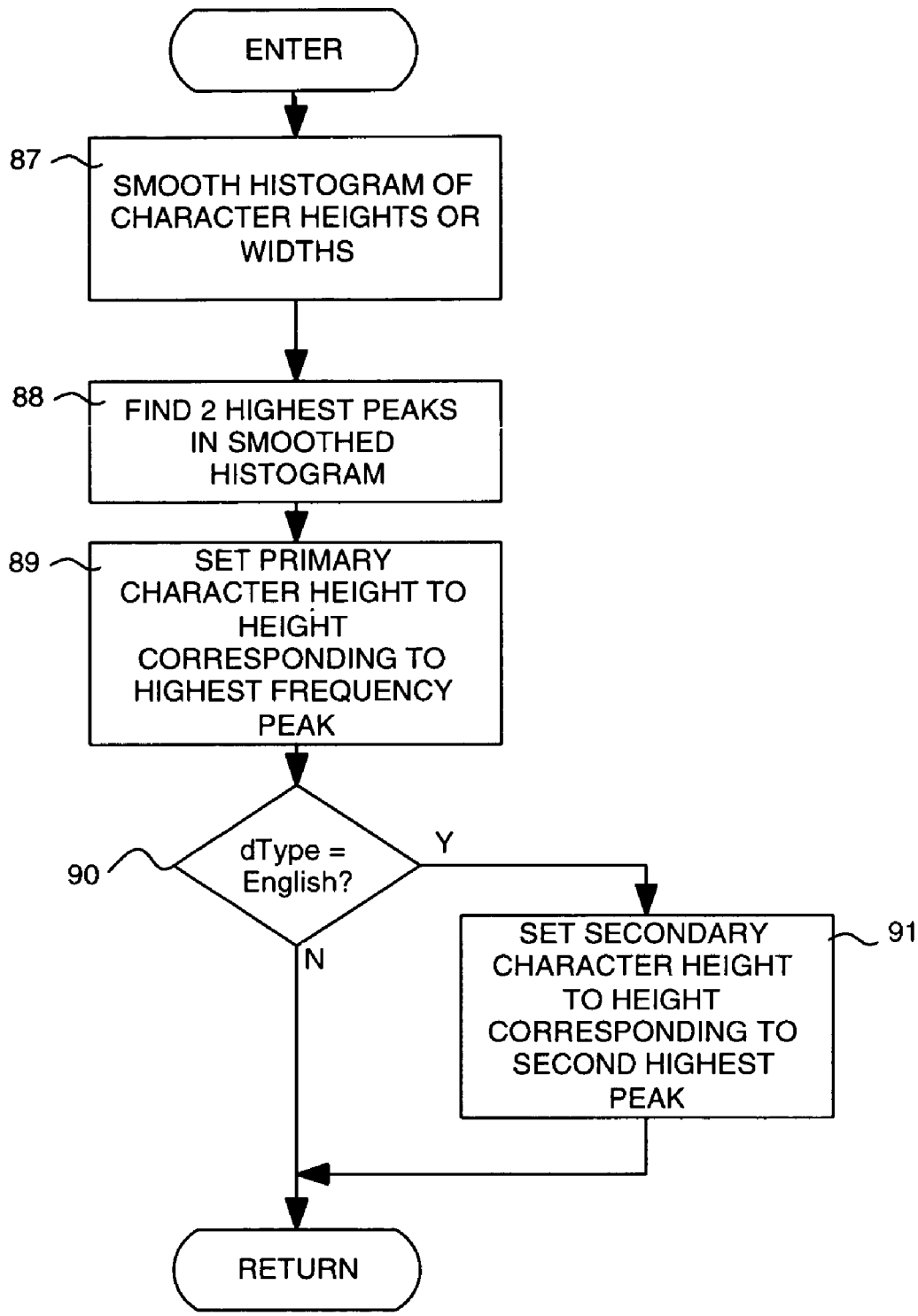
FIG. 12 is a flow chart of a routine called by the programs of FIG. 7 and FIG. 11 to find character sizes.

In FIG. 12, the program goes to block 87 and smooths the histogram of character heights by executing a suitable moving average. The subroutine of FIG. 12 then goes to block 88 and determines the two highest peaks of the smoothed histogram. The subroutine of FIG. 12 then goes to block 89 and sets the "primary character height" to a height corresponding to a peak value which has the highest frequency of occurrence in the smoothed histogram. The subroutine of FIG. 12 then goes to decision block 90 and determines if dType is set to "English", and if so, goes to block 91 and sets a "secondary character height" variable to a height corresponding to the second highest peak in the smoothed histogram. In any case, the subroutine of FIG. 12 then returns to block 80 of FIG. 11, and then goes from there to block 81 and forms rows of text by executing the subroutine of FIG. 13.

Figure 13:
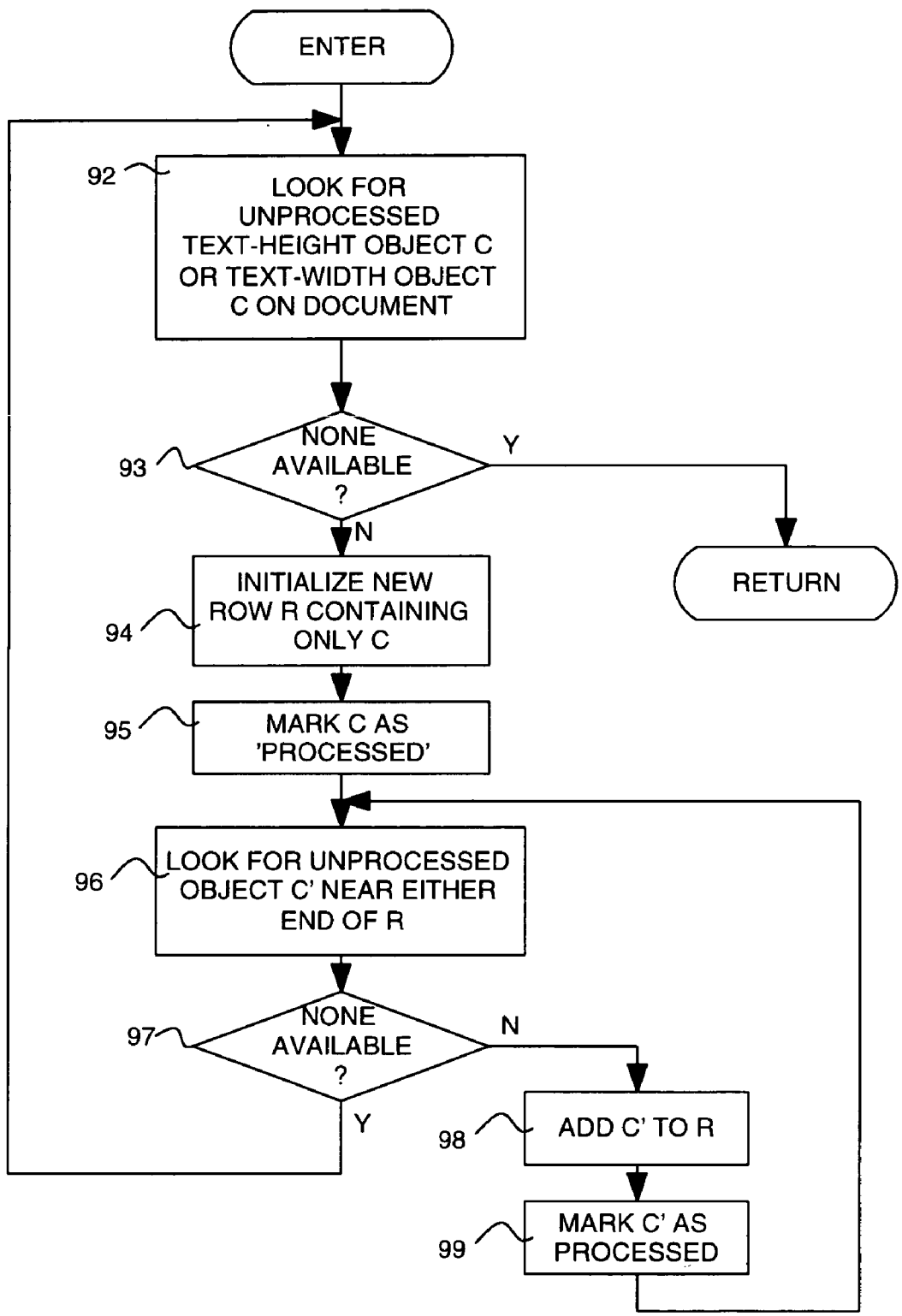
FIG. 13 is a routine called by the programs of FIG. 7 and FIG. 11 to build rows of text.

Referring to the subroutine of FIG. 13, it first enters block 92 and looks for an unprocessed text-height "object C" on the de-skewed document. The subroutine of FIG. 13 then goes to decision block 93 and determines if any such text-height objects C exist in the de-skewed document image, and if none is found, the subroutine of FIG. 13 returns to block 81 of FIG. 11, but otherwise proceeds to block 94 of FIG. 13 and initializes a new row r containing only the text-height object C found in block 92. The subroutine of FIG. 13 then goes to block 95 and marks the text-height object C as "processed". Note that the object C' must be sufficiently close to an already-marked object C or C' in order to be added to either end of the row being built. Occurrence of punctuation also must be used in determining whether certain objects C' should be added to the row being built.

The subroutine of FIG. 13 then goes to block 96 and looks for any unprocessed text-height object C' near either end of row r, and then goes to decision block 97. Decision block 97 determines if any text-height object C' exists at either end of row r, and if none exists, the subroutine of FIG. 13 returns to block 92 and looks for another unprocessed text-height object C and repeats the foregoing process. If the determination of decision block 97 is that there is an unprocessed text-height object C', the subroutine of FIG. 13 goes to block 98 and adds text-height object C' to row r and proceeds to blocks 99 and marks the text-height object C' as "processed", and returns to block 96 and repeats the process thereof. Eventually, an affirmative determination is obtained in decision block 93, and the subroutine of FIG. 13 returns to block 81 of FIG. 11.

Figure 14:
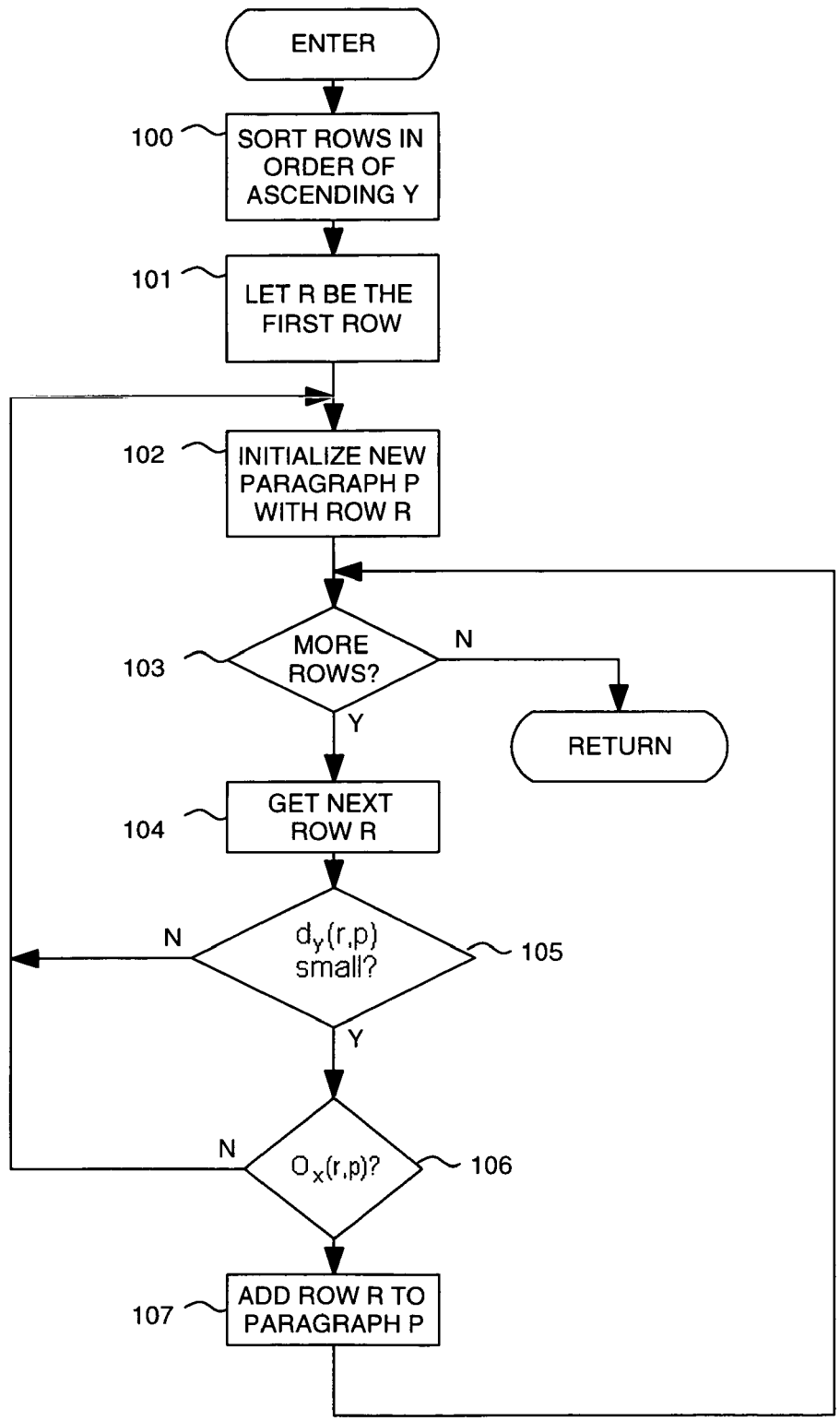
FIG. 14 is a flow chart of a "form paragraphs" routine called by the program of FIG. 11.

In FIG. 11 the subroutine proceeds to block 82 to form paragraphs (or large regions) by executing the subroutine of FIG. 14. The subroutine of FIG. 14 first enters block 100 and sets the "row numbers" r in order of descending values of the y axis coordinate (which is set to the zero in the upper left corner of the page image), and then goes to block 101 and lets the present row r be the first row. The subroutine of FIG. 14 then goes to block 102 and initializes a new paragraph P by starting it with row r, and then goes to decision block 103 and determines if there are more rows. If this determination is affirmative, the subroutine of FIG. 14 goes to block 104 and gets the next available row r and then goes to decision block 105 and determines if the distance $d_y(r,P)$ between the row r and the next paragraph P are small, as a predetermined percentage (e.g. 50%) of the height of the row r.

If this determination is negative, the subroutine of FIG. 14 returns to block 102 and repeats the process, but if the determination of decision block 105 is affirmative, the subroutine then goes to decision block 106 and determines if $O_x(r,P)$ overlap in the x direction, wherein $O_x(r,P)$ is a predetermined percentage of the length of the row r. The basic idea of decision block 106 is that the subroutine of FIG. 14 keeps adding rows r to the paragraph P as long as the rows seem to be close enough to be part of the same paragraph. If the determination of decision block 106 is negative, the subroutine of FIG. 14 returns to decision block 102, but if the determination of decision block 106 is affirmative, the subroutine goes to block 107 and adds row r to paragraph P, and reenters decision block 103. When there are no more rows, the determination of decision block 103 is negative and the subroutine of FIG. 14 returns to block 82 of FIG. 11.

Figure 15:
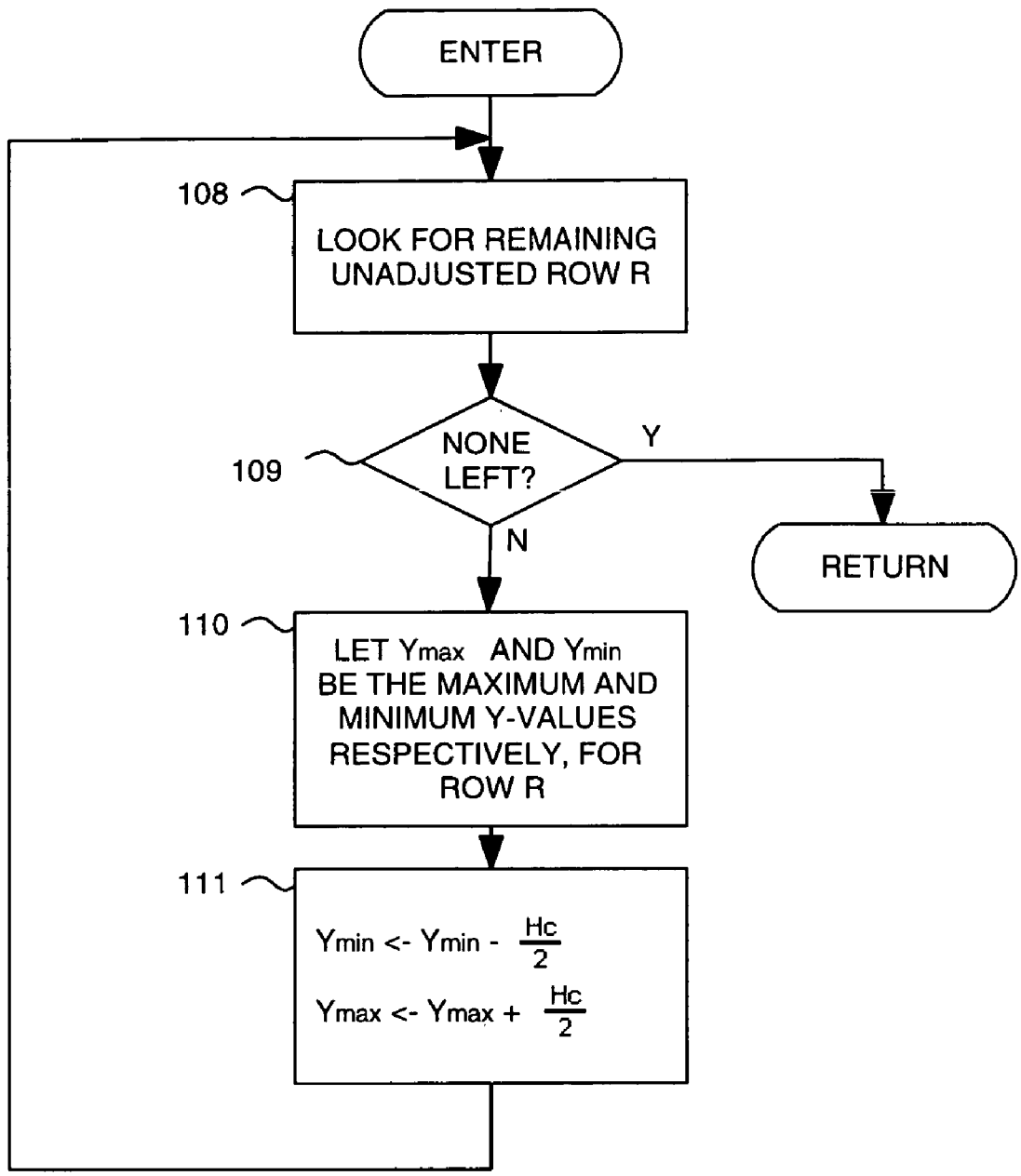
FIG. 15 is a flow chart of an "adjust rows" routine called by the program of FIG. 11.

The routine of FIG. 11 then goes from block 82 to block 83 and "adjusts" the rows by executing the subroutine of FIG. 15 by slightly increasing the heights of the rows when necessary so they encompass punctuation (e.g., apostrophes, commas, etc.) or the like. This would be necessary if none of the characters forming the row include any upward extensions or downward extensions that would initially establish a sufficient height of the row to encompass all possible punctuations and dots over characters.

The subroutine of FIG. 15 goes to block 108 and looks for any remaining unadjusted rows r. The subroutine of FIG. 15 then goes to decision block 109 and determines if there are any remaining unadjusted rows r, and if there are, the subroutine of FIG. 15 goes to block 110 and lets $y_{max}$ and $y_{min}$ be the minimum and the maximum permitted values of y, respectively, and then goes to block 111 and sets the variable $y_{min}$ to the a new value of $y_{min}-H_c/2$, and sets $y_{max}$ to a new value of $y_{max}+H_c/2$, where $H_c$ is the current upper case text height. The subroutine of FIG. 15 then returns to block 108. The main purpose of the subroutine of FIG. 15 is to adjust the vertical extent of each row so that no punctuation or non-depending parts such as dots over I's are lost. When the decision block 109 determines that there are no remaining unadjusted rows 4, the subroutine of FIG. 15 then returns to block 83 of FIG. 11.

Figure 16:
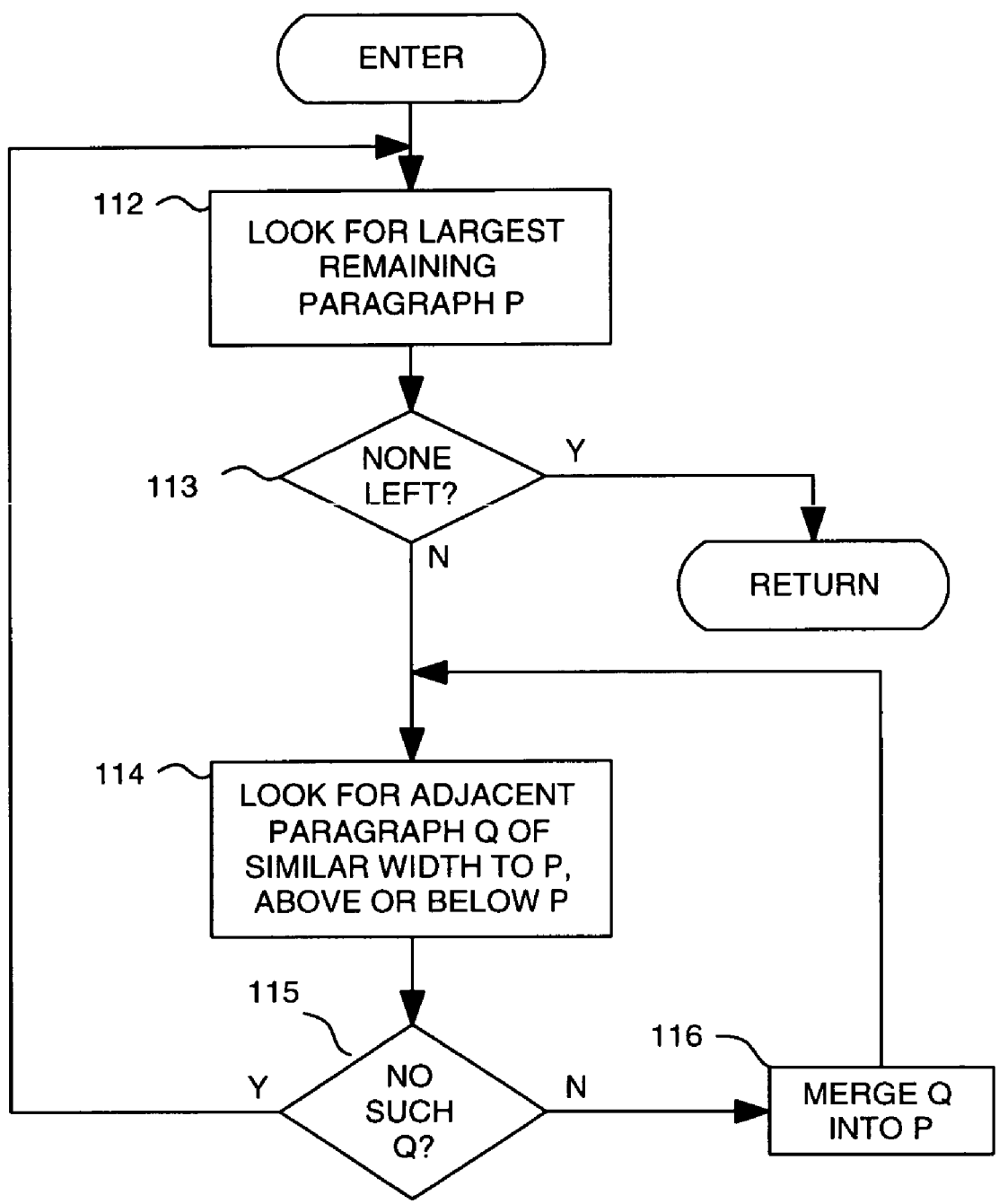
FIG. 16 is a flow chart of a routine called by the program of FIG. 11 to form columns of text.

The subroutine of FIG. 11 then goes to block 84 and forms columns (i.e., as in a newspaper or magazine) by executing the subroutine of FIG. 16. The subroutine of FIG. 16 first goes to block 112 and looks for the largest remaining paragraph P, and then goes to decision block 113. If there is a remaining paragraph P, the subroutine of FIG. 16 then goes to block 114 and looks for an adjacent paragraph q of similar width to paragraph P and located either above or below paragraph P. The subroutine of FIG. 16 then goes to decision block 115 and determines if any such paragraph q exists, and if none does exist, the subroutine returns to block 112, but otherwise goes to block 116 and merges paragraph q into paragraph P, and returns to block 114. When the decision of block 113 eventually is affirmative, the subroutine of FIG. 16 returns to block 84 of FIG. 11.

Figure 16A:
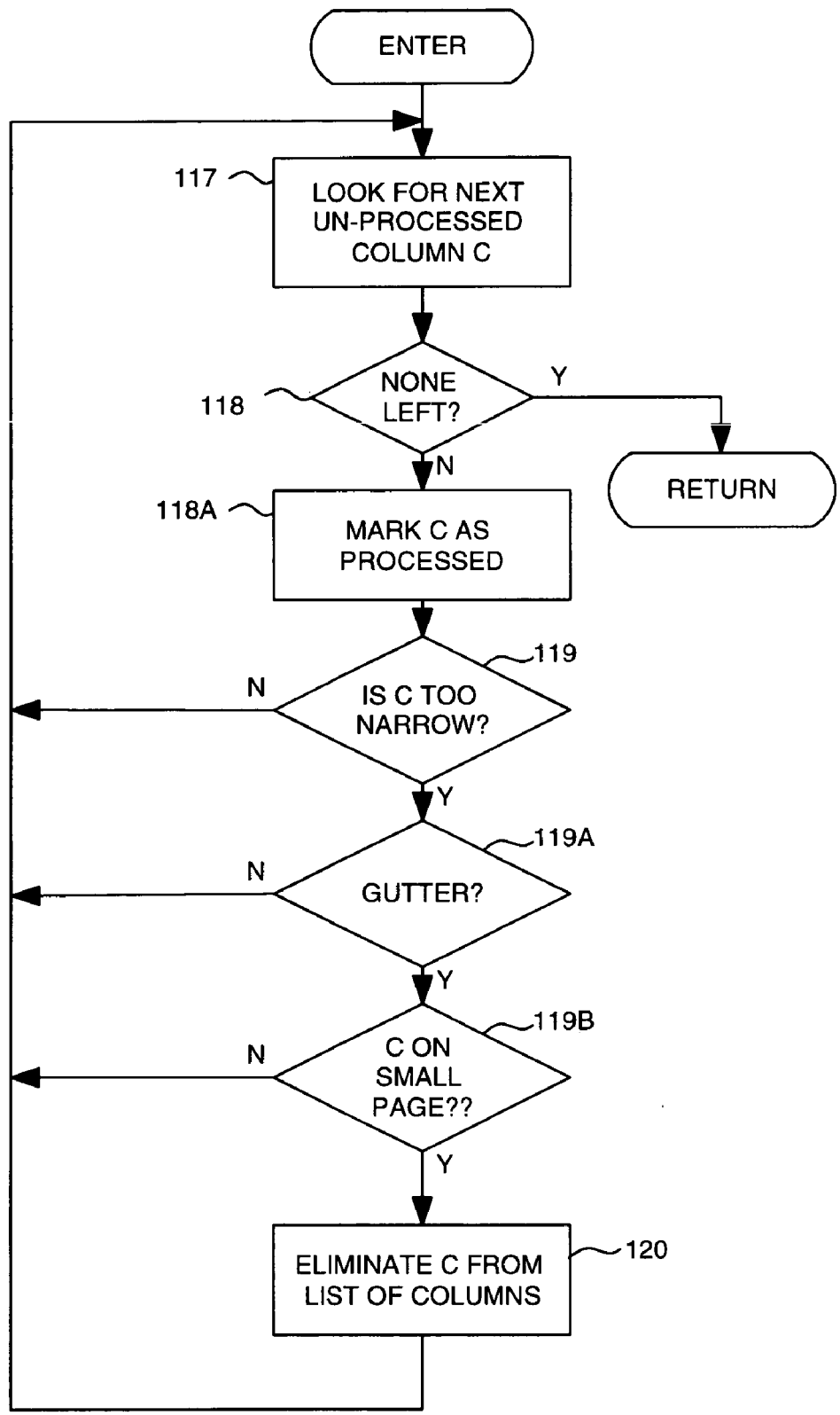
FIG. 16A is a flow chart of a routine called by the program of FIG. 11 to eliminate spurious columns.

The subroutine of FIG. 11 then goes to block 84A to eliminate any spurious columns, by executing the subroutine of FIG. 16A. Referring to FIG. 16A, the program looks for the next un-processed column c in block 117, and then goes to decision block 118 and determines if any un-processed column c remains. If so, the program returns to block 84C of FIG. 11. Otherwise, the program goes to block 118A and marks the column c as "processed", and then goes to decision block 119. In decision block 119 the program determines if the column c is too narrow. If this determination is negative, the program returns to block 117, but otherwise goes to decision block 119A and determines if there is an extraneous "gutter" image (see image 157 in FIG. 25A) dividing the document into two pages being copied from a book, magazine or the like. If the determination of decision block 119A is negative the program returns to block 117, but otherwise goes to decision block 119B and determines if the column c is on a small page. If this determination is negative, the program returns to block 117, but otherwise goes to block 120 and eliminates the column c from the list of columns, and then returns to block 117. The subroutine of FIG. 16A eventually returns to block 84A of FIG. 11.

Figure 17:
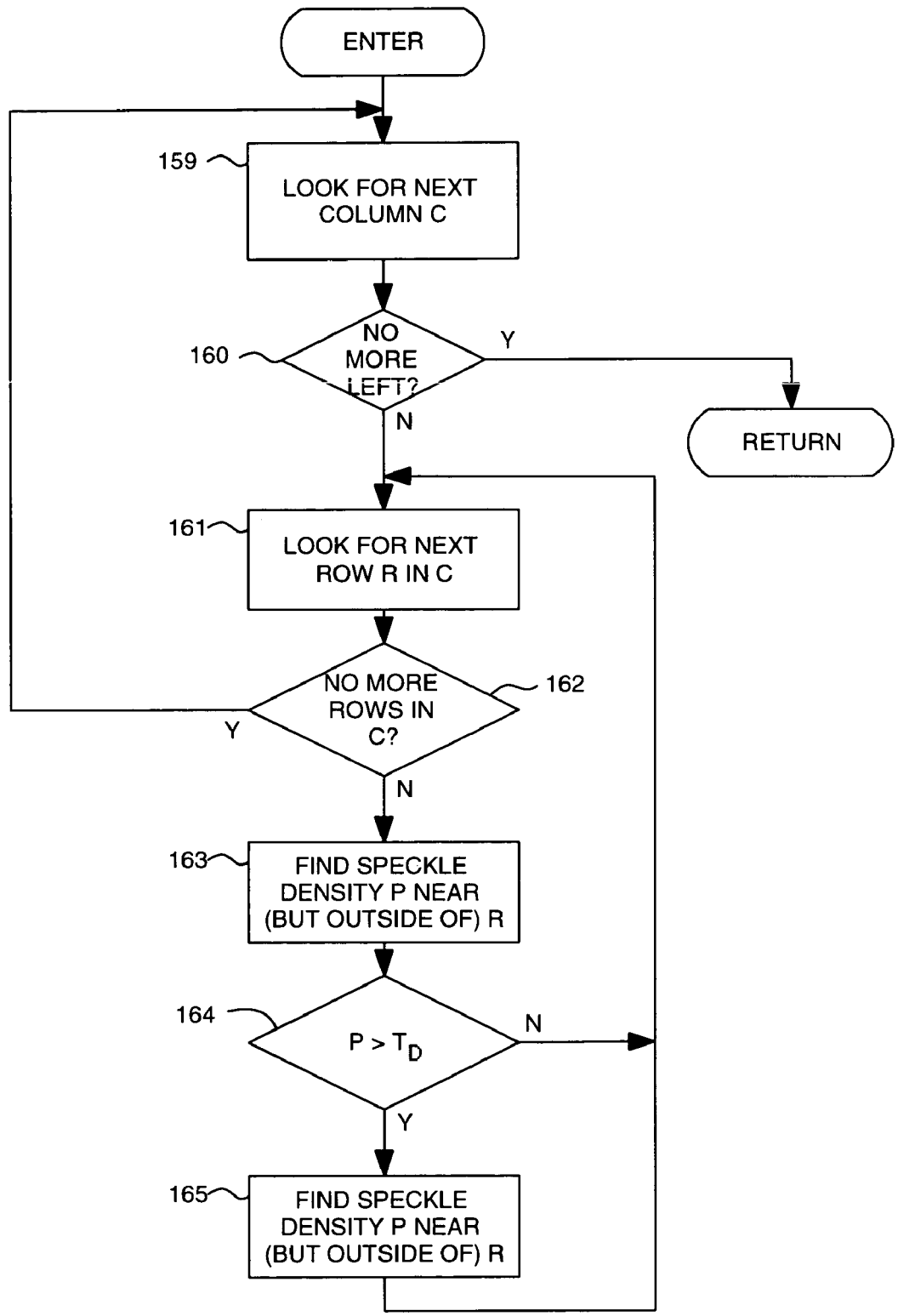
FIG. 17 is a flow chart of a "post-process columns" routine called by the program of FIG. 11.

The routine of FIG. 11 then goes to block 84B, marks all objects within the rows as data objects, and then goes to block 84C and executes the subroutine of FIG. 17.

The subroutine of FIG. 17 goes to block 159 and looks for the next "column C", and then goes to decision block 160. If more column C's exist, the subroutine of FIG. 17 goes to block 161 and looks for a next row r in column C, and then goes to decision block 167. If there are no more rows in column C, the subroutine of FIG. 17 returns to block 159 and repeats its process, but otherwise goes to block 163 and computes the speckle density ρ outside of but near row r to determine if row r lies in a high speckle density area of the document. The subroutine of FIG. 17 then goes to decision block 164. If the speckle density ρ is greater than a preset speckle density threshold $T_D$ speckles per unit area, the subroutine of FIG. 17 goes to block 165, but otherwise returns to block 161 and repeats its process. The idea of block 165 is that the program looks outside of row r and determines if there is a substantial number of nearby noise objects, and if that is the case, the program infers that there probably are a large number of noise objects within row r, and therefore marks small speckle-sized objects within row r as noise objects. The subroutine of FIG. 17 then returns to block 84C of FIG. 11. The subroutine of FIG. 11 then goes to block 85 and calls up the subroutine of FIG. 18 to find and mark extra-columnar text objects as data objects.

Figure 18:
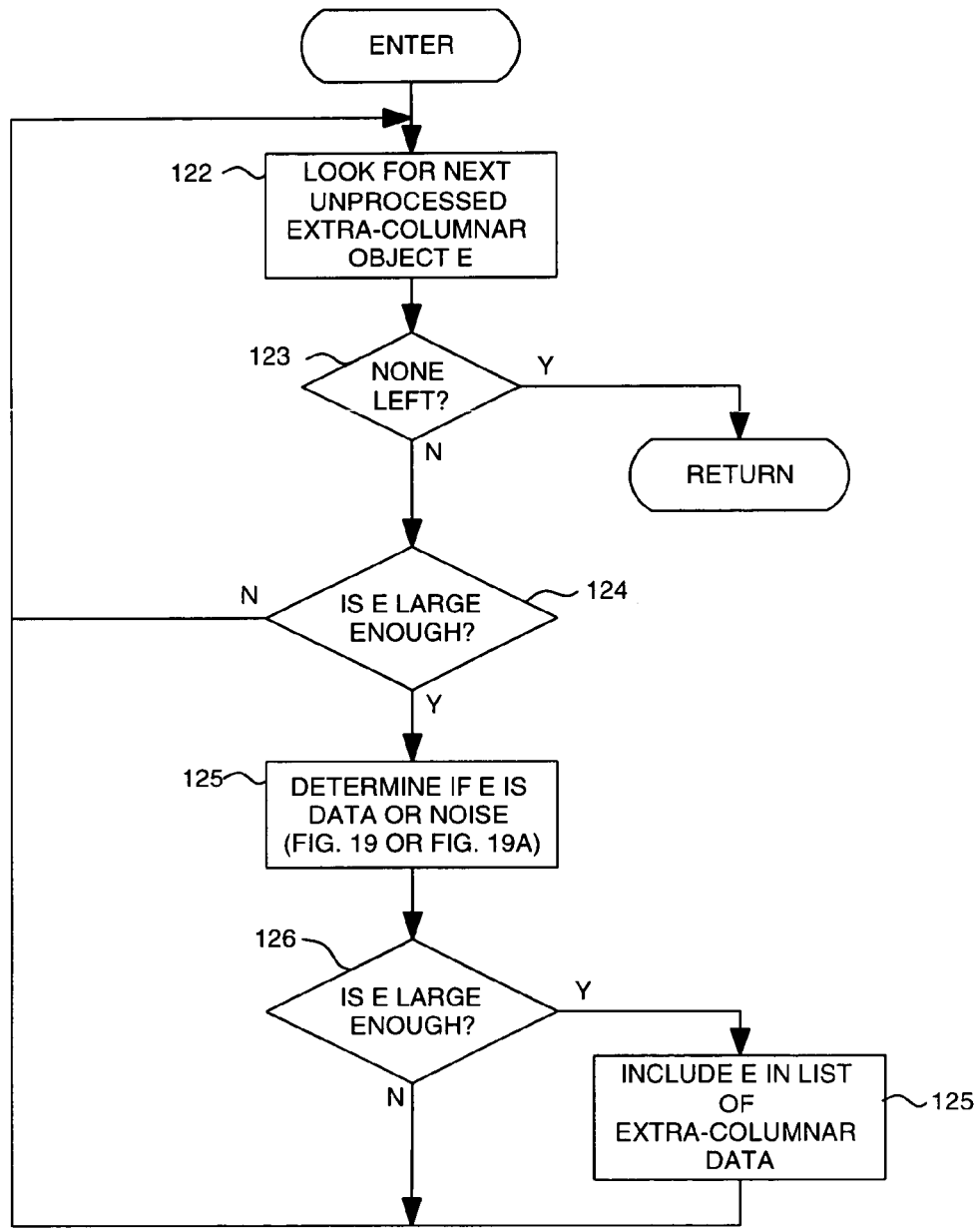
FIG. 18 is a flow chart of a routine called by the program of FIG. 11 to find and mark extra-columnar text objects as data.

To accomplish this the program of FIG. 18 goes to block 122 and looks for the next unprocessed extra-columnar object e (which can be initials in the margin, line numbers, a bullet, page numbers, or the like), and if one is found according to decision block 123, the subroutine of FIG. 18 then goes to decision block 124 and determines if e is sufficiently large according to a predetermined criteria. In other words, decision block 124 determines if the extra-columnar object e is large enough to be interesting, and if so, a neural network is used to determine if the extra-columnar object e is data or noise. If there are no more sufficiently large unprocessed extra-columnar objects e, the subroutine of FIG. 18 returns to block 122 and repeats its process, but otherwise the subroutine of FIG. 18 goes to block 125 and calls up the program of FIG. 19 or FIG. 19A a to determine if the extra-columnar objects e constitute data or noise.

Figure 19:
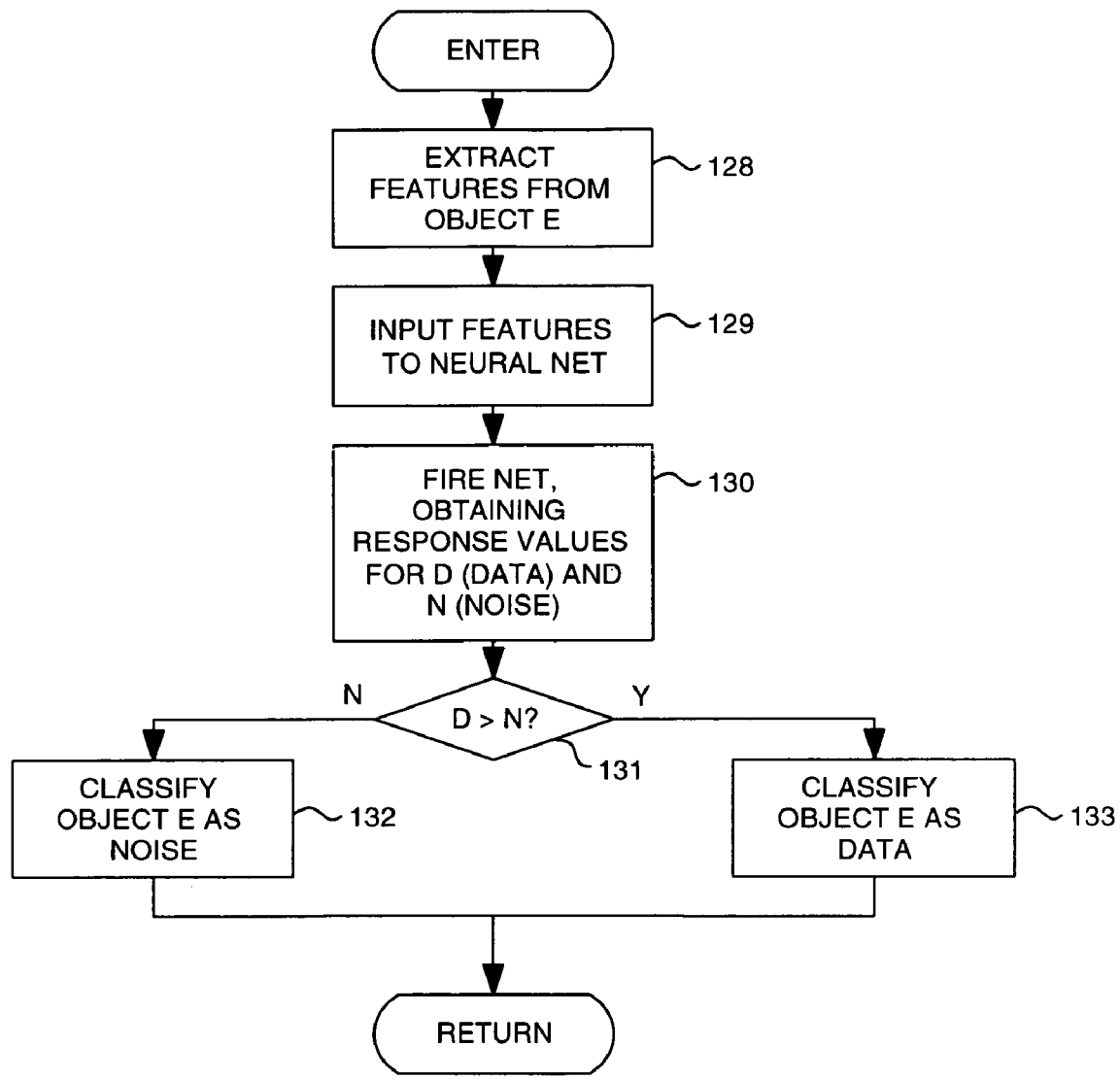
FIG. 19 is a flow chart of a routine which can be called by the program of FIG. 18 in one embodiment of the invention to invoke a neural network to classify an object as data or noise.
Figure 19A:
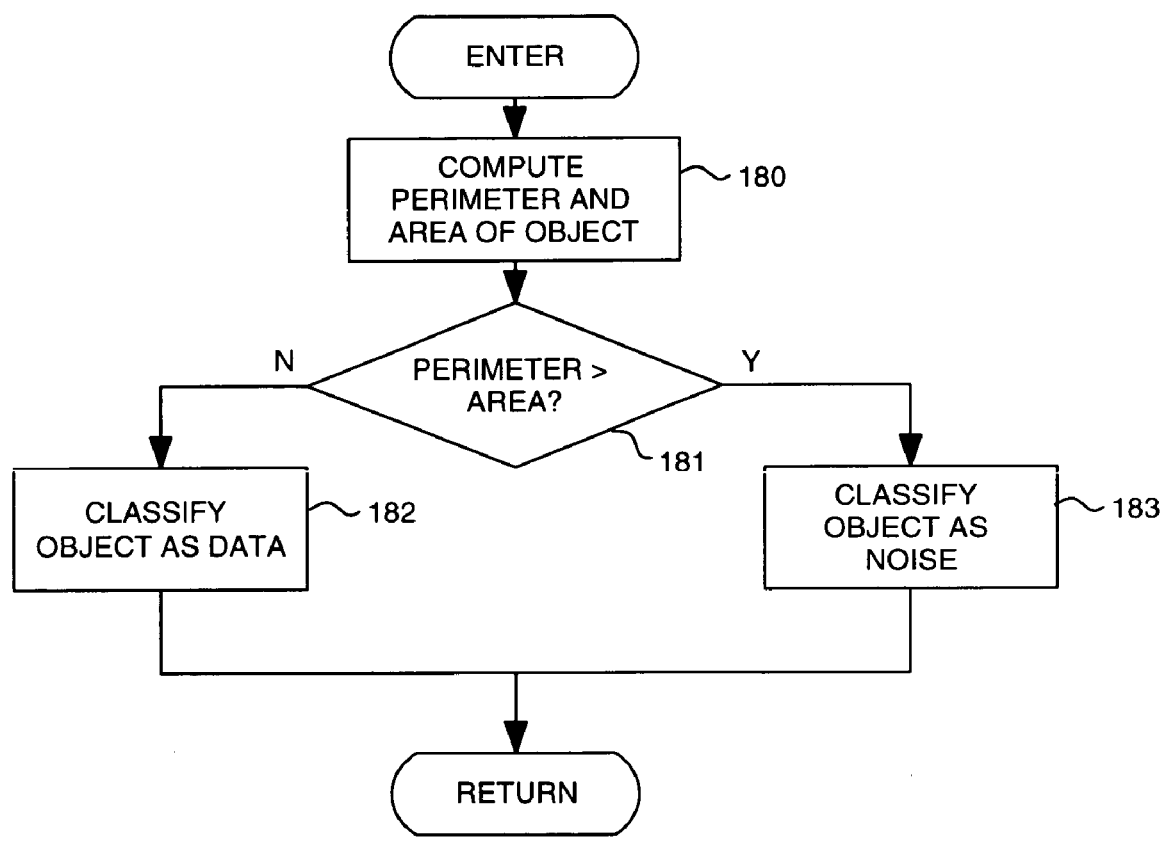
FIG. 19A is a flow chart of another routine which can be called by the program of FIG. 18 in another embodiment of the invention to classify an object as data or noise.

FIG. 19A provides a simple computation in which the object perimeter and mass, i.e., area, are computed as indicated in block 180 of FIG. 19A. The routine of FIG. 19A then goes to decision block 181 and compares the computed perimeter to the computed area (mass) of the present extra-columnar object e. If the perimeter is greater than the area (mass), then the subroutine goes to block 183 and classifies the extra-columnar object e as noise. The idea here is that "spider-web" noise, which has the characteristic of being thin and jagged, and has a large perimeter relative to its area. If the determination of decision block 181 is negative, then the subroutine classifies the extra-columnar object e as data. Alternatively, block 125 of FIG. 18 can invoke a neural net as shown in subsequently described FIG. 19.

A neural network is an algorithm that receives features from a large number of examples and performs an iterative process that enables it to learn from the examples and then make decisions about a new example based on what it has learned from the prior examples. The neural network generally is trained off line. It does not use any of the information from the examples contained in the document to be cleaned up in its learning process. The weights that are established by the neural network based on an iterative process performed on a large number of off line examples are stored in a file in the document cleanup software (or within the software if no file-reading mechanism is available) and then used in the cleanup algorithms described herein. Suitable standard neural network programs are described in detail in "Parallel Distributed Processing: Explorations in the Microstructure of Cognition", David E. Rumelhart, James L. McClelland, and the PDP Research Group, Cambridge, Mass.: MIT Press c1986, and "Neurocomputing", Robert Hecht-Nielsen, Reading, Mass.: Addison-Wesley Publishing Company, c1989.

If the determination of decision block 126 of the subroutine of FIG. 18 is that extra-columnar object e is not data, then it must be noise, and the subroutine returns to block 122. If the determination of block 126 is that the extra-columnar object e is data, the subroutine goes to block 127 and includes extra-columnar object e in a list of extra-columnar data, and returns to block 122. When the determination of decision block 123 eventually is that there are no remaining unprocessed extra-columnar objects e, the subroutine of FIG. 18 returns to block 85 of FIG. 11. The subroutine of FIG. 11 then returns to block 72 of FIG. 9. In order to invoke the above mentioned neural network, block 125 of the subroutine of FIG. 18 calls up the subroutine of FIG. 19, and in block 128 thereof extracts features from the extra-columnar object e. At the present time, three features are used, including (1) the density of semi-isolated pixels in the extra-columnar object e, (2) the number of runlengths needed to describe the object, normalized by the object height, and (3) the ratio of the object perimeter to the square root of the area of the extra-columnar object e. The subroutine of FIG. 19 then goes to block 129 and inputs the features extracted in block 128 to the neural network, and then goes to block 130 and "fires" the neural network obtaining response values for d(data) and n(noise). The subroutine of FIG. 19 then goes to decision block 131 and determines if d is greater than n. If this determination is negative, the subroutine goes to block 132 and classifies the extra-columnar object e as noise. If the determination of block 131 is affirmative, the subroutine goes to block 133 and classifies the extra-columnar object e as data. In either case, the subroutine of FIG. 19 then returns to block 125 of FIG. 18.

Objects of interest such as initials in the margin, line numbers, asterisks and the like generally tend to be smooth featured, whereas noise tends to have extremely jagged edges.

Semi-isolated pixels are "1" pixels with at least some neighboring "0" pixels. One type of semi-isolated pixel has only one "0" neighboring pixel. The type with only one "0" neighbor is called a "tip pixel". Tip pixels occur frequently in noise objects, but do not occur very often with data objects. One type of "0" pixel has two "1" neighbors on opposite sides; that type of pixel also occurs much more in noisy objects than in data objects. The numbers of the foregoing two types of pixels are counted and divided by the total number of pixels, and that ratio is used in helping to determine whether a particular object is noise or data. If there is a lot of jaggedness to the object, then a large normalized number of runlengths is needed to describe the object; that normalized number is another figure of merit for determining whether an object is noise or data. In another extracted feature, the ratio of the object perimeter to the square root of the object area is very large for a typical noise object compared to a typical data object.

After invoking the neural network in block 125, the subroutine of FIG. 18 then goes to decision block 126 and determines if the extra-columnar object e is data, and if it is, then the subroutine of FIG. 18 goes to block 127 and includes extra-columnar object e in a list of extra-columnar data which must not be lost. In either case, the subroutine of FIG. 18 returns to block 122 and repeats its process. When decision block 123 determines that there are no more extra-columnar objects e, the subroutine returns to block 85 of FIG. 11, which then returns to block 73B of FIG. 9, which then goes to block 73B and calls up the subroutine of FIG. 20 to identify any geometric objects and identify them as data objects.

Figure 21:
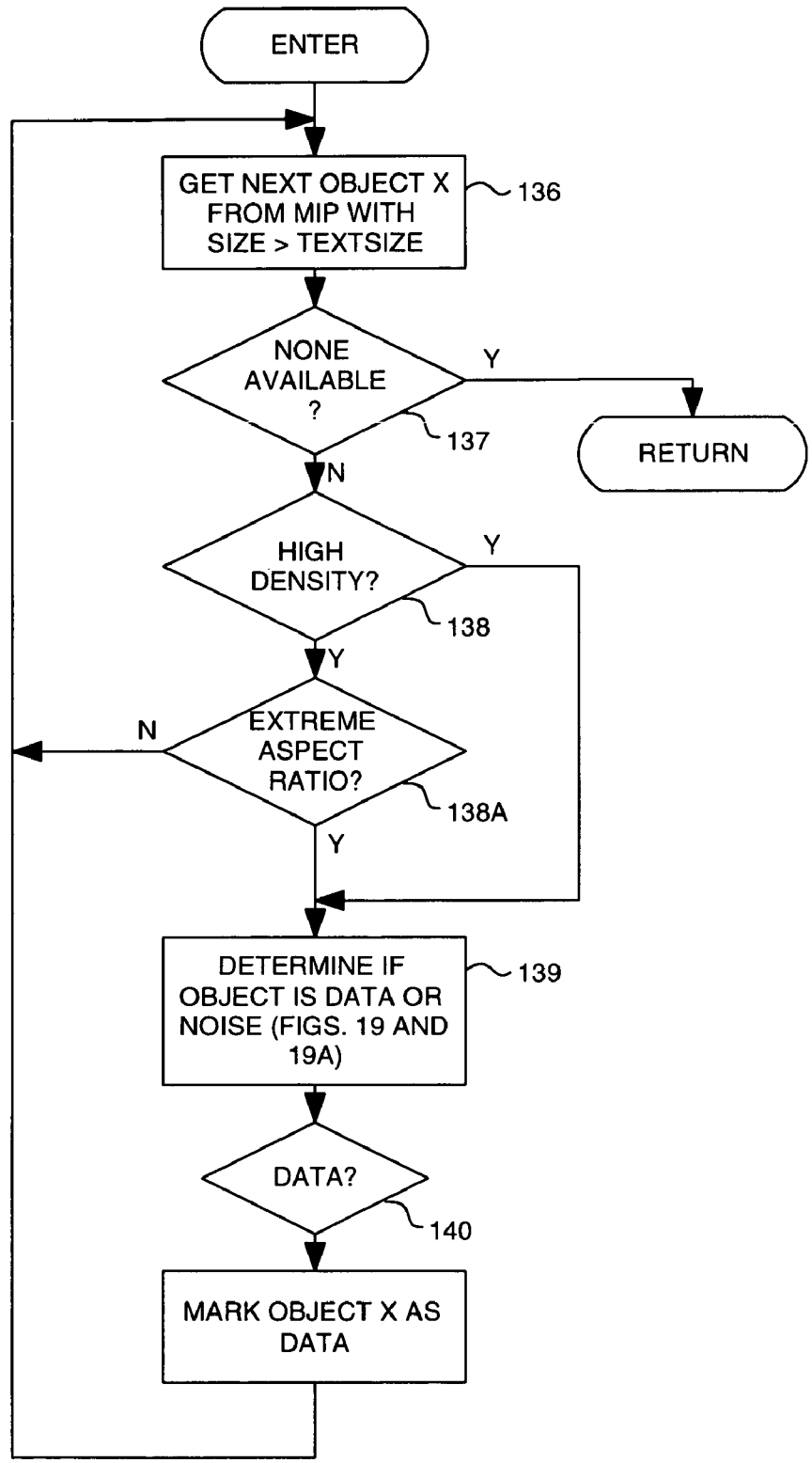
FIG. 21 is a flow chart of a routine called by the program of FIG. 20 to find whole geometry objects and mark them as data.

The subroutine of FIG. 20 identifies "geometric regions" and marks them as data objects by entering block 134 and executes the subroutine of FIG. 21 to find any "whole geometry" objects, which consist of large connected objects such as polylines, etc., and marks them as data objects.

In block 136 of FIG. 21, the subroutine finds the next object X of size greater than a preset amount Textsize from the appropriate MIP level image, and then determines in decision block 137 if there are any more such objects X. If there are, the subroutine of FIG. 21 goes to decision block 138 and determines if the object X has a density higher than a predetermined threshold. If this determination is affirmative, the subroutine goes to decision block 138A, but otherwise the subroutine of FIG. 21 goes to block 139 and either uses a neural network program to determine if the object X is data or noise in the manner previously described with reference to FIG. 19 or uses the subroutine of FIG. 19A to determine if the object X is data or noise, and then goes to decision block 140. If decision block 138 determines the object X has a high density, the subroutine of FIG. 21 goes to decision block 138A and determines whether the object X has an "extreme" aspect ratio, i.e., whether it is essentially a horizontal line or a vertical line. If the object X is not essentially a horizontal or vertical line, then the subroutine of FIG. 21 goes to block 136 and repeats its process, but otherwise goes to block 139 and calls the subroutine of FIG. 19 or FIG. 19A, described previously. After the neural network program has been executed, the subroutine of FIG. 21 goes to decision block 140.

In decision block 140 the subroutine of FIG. 21 determines if the object X is a data object, and if it is not, the subroutine returns to block 136, but otherwise goes to block 141 and marks the object X as a data object and then returns to block 136. When decision block 137 determines that there are no more objects X of size greater than the "Textsize", the subroutine of FIG. 21 returns to block 134 of FIG. 20.

The "Identify Geometry" subroutine of FIG. 20 is entered after the picture regions and text regions have already been identified in FIG. 9. In block 134 of FIG. 20, finding "whole geometry" objects means finding shapes such as circles and polygons and broken geometry typically consisting of dashed lines. The idea of the subroutine of the "Find Whole Geometry" subroutine of FIG. 21 is to find objects of a certain minimum size, so there is no confusion with text objects or small noise objects. If the object X is a large object with at least a minimum aspect ratio, and is of high density as indicated in block 138, decision block 138 makes its determination heavily dependently on what the MIP level is. What is low density at MIP level 0 for the original image becomes high density very rapidly as the MIP level increases, i.e., as the resolution decreases. A large black object, for example, a black design or logo, would not be dealt with as a geometric object, but would be dealt with as a picture according to block 73 of FIG. 9. If the area of interest is a picture region, it is "marked" in the course of executing block 73 of FIG. 9. Note that block 139 of FIG. 21 and the neural network referred to is only one way of finding whole geometry. The vectorization process of U.S. Pat. No. 4,817,187 is another way.

After executing the subroutine of FIG. 21, the subroutine of FIG. 20 then goes to block 135 to find and mark as data objects, any broken geometry objects, by executing the subroutine of FIG. 22 or FIG. 22A.

The program of FIG. 20 then returns to bloc 73B of FIG. 9 and from there returns to block 13 of FIG. 2, having identified all of the picture regions and data objects of the de-skewed image of the originally scanned document.

Figure 23:
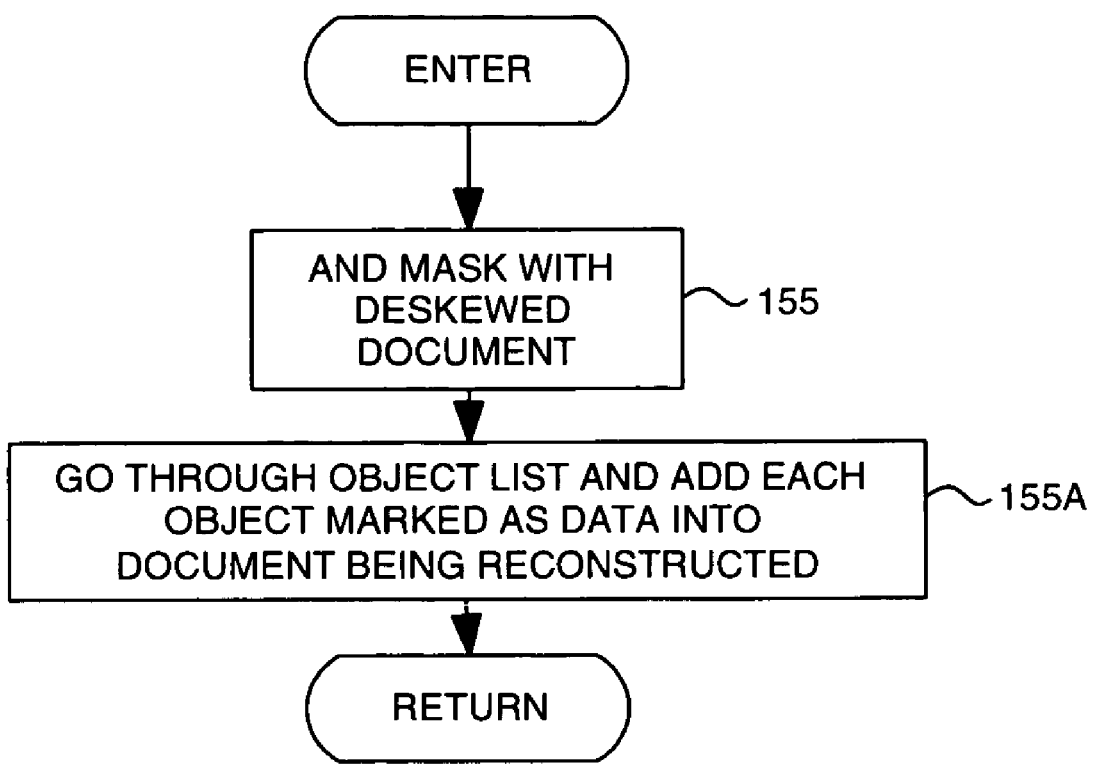
FIG. 23 is a routine called by the program of FIG. 2 to reconstruct the present document.

The program of FIG. 2 then goes to block 14 and reconstructs the document to include only the picture regions (and all objects therein) and all of the data objects from the object list, by executing the subroutine of FIG. 23 or the subsequently described subroutine of FIG. 23A. The subroutine of FIG. 23 goes to block 155 and logically ANDs the mask with the de-skewed image of the document originally scanned, thereby deleting everything from the original scanned and de-skewed image data except the picture region and objects therein. The program then goes to block 155A, and reintroduces each object therein marked as a data object into the document being reconstructed, effectively eliminating all of the noise objects.

Figure 23A:
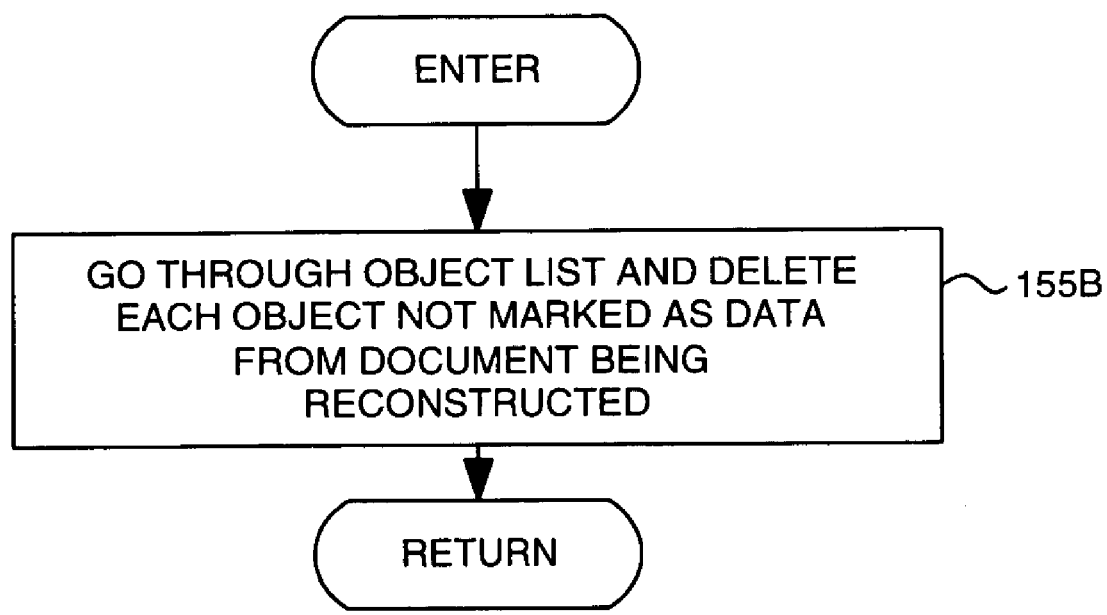
FIG. 23A is a routine called by the program of FIG. 2 to reconstruct the present document.

Referring to FIG. 23A the program goes through the object list and deletes each object not marked as data from the document being reconstructed.

FIG. 24A shows a skewed, noisy copy of a page of text including Kanji characters 166. Various "noise" images 167 appear in the margins and also in some of the space between the Kanji characters 166. FIG. 24A thus is a copy of a document scanned according to the "acquire document" step of block 10 in FIG. 2.

Figure 24B:
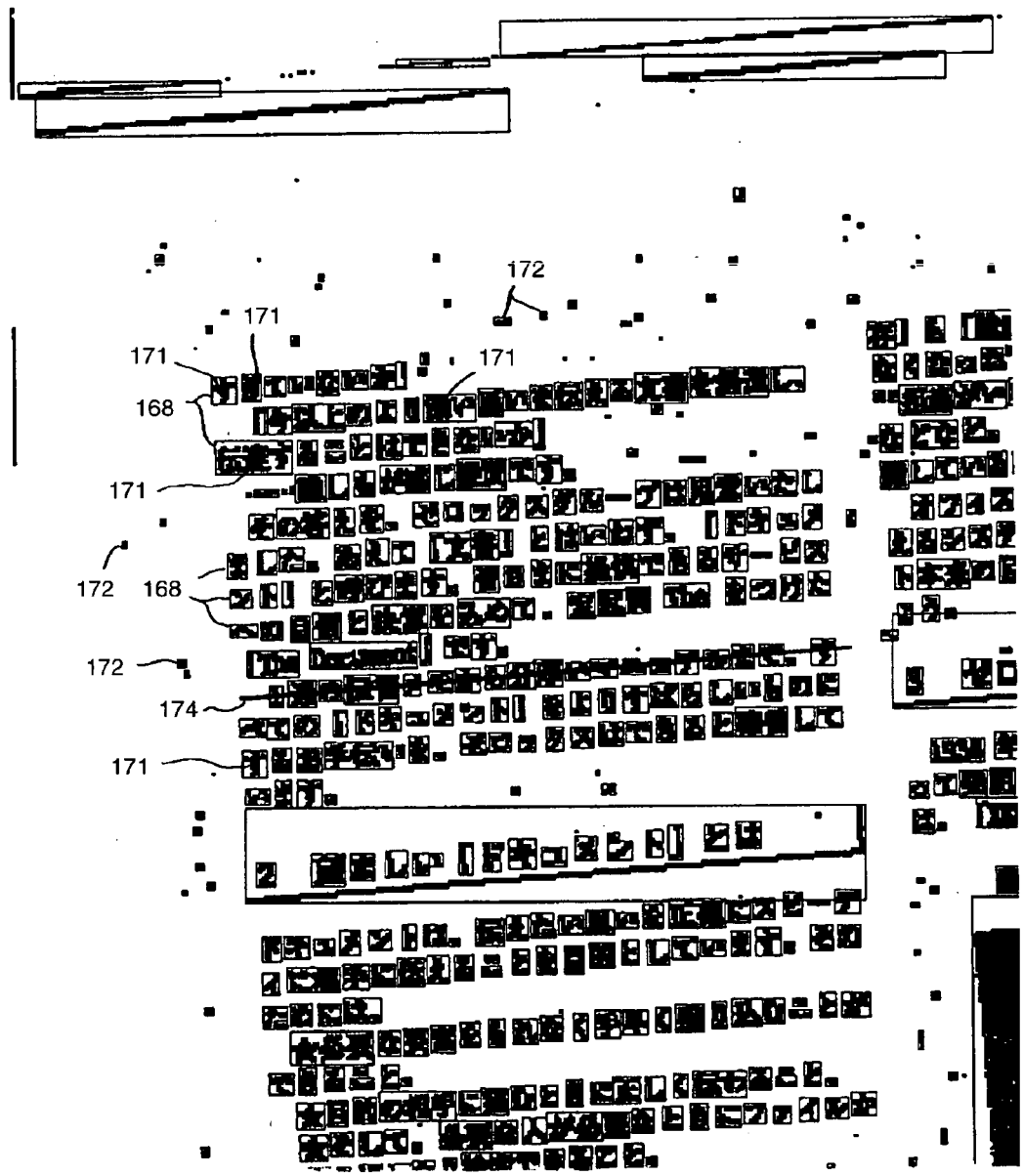

FIG. 24B is a copy of a MIP level 2 image created during the "De-skew Document" subroutine referred to in block 12 of the program of FIG. 2, the "De-skew Document" subroutine of FIG. 5, the "De-skew Page" subroutine of FIG. 6, the "Find Text Skew Angle" subroutine of FIG. 7, the "Find Character Sizes" subroutine of FIG. 12, and the "Build Rows Of Text" subroutine of FIG. 13. It should be understood that FIG. 24B shows imaginary bounding rectangles 168 around each MIP level 2 object 171 built during execution of the "object grabbing" program referred to in block 48 of FIG. 7. Similar bounding rectangles designated by numerals 172 are formed around each noise object 167 shown in FIG. 24A.

After performing the steps in block 48 of the subroutine of FIG. 7 (which finds the skew angle for text documents) using the above described object grabbing program, as indicated in block 48, calculating the histogram in block 49, finding character sizes in block 52, and building rows of text in block 53, then the image of the document at MIP level 2 would appear as shown in FIG. 24B, without the bounding rectangles 168 and 172.

Normally, the MIP level 2 diagram of FIG. 24B would not be displayed in an automated digital copier using the most automatic embodiment of the invention. However, the clean-up program of the present invention can be used in conjunction with a monitor which displays such images with the bounding rectangles 168 and 172, which is how FIG. 24B was generated.

Line 174 in FIG. 24B represents a line centered through the "best row" found according to the subroutine of block 54 of FIG. 7. The best row is found by computing a confidence factor for each such row by drawing an imaginary line such as 174 from the center of the first character to the center of the last character, and adding 1 for each included character centered upon that line, and subtracting 1 for each character not centered on that line. The slope of the longest row with the highest such confidence factor is chosen as the line from which to determine the skew angle, which is the arctangent of the slope of the best line 174. The de-skew angle is the negative of the skew angle.

Figure 24C:
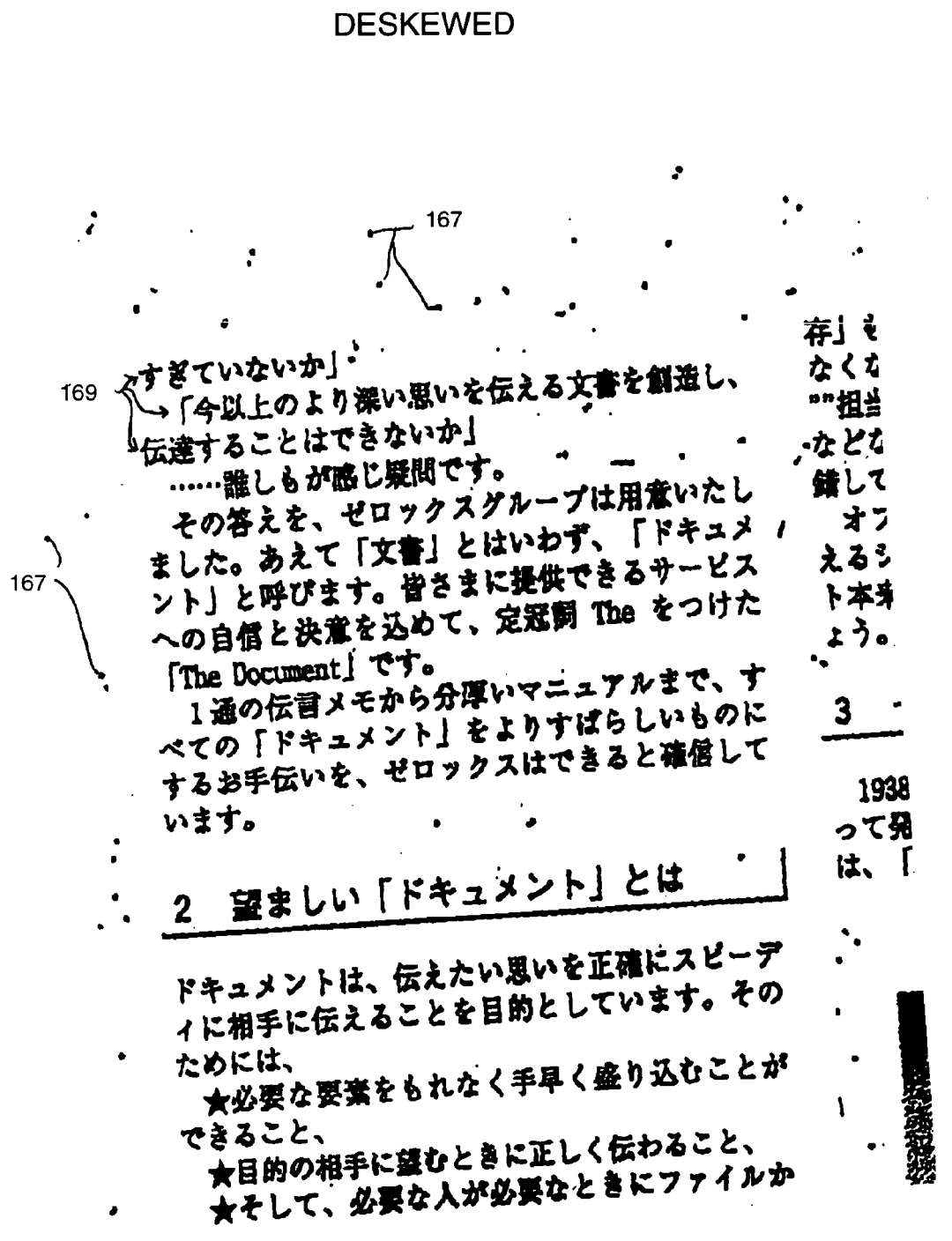

After performing the page rotation operation of block 47 of FIG. 6 on the document of FIG. 24A, the de-skewed document appears as shown in FIG. 24C, which is identical to FIG. 24A except that the skew has been eliminated.

Figure 24D:
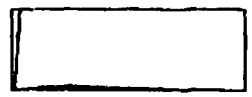

FIG. 24D is a copy of an image of the de-skewed document of FIG. 24C after the data areas have been identified in accordance with the subroutine of block 13 of FIG. 2 and the "identify data" subroutine of FIG. 9 and subroutines 10, 11, and 20 called thereby. The noise images 167 of FIG. 24C all still appear. However, the rows such as 169 of Kanji characters such as 166 are bounded by imaginary rectangles 76 which bound the text regions identified according to block 72 of FIG. 9 and the subroutine of FIG. 11, after executing blocks 77–85 thereof. The bounding rectangles 76 would not be part of the image, but could be displayed separately with the document image on a monitor, for example in an embodiment of the invention including interactive movement of bounding rectangle edges by an operator to exclude noise images without loss of essential data. However, the "post process columns" step of block 84B has not been performed on the image of FIG. 24D.

Finally, FIG. 24E shows a copy of the scanned document after all of the non-data outside of the data areas bounded by the bounding rectangles 76 has been deleted. Note that some of the noise images 178 inside the bounding rectangle 76 have not been eliminated, but could be eliminated in accordance with the "Post-process Columns" subroutine referred to in block 84B of FIG. 11, and shown in detail in the subroutine of FIG. 17.

FIG. 24E thus represents a "cleaned up" copy of the originally scanned document of FIG. 24A, de-skewed and de-speckled, without loss of any essential data.

Figure 25A:
Figure 25B:
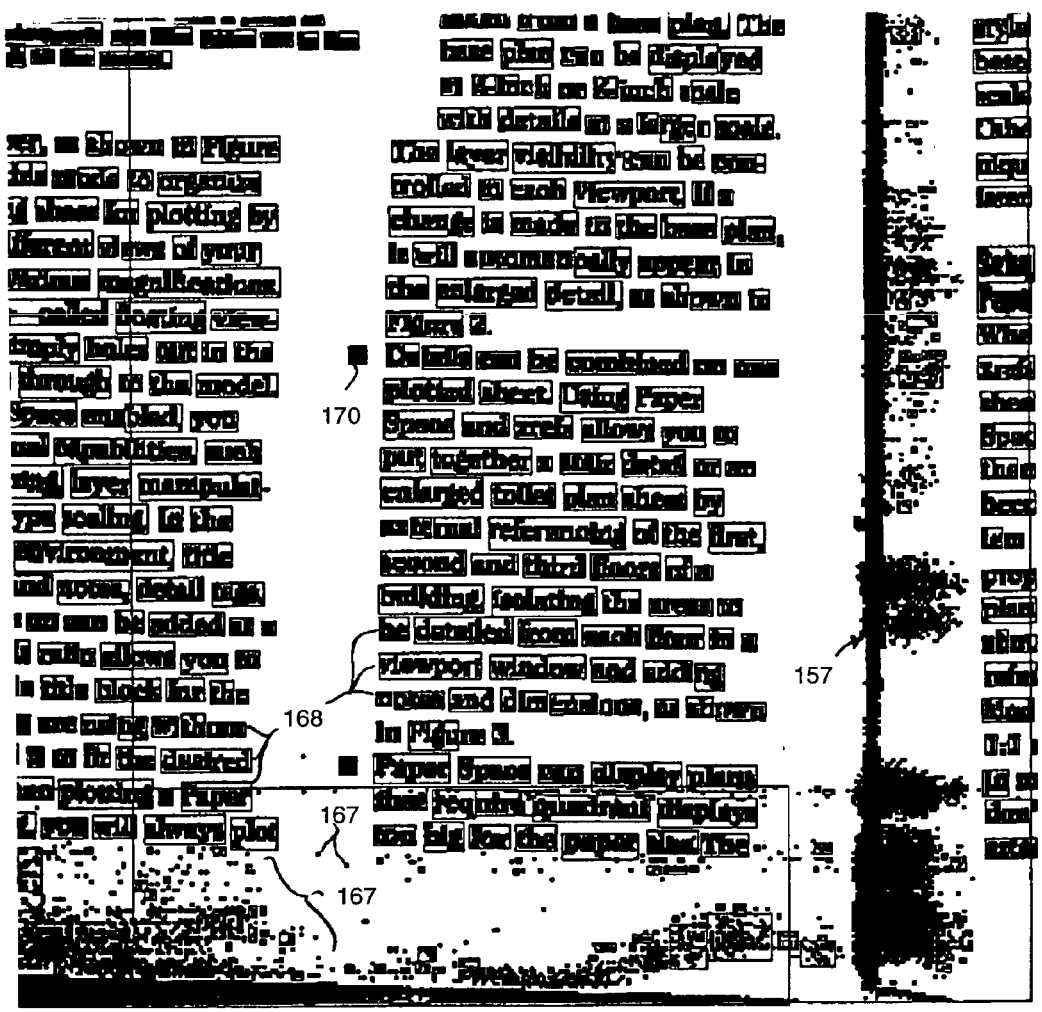
Figure 25D:
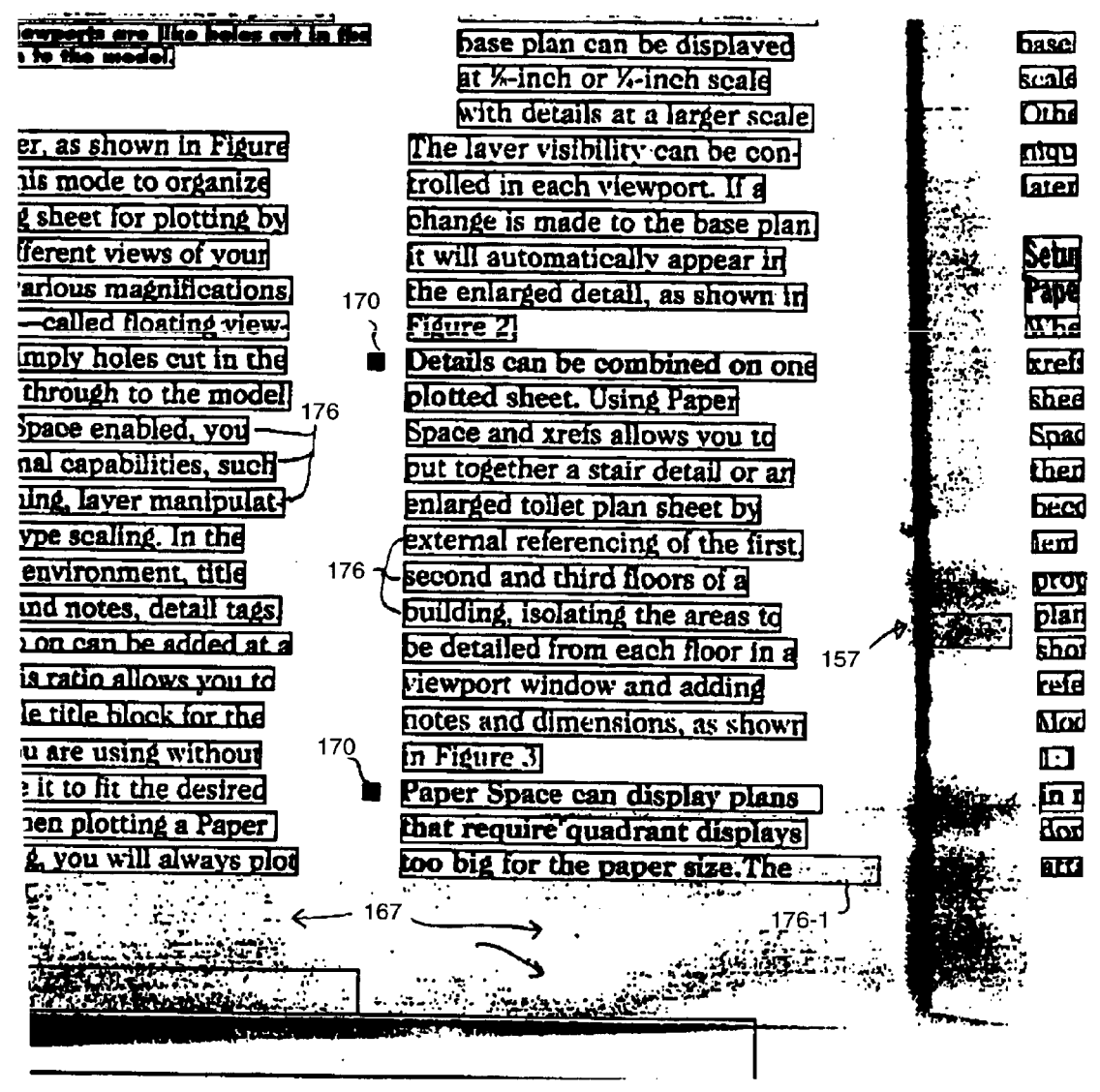

FIG. 25A is a copy of a skewed portion of a page of English text, including a large amount of noise images 167, and a image of a gutter 157 formed as two pages of a book placed against a glass platen of a digital copier. FIG. 25B is a MIP level 2 image, including bounding rectangles 168, similar to FIG. 24B described above. FIG. 25C is a copy of an image similar to FIG. 24C, representing a de-skewed version of the page, including all of the noise 167 and the gutter 157. FIG. 25D illustrates a copy of an image with bounding rectangles 76 identifying the essential data areas. Finally, FIG. 25E illustrates a copy after de-speckling, removing all noise objects. Extra-columnar data such as the bullets 170 have not been removed.

Figure 26A:
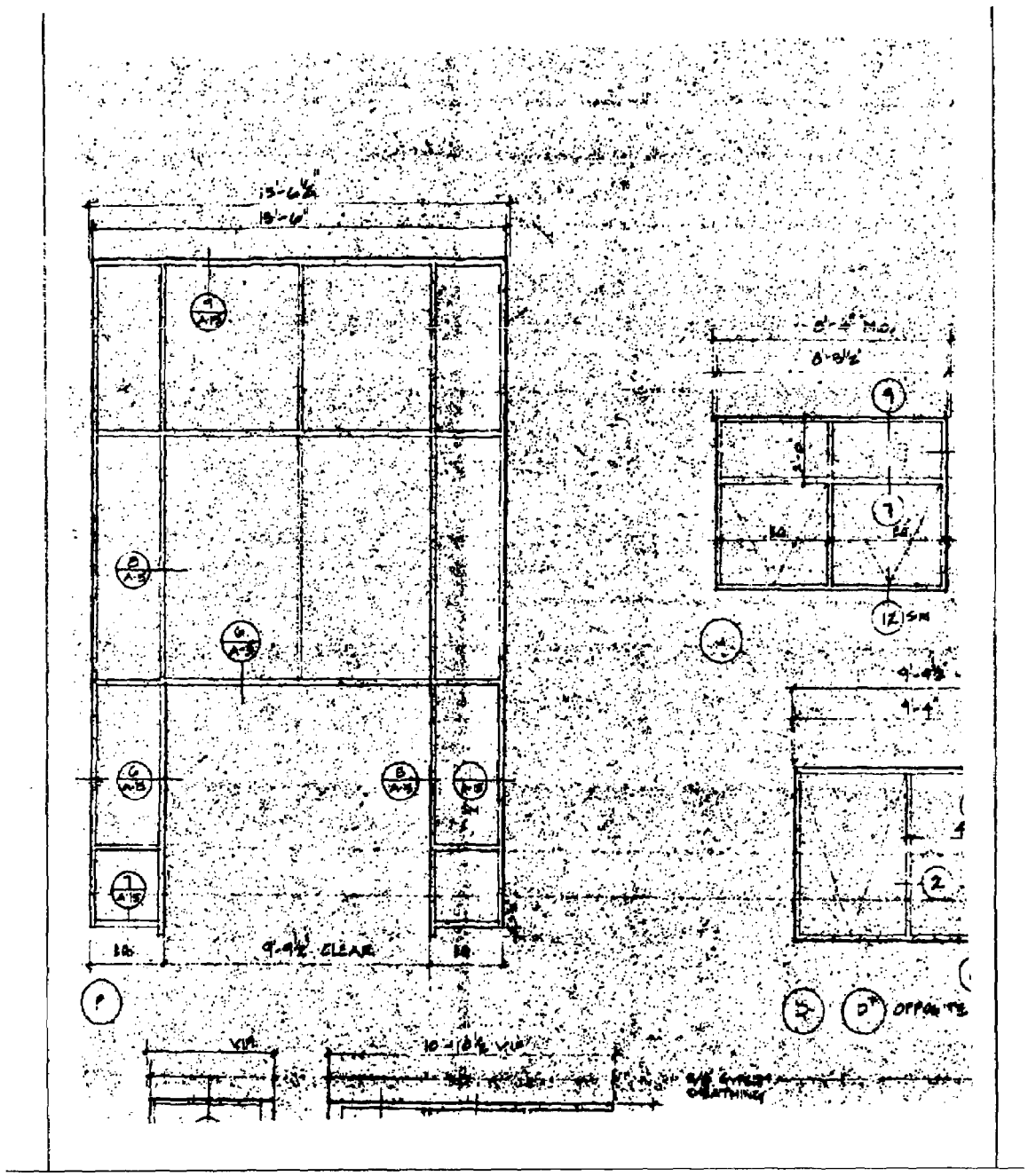
FIGS. 26A and 26B constitute diagrams of scanned geometric images that are useful in explaining the various flow charts.
Figure 26B:
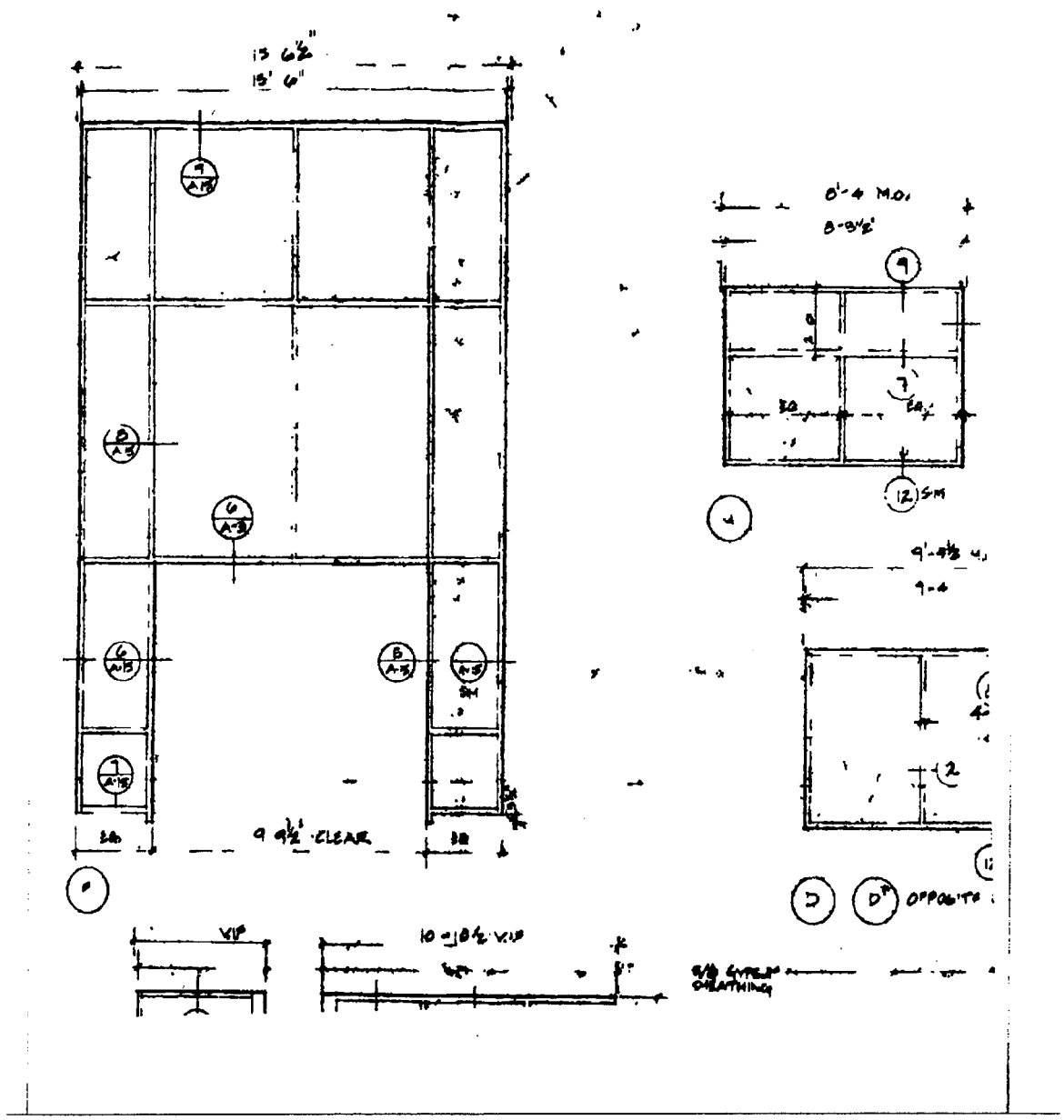

FIG. 26A illustrates a badly speckled document, mostly including geometric objects. FIG. 26B shows the geometric objects, which are line drawings, after going through a de-speckling process. FIG. 21 is called from block 134 of FIG. 20, and executes the "find whole geometry" subroutine of FIG. 21 and finds the large objects which are high density objects that have extreme aspect ratios as determined in decision blocks 138 and 138A or are low density objects that have non-extreme aspect ratios and are analyzed by the neural network of FIG. 19 to determine if such objects are data, typically horizontal or vertical lines, or noise. If such objects are data, they are marked as such in the object list. The text processing of the handwritten letters and numerals in FIGS. 26A and 26B is done using the text identifying procedure referred to in block 73B of FIG. 9 and the various subroutines called the "identify text objects" subroutine of FIG. 11.

Figure 27:
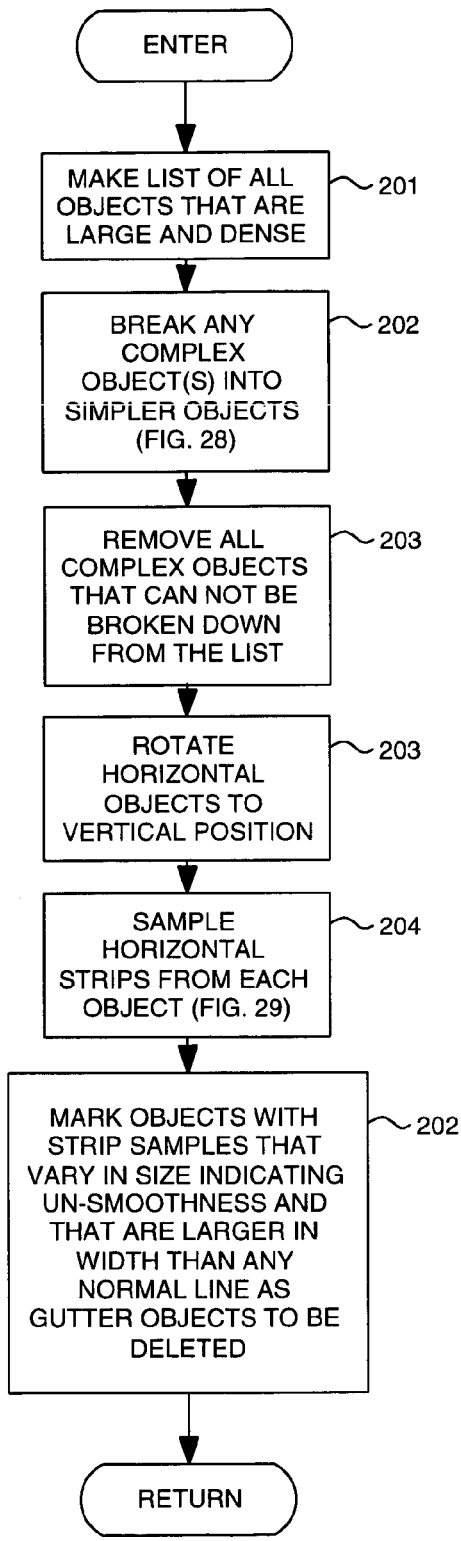
FIG. 27 is a routine called by the program of FIG. 9 to find and label gutters which are defined as dark areas on a document caused by the folder between magazine pages holding the sheets away from the copier or scanner platen.

Next, a program will be described for finding "gutters" of the type referred to above, i.e., for finding "gutter objects", and marking such gutter objects for deletion. The gutter object marking algorithm is described with reference to FIGS. 27–29. Referring to these drawings, the program of FIG. 27 is called from block 71A of FIG. 9. The program of FIG. 27 first enters block 201 and makes a list all of the objects that are sufficiently "large and dense". The program accomplishes this by searching through all the objects previously grabbed on MIP level 0, looking for objects that might qualify to be a gutter object or a page edge object. Gutter objects usually are large objects that can have a large width, a large height, or both. Gutter objects are also dense, meaning that gutter objects will have more "ON" pixels than a normal object of the same size. The possible gutter objects found by the foregoing procedure are put into a "possible gutter object list".

Figure 28:
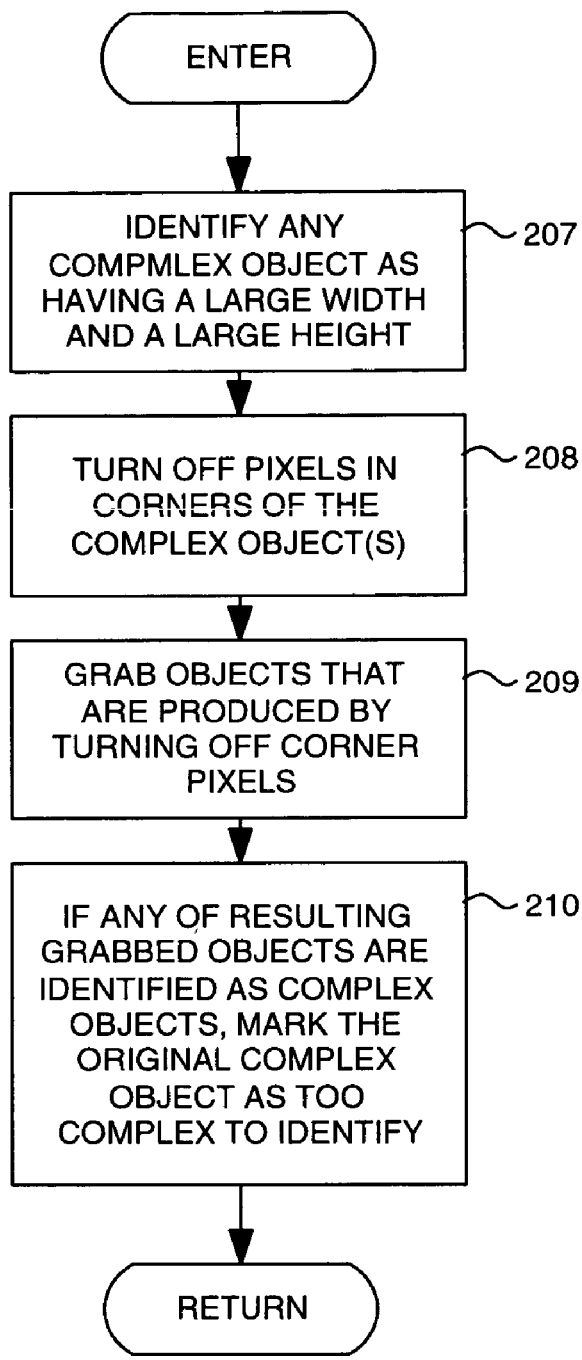
FIG. 28 is a routine called by the program of FIG. 27 to break complex objects into simpler objects for evaluation as page creases.

Next, the program of FIG. 27 goes to block 202 and performs the function of breaking any complex object into simpler objects, by executing the subroutine of FIG. 28. Referring to FIG. 28, the program first goes from FIG. 27, block 202 to block 207 of FIG. 28, and performs the function of identifying any complex objects having a large width and a large height. "Simple" large objects will be either sufficiently "wide" or sufficiently "long". For example, a simple object such as a line may have any length, but will have a very small width. A complex object such as a rectangle will have a width and height far greater than the width of any normal line.

Next, the program of FIG. 28 goes to block 208 and turns off the pixels in the corners of the complex object. This can be understood by envisioning a rectangle object and recognizing that if the pixels in the corners of the rectangle object are removed, the rectangle object will break apart into four separate lines. Next, program of FIG. 28 goes to block 209 and grabs the objects resulting from the process of block 208 which attempted to break the complex object apart. The program of FIG. 28 goes to block 210 and marked the original complex object is to complex to identify if any other resulting grabbed objects are identified as complex. (Any of the objects that still have a large width and a large height are considered too complex to break down.

For example, it could be a representation of a picture (e.g. a picture of a dog), which is obviously is not a gutter object, so the original complex object is marked as not being a gutter object.) The program of FIG. 28 and then returns to block 203 of FIG. 27.

In block 203, the program of FIG. 27 removes any complex object that cannot be broken down from the list formed in block 201. For example, if any object is still too large in height and width to be considered a simple object, then that object is removed from the list of possible gutter objects. For example, the complex object may be a representation of a photograph, and would not be determined to be a gutter object. The program of FIG. 27 then goes to block 204 and rotates any object in the possible gutter object list the width of which is greater than its height by 90 degrees. The program of FIG. 27 then goes to block 205 and calls the routine of FIG. 29, which executes a "quick" method to give a more detailed description of an object.

Figure 29:
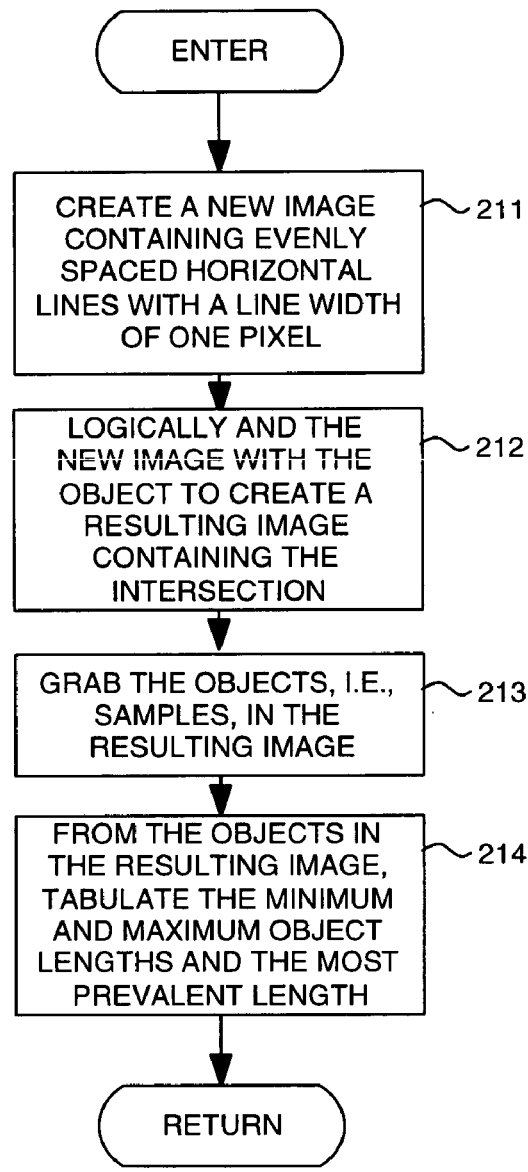
FIG. 29 is a routine called by the program of FIG. 28 to sample horizontal strips from each simple object.

Referring to FIG. 29, the program goes to block 211 and creates a new image containing evenly spaced horizontal lines having a line width of one pixel. A new blank image is created, and evenly spaced one-pixel-width horizontal lines are drawn into the new blank image space. The program of FIG. 29 then goes to block 212 and logically ANDS the new image with the object, creating a resulting image containing the intersections of the one-pixel-width horizontal lines with the object. The resulting image then contains horizontal lines that are samples or slices from the original object. The lengths of the one-pixel-white horizontal lines will be equal to the widths of the original simple object. (To understand this technique, it may be helpful to envision use of a Venetian blind with horizontal slats, wherein the Venetian blind is closed until there are only narrow slits through which the object can be viewed. The technique is similar to attempting to recognize the object on the other side of the Venetian blind under these conditions. The narrower the width of the slits of the Venetian blind, the more information is visible through the narrow slits, and the easier it is to recognize objects on the other side of the Venetian blind.)

Next, the program goes to block 213 and grabs all objects, i.e., samples or slices, in the image created by the above described intersections. The grabbed objects will be the one-pixel wide horizontal lines. The program of FIG. 29 then goes to block 214 and searches through all of the grabbed objects, accumulating statistics based on the lengths of the objects by tabulating the minimum and maximum object lengths and the most prevalent lengths.

After executing the subroutine of FIG. 29, the program returns to block 206 of FIG. 27, and indicates that objects with horizontal strip samples that vary in size constitute un-smooth objects, and that such objects that are larger than the width of any normal line are considered to be "gutter objects", and are marked for deletion. From the statistics on an object gathered from block 205, it can be deduced whether or not the object is a page gutter. Gutter objects usually are "rough" lines with extraneous pixels on the line edges. At points along the line, the gutter will have a width larger than any normal line, and the width of the gutter line varies along the line. If the most prevalent object width is greater than the width of a normal line, and there is a large range between the minimum width and the maximum width of the object, then the object is a gutter object. The original object is considered a gutter object, and is marked for deletion.

Figure 30:
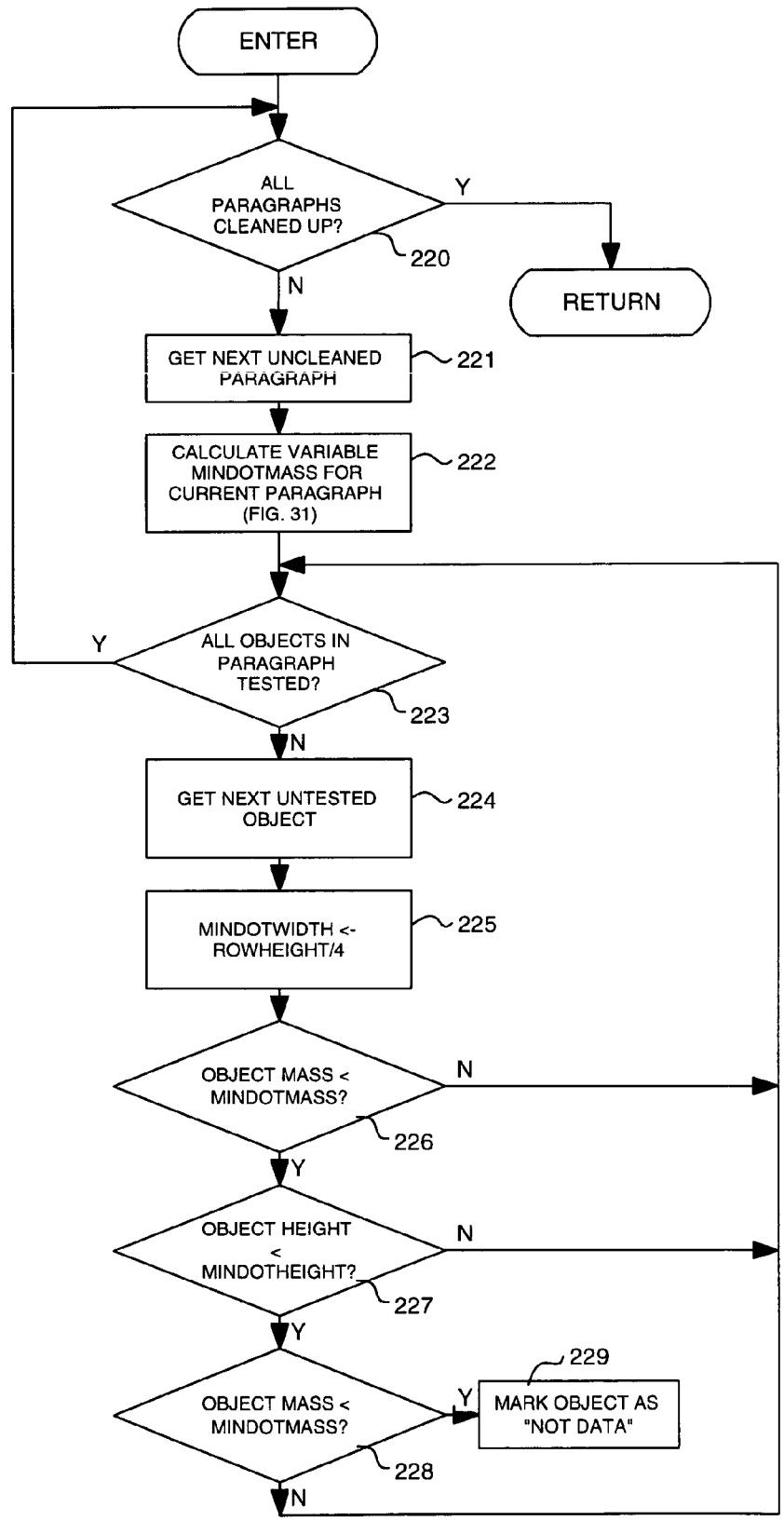
FIG. 30 is a routine called by the program of FIG. 11 to remove noise objects from within text rows.

FIG. 30 is a flowchart of a routine called by block 78D of FIG. 11 to remove noise objects from within text rows. Referring to FIG. 30, the program goes to decision block 220 and tests whether all paragraphs have already been "cleaned" of noise objects. If the result of this test is affirmative, the program returns to block 84 of FIG. 11; if the determination of decision block 220 is negative, the program goes to block 221 and identifies the next "uncleaned" paragraph. The program then goes to block 222 which calls the subroutine of FIG. 31 to calculate the value of a variable called the "mindotmass" for the present paragraph. After executing the subroutine of FIG. 31, the program of FIG. 30 goes to decision block 223 and tests whether all objects in the current paragraph have already been tested. If this determination is affirmative, then the program of FIG. 30 goes back to block 220 to determine if there are more paragraphs; if this determination is negative, then the program goes to block 224, which "gets" the next untested object, and proceeds to block 225.

In block 225, the program of FIG. 30 sets a variable called "mindotwidth" to one-fourth of the height of the row containing the current object. From there the program goes to decision block 226, which tests if the mass of the current object is less than the value of the variable mindotmass. If the determination is negative, the program goes back to decision block 223; if the determination is affirmative, then the program proceeds to decision block 227. Decision block 227 tests if the height of the current object is less than the value of the variable mindotwidth. If the result of this test is negative, then the program goes back to decision block 223; if the determination is affirmative, then the program goes to decision block 228. Decision block 228 tests if the width of the current object is less than the value of "mindotwidth". If the result of this test is negative, then the program goes back to decision block 223; if the determination is affirmative, then the program goes to block 229, which marks the current object as "not data" (i.e. removes any indicator that the object is data) After block 229, the program goes back up to decision block 223.

Figure 31:
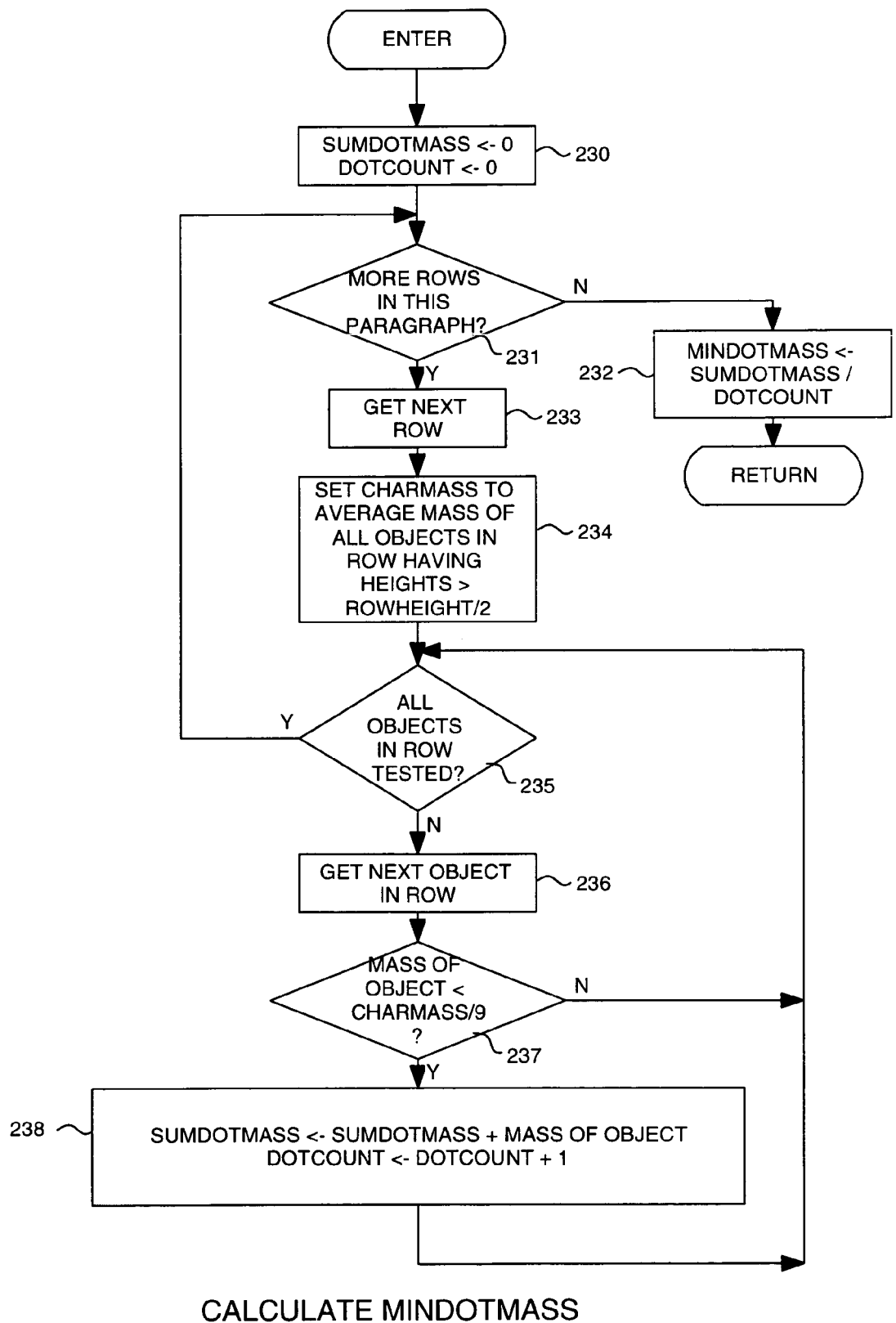
FIG. 31 is a subroutine called by the program of FIG. 30 to calculate the variable MINDOTMASS.

Referring next to FIG. 31, the subroutine enters block 230 and sets the program variables "sumdotmass" and "dotcount" to zero. From there the program of FIG. 31 goes to decision block 231, which checks to determine if there are any more rows in the paragraph to be processed. If this determination is negative, then the program of FIG. 31 goes to block 232, where it sets the variable mindotmass to the value of sumdotmass divided by dotcount. (Note that if dotcount is zero, mindotmass is set to zero.) After executing block 232 the program of FIG. 31 returns to block 222 of FIG. 30. If the result of decision block 231 is affirmative, then the program of FIG. 31 goes to block 233, where the next row in the current paragraph is identified. Next, the program goes to block 234, where the variable "charmass" is set to the average mass of all objects in the current row the height of which exceeds half the height of the row. (If there are no such objects, the variable charmass is set to zero.) After executing block 234, the program of FIG. 31 goes to decision block 235, which tests whether all objects in the current row have been tested. If this determination is affirmative, then the program goes back to decision block 231; if the determination of decision block 235 is negative, then the program of FIG. 31 goes to block 236, which gets the next object in the current row. After executing block 236, the program goes to decision block 237, which tests if the mass of the object is less than the value of the variable charmass divided by 9. If this determination is negative, then the program goes back to decision block 235; if the determination is affirmative, then the program goes to block 238, which increments the value of variable sumdotmass by an amount equal to the mass of the current object. Block 238 also increments the value of the variable dotcount by one. After executing block 238, the program of FIG. 31 goes back to decision block 235.

The described invention thus provides a completely automatic system and technique for cleaning up documents with skewed, noisy image information without significantly increasing hardware costs. The invention also provides a very compact digital data representation of the de-skewed, de-speckled document which reduces document storage costs and decreases digital document transmission times. Faster image retrieval of stored documents which have been de-skewed is accomplished. The enhanced digital representation of the original document is much more suitable for processing by optical character recognition software and provides faster, more accurate optical character recognition and much faster, more accurate vectorization of images. No user interaction is required.

While the invention has been described with reference to several particular embodiments thereof, those skilled in the art will be able to make the various modifications to the described embodiments of the invention without departing from the true spirit and scope of the invention. It is intended that all elements or steps which are insubstantially different or perform substantially the same function in substantially the same way to achieve the same result as what is claimed are within the scope of the invention.

Figure 1A:
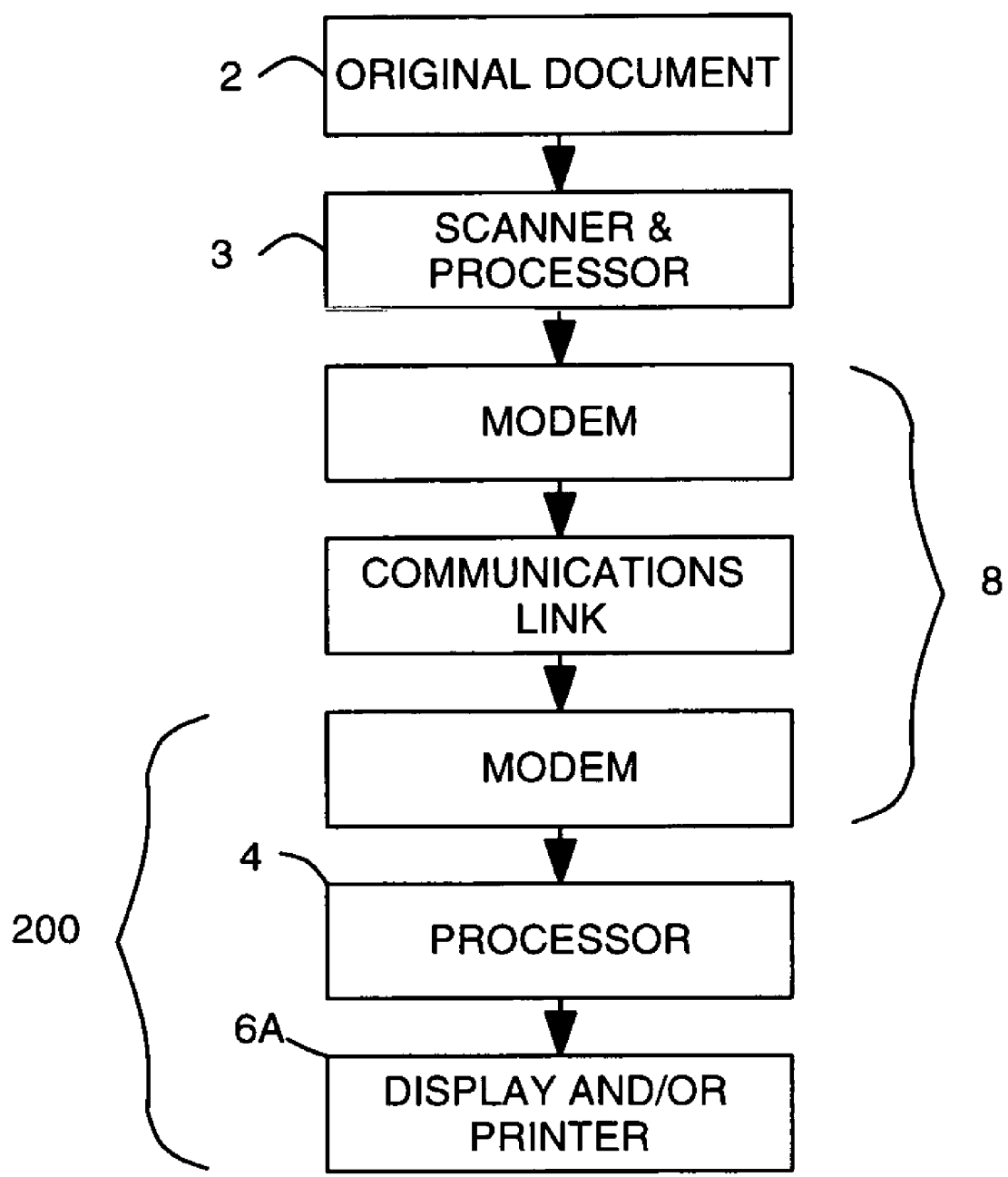
FIG. 1A is a simplified block diagram of another embodiment of the present invention.

For example, the above described invention is applicable to "clean up" images of scanned documents transmitted as E-mail. FIG. 1A illustrates a system in which the original document, including essential data including text and/or geometric regions and/or picture regions is scanned by means of a conventional scanner 3 and associated internal or external processor. Digital information representing the scanned document, including both noise and data as described above, are coupled by a modem and a communications link to a modem of another processor 4. Processor 4 executes the "clean-up" program described above and presents a viewable image of the de-skewed, de-speckled, post-processed image of the original document by means of a display and/or a printer 6A. The components indicated by reference numeral 8 could be a direct connection, telephone connection, or wireless connection. The components indicated by reference numeral 200 could be a conventional personal computer or a mobile telephone unit capable of receiving E-mail.

Although the above described embodiments of the "clean-up" process and apparatus of the present invention as described above are fully automatic, various MIP level images can be displayed on a computer monitor, as described above, along with the imaginary images of the imaginary bounding rectangles of the various objects and data areas. A control could be provided to allow an operator to move edges of certain bounding rectangles so as to reduce the data area without eliminating any essential data and also exclude noise images within the original data areas, thereby reducing the number of noise images without losing any essential data.

Those skilled in the art will recognize that noise can be introduced into digital representations of the content of a document in ways other than by digital scanning of the document or a copy thereof. For example, noise can be introduced by "on-the-fly" thresholding performed on digital image data that represents a bi-tonal image which, for example could have been scanned and archived, and then later thresholded to produce a bi-tonal digital representation. The present invention is intended to encompass clean-up of digital representations of documents regardless of how the noise objects in the image were introduced therein. The shapes and locations of the data regions also may be used to estimate the distortion parameters of the images of the document and thus allow the distortion to be corrected in the digital representation of the scanned image. The object "building" or "grabbing" technique described to distinguish meaningful objects composed of adjacent pixels set to a "1" could be accomplished by other techniques than those of the object grabbing program referred to. The reduced-resolution images needed for identifying various kinds of data objects or for distinguishing various kinds of data objects from noise objects could be accomplished by techniques other than the MIP level image generating process described with reference to FIG. 4.

The above described embodiments have been described for a "reasonably clean" scanned document, as opposed to an inherently "dirty" documents such as a somewhat darker blueprint, which includes a large amount of "noise" image material. For such "dirty" documents, the above described program handles the scanned image information slightly differently. Specifically, "pictures" as described above are detected at MIP level 0, and spider web noise is detected within rows and marked for subsequent deletion.

What is claimed is:

1. A method for producing a cleaned-up digital image of a document including essential data images and undesired noise images, comprising:

(a) digitally scanning the document to produce a first digital representation of the data images and the noise images;

(b) performing a first object grabbing operation on the first digital representation to identify all object images thereof;

(c) determining a skew angle of a straight line having a predetermined relationship to some objects representative of the essential data images and de-skewing the document by rotating the first digital representation by an amount equal to the magnitude of the skew angle to provide a de-skewed first digital representation;

(d) performing a second object grabbing operation on the de-skewed first digital representation to create an object list of all object images of the de-skewed first digital representation;

(e) identifying a portion of the de-skewed first digital representation corresponding to a picture region of the document;

(f) producing a reduced-resolution representation of the de-skewed first digital representation and performing a second object grabbing operation on the reduced-resolution representation;

(g) identifying objects of the reduced-resolution representation representing essential data areas of the document; and (h) constructing the cleaned-up digital image of the document by performing a logical ANDing operation between the picture region and the data areas with the de-skewed first digital representation to eliminate all objects outside of the picture region and the data areas to provide the cleaned-up digital image.

2. A method for producing a cleaned-up digital image of a document including essential data images and undesired noise images, comprising:
  (a) digitally scanning the document to produce a first digital representation of the data images and the noise images;
  (b) performing a first object grabbing operation on the first digital representation to identify all object images thereof;
  (c) determining a skew angle of a straight line having a predetermined relationship to some objects representative of the essential data images and de-skewing the document by rotating the first digital representation by an amount equal to the magnitude of the skew angle to provide a de-skewed first digital representation;
  (d) performing a second object grabbing operation on the de-skewed first digital representation to create an object list of all object images of the de-skewed first digital representation;
  (e) identifying a portion of the de-skewed first digital representation corresponding to a picture region of the document;
  (f) identifying objects representing essential data images of the document and marking the identified objects as data objects; and
  (g) constructing the cleaned-up digital image of the document by
    i. combining the objects in the picture region and the marked data objects, and
    ii. eliminating all objects not marked as data objects to provide a reconstructed digital representation of the essential images without the noise images.

3. The method of claim 2 including performing the first object grabbing operation by obtaining serial runlength data from the first digital representation including slices that each include the length and ending pixel number of a string of connected pixels having a "1" value, operating line-by-line on the runlength data by means of a decision tree classifier that creates software objects including a first linked list of a number of further linked lists each of which contains all of the slices of an object image, entering the slices of the object image into a software frame in the same order in which the slices are scanned, determining if the object image can be represented as a trapezoid or as an irregular blob containing all of its slices, fitting the data in the software frame representing the object image into a decision tree classifier, and operating the classifier to recognize and assign identifiers to divergences, convergences, and open ends of the object image and create a new linked list of linked lists representing the object image in the form of blob records, trapezoid records, divergence records, and convergence records which then can be conveniently used in subsequent vectorization operations without the need to scan and recognize data representing the object image.

4. The method of claim 3 including performing the second object grabbing operation by performing steps which are essentially similar to the steps of the first object grabbing operation.

5. The method of claim 2 wherein in step (c) the line has the predetermined relationship to a plurality of text objects in a row of text objects.

6. The method of claim 5 wherein some of the text objects are centered about the line.

7. The method of claim 5 including building the row of text objects by successively adding any closest nearby text object to either end of a row initially including a first text object.

8. The method of claim 3 wherein in step (c) the line has the predetermined relationship to a plurality of geometric objects identified by vectorizing objects larger than a predetermined size, identifying near-horizontal lines and near-vertical lines of the vectorized objects, and selecting a value of the skew angle which minimizes the mean-square deviation of the near-horizontal and near-vertical lines from orthogonality.

9. The method of claim 2 including, after step (b), classifying at least a portion of the document as a type including mainly text objects or mainly geometric objects by producing a first reduced-resolution representation of the first digital representation and performing another object grabbing operation on the first reduced-resolution representation to identify objects of the first reduced-resolution representation, determining the numbers of text-character-shaped rectangular objects and geometric objects thereof, respectively, and classifying the document as text type if the number of text-character-shaped objects is greater than the number of geometric objects, and otherwise classifying the document as geometric type.

10. The method of claim 2 wherein step (f) includes forming a row of text including text objects near to each other and having heights within a predetermined range, and marking all object images produced according to step (b) within the row as data objects.

11. The method of claim 10 including identifying the object images which are geometric objects and marking them as data objects.

12. The method of claim 11 wherein the identifying of geometric objects includes identifying only objects which have sufficiently high density and a sufficiently large aspect ratio as geometric objects.

13. The method of claim 11 wherein the identifying of geometric objects includes identifying whole geometric objects by getting a next object image having a size greater than a predetermined text size, and, if the next object image has a density lower than a predetermined density, performing a neural network operation to determine if the next object image is a whole geometry object, and, if the neural network operation determines that the next object image is a whole geometry object, marking the next object image as a data object.

14. The method of claim 11 wherein the identifying of geometric objects includes identifying broken geometry objects by performing a quad tree operation on all object images not previously identified as either text objects or geometric objects to identify a non-marked object, and repeatedly identifying any nearby non-marked objects of similar shape, to attempt to extend a pattern of similar non-marked objects in opposite directions from the non-marked object, and marking all objects included in the pattern as data objects.

15. The method of claim 14 including computing a pattern confidence level, and marking the objects included in the pattern only if the confidence level exceeds a predetermined level.

16. The method of claim 11 including identifying any object images which constitute dashed lines or dotted lines and marking such identified object images as data objects, by creating a grid of the wide, short rectangles or a grid of tall, narrow rectangles covering at least a portion of the document, summing the areas of all dash-sized for dot-sized objects into appropriate rectangles, eliminating objects in the appropriate rectangles having sufficiently small area sums, obtaining a histogram all objects in the appropriate rectangles by area and x-coordinate or y-coordinate, and marking each object having a sufficiently large histogram peak and located between predetermined coordinate bounds has a dashed object.

17. The method of claim 2 wherein the producing of the reduced-resolution representation of the de-skewed first digital representation includes representing each tile of four adjacent pixels of the first digital representation as a single pixel and setting the single pixel to a "1" state if any of the four adjacent pixels of the tile is at a "1" state and otherwise setting the single pixel to a "0" state.

18. The method of claim 17 including producing a first reduced-resolution representation of the first digital representation by representing each tile of four adjacent pixels of the reduced-resolution representation as a single pixel and setting that single pixel to a "1" state if any of the four adjacent pixels of that tile is at a "1" state and otherwise setting that single pixel to a "0" state.

19. A method for producing a cleaned-up digital image of a document including essential data images and undesired noise images, comprising:
 (a) digitally scanning the document to produce a first digital representation of the data images and the noise images;
 (b) operating a processor to perform a first object grabbing operation on the first digital representation to identify all object images thereof;
 (c) operating the processor to determine a skew angle of a straight line having a predetermined relationship to at least some objects representative of essential data and to de-skew the document by rotating the first digital representation by an amount equal to the magnitude of the skew angle to provide a de-skewed first digital representation;
 (d) operating the processor to perform a second object grabbing operation on the de-skewed first digital representation to create an object list of all object images of the de-skewed first digital representation;
 (e) operating the processor so as to identifying a portion of the de-skewed first digital representation corresponding to a picture region of the document;
 (f) operating the processor to produce a reduced-resolution representation of the de-skewed first digital representation and to perform a second object-grabbing operation on the reduced resolution representation;
 (g) operating the processor to identify objects of the reduced-resolution representation representing essential data areas of the document; and
 (h) constructing the cleaned-up digital image of the document by operating the processor to perform a logical ANDing operation between the picture region and the data areas with the de-skewed first digital representation to eliminate all objects outside of the picture region and the data areas to provide the cleaned-up digital image.

20. A method for producing a cleaned-up digital image of a document including essential data images and undesired noise images, comprising:
 (a) digitally scanning the document to produce a first digital representation of the data images and the noise images;
 (b) operating a processing system to perform a first object grabbing operation on the first digital representation to identify all object images thereof;
 (c) operating the processing system to determine a skew angle of a straight line having a predetermined relationship to at least some objects representative of essential data and to de-skew the document by rotating the first digital representation by an amount equal to the magnitude of the skew angle to provide a de-skewed first digital representation;
 (d) operating the processing system to perform a second object grabbing operation on the de-skewed first digital representation to create an object list of all object images of the de-skewed first digital representation;
 (e) operating the processing system so as to identify a portion of the de-skewed first digital representation corresponding to a picture region of the document;
 (f) operating the processing system to identify objects representing essential data images of the document and mark the identified objects as data objects; and
 (g) constructing the cleaned-up digital image of the document by operating the processing system to
  i. combine the objects in the picture region and the marked data objects to provide the cleaned-up digital image, and
  ii. eliminate all objects not marked as data objects to provide a reconstructed digital representation of the essential images without the noise images.

\* \* \* \* \*